US010656779B1

(12) United States Patent
Rueter et al.

(10) Patent No.: US 10,656,779 B1
(45) Date of Patent: May 19, 2020

(54) FILTERING POPUP SECONDARY DATA VISUALIZATIONS ACCORDING TO SELECTED DATA FROM PRIMARY DATA VISUALIZATIONS

(71) Applicant: Tableau Software, Inc., Seattle, WA (US)

(72) Inventors: Marc Rueter, Seattle, WA (US); Jun Kim, Sammamish, WA (US)

(73) Assignee: Tableau Software, Inc., Seattle, WA (US)

( * ) Notice: Subject to any disclaimer, the term of this patent is extended or adjusted under 35 U.S.C. 154(b) by 0 days.

(21) Appl. No.: 16/127,108

(22) Filed: Sep. 10, 2018

(51) Int. Cl.

| | |
|---|---|
| ***G06F 3/0481*** | (2013.01) |
| ***G06T 11/20*** | (2006.01) |
| ***G06F 16/904*** | (2019.01) |
| ***G06F 16/9038*** | (2019.01) |

(52) U.S. Cl.
CPC ........ *G06F 3/04812* (2013.01); *G06F 16/904* (2019.01); *G06F 16/9038* (2019.01); *G06T 11/206* (2013.01)

(58) Field of Classification Search
CPC ........................ G06F 3/04812; G06F 16/9038
See application file for complete search history.

(56) References Cited

U.S. PATENT DOCUMENTS

| | | | |
|---|---|---|---|
| 9,202,297 B1 | 12/2015 | Winters et al. | |
| 9,413,807 B1 | 8/2016 | Sherman et al. | |
| 9,633,076 B1 | 4/2017 | Morton et al. | |
| 10,353,922 B1 * | 7/2019 | Stolte .................... | G06F 16/283 |
| 2008/0209354 A1 * | 8/2008 | Stanek .................. | G06F 3/0482 715/767 |
| 2015/0362325 A1 * | 12/2015 | Shin ........................ | G06F 16/23 701/532 |

OTHER PUBLICATIONS

Rueter, Preinterview First Office Action, U.S. Appl. No. 16/127,149, dated Oct. 18, 2019, 5 pgs.
Rueter, First Action Interview Office Action, U.S. Appl. No. 16/127,149, dated Nov. 26, 2019, 6 pgs.
The Information Lab, Tips for using the Tableau Tooltip Tool, Aug. 20, 2015, YouTube, https://www.youtube.com/watch?v=D3WaD7gNVZk, 1 pg.

* cited by examiner

*Primary Examiner* — Sherrod L Keaton
(74) *Attorney, Agent, or Firm* — Morgan, Lewis & Bockius LLP

(57) ABSTRACT

A computing device displays a graphical user interface on a display. The graphical user interface has a data visualization region that displays a primary data visualization, which includes a plurality of visual marks. The primary data visualization represents a first set of data fields of a plurality of data fields from a dataset. The device receives user input in the graphical user interface to select one of the visual marks. In response to the user input, the device generates a secondary data visualization, filtered according to one or more data values. The data values correspond to the first set of data fields and are associated with the selected visual mark. The secondary data visualization represents a second set of data fields from the dataset. The device then displays the generated secondary data visualization in a tooltip for the selected data mark, overlaying a portion of the primary data visualization.

18 Claims, 64 Drawing Sheets

906

FILTERING POPUP SECONDARY DATA VISUALIZATIONS ACCORDING TO SELECTED DATA FROM PRIMARY DATA VISUALIZATIONS

RELATED APPLICATION

This application is related to U.S. patent application Ser. No. 16/127,149, filed Sep. 10, 2018, entitled "Highlighting Data Marks in Popup Secondary Data Visualizations According to Selected Data Values from Primary Data Visualizations", which is incorporated herein by reference in its entirety.

TECHNICAL FIELD

The disclosed implementations relate generally to data visualization and more specifically to systems, methods, and user interfaces that enable users to interact with data visualizations to analyze data.

BACKGROUND

Data visualization applications enable a user to understand a data set visually, including distribution, trends, outliers, and other factors that are important to making business decisions. Some data sets are very large or complex, and include many data fields. Various tools can be used to help understand and analyze the data, including data visualizations or dashboards that have multiple data visualizations.

Data visualization is a powerful tool for exploring large data sets, both by itself and coupled with data mining algorithms. Graphical views provide user-friendly ways to visualize and interpret data. However, the task of effectively visualizing large databases imposes significant demands on the human-computer interface to the visualization system. Displays have very limited space and users frequently need to work with more than one data visualization, switching between worksheets to analyze the underlying dataset (e.g., to view different levels of detail or to view the data from different perspectives).

SUMMARY

Accordingly, there is a need for more efficient methods and interfaces for manipulating graphical views of data. Such methods and interfaces reduce the cognitive burden on a user and produce a more efficient human-machine interface. For battery-operated devices, such methods and interfaces conserve power and increase the time between battery charges. Such methods and interfaces may complement or replace conventional methods for visualizing data. Other implementations and advantages may be apparent to those skilled in the art in light of the descriptions and drawings in this specification.

Some implementations provide for flexible dynamic definitions of what is included in tooltips, allowing users to see detail on demand as they are viewing a data visualization. In some cases, the tooltips themselves include one or more data visualizations that are dynamically constructed based on the selected visual mark (e.g., hovering over a bar mark in a bar chart or hovering over a point mark in a line graph). The data from the selected visual mark can be used in various ways to generate the data visualizations in the tooltip, including filtering the data or highlighting specific data.

In accordance with some implementations, a method executes at a computer with a display. For example, the computer can be a smart phone, a tablet, a notebook computer, or a desktop computer. The method includes displaying a graphical user interface on the display. The graphical user interface includes a data visualization region, which displays a primary data visualization. The primary data visualization includes a plurality of visual marks. The visual marks in the primary data visualization represent a first set of data fields of a plurality of data fields from a dataset. The method further includes receiving user input in the graphical user interface to select a visual mark of the plurality of visual marks. In response to the user input, the device generates a secondary data visualization according to one or more data values, for the first set of data fields, associated with the selected visual mark. The secondary data visualization represents a second set of data fields of the plurality of data fields from the dataset. The second set of data fields is different from the first set of data fields, but there may be some overlapping data fields in the two sets of data fields. In some implementations, generating the secondary data visualization comprises filtering data for the second set of data fields according to one or more data values, for the first set of data fields, associated with the selected visual mark. The device then displays the generated secondary data visualization in a tooltip overlaying a portion of the primary data visualization.

In some implementations, generating the secondary data visualization includes generating a database query according to the one or more data values and according to the second set of data fields. The device sends the database query to a database that includes the dataset, thereby retrieving a result set for the secondary data visualization. The device then generates the secondary data visualization according to the result set.

In some implementations, prior to receiving the user input, the device retrieves data for the second set of fields from the dataset and stores the retrieved data in a cache. In response to the user input, the device retrieves data from the cache corresponding to the one or more data values. By caching data beforehand for all (or many) of the possible secondary data visualizations, the data visualization application on the device is able to respond more quickly to the user input and respond more quickly as it updates the tooltip with a different data visualization as the user selects different visual marks.

In some implementations, the user input is hovering over the visual mark or selecting the visual mark (e.g., using a mouse cursor, stylus, or finger).

In some implementations, the secondary data visualization has a size that is smaller than the size of the primary data visualization. In some implementations, the secondary data visualization has a default height of 300 pixels, and a default width of 300 pixels.

In some implementations, another portion of the primary data visualization that is not overlaid by the tooltip remains displayed.

In some implementations, the dataset includes one or more linked datasets. In some instances, two or more datasets are linked by one or more data fields that the two datasets have in common. In some instances, one or more of the common data fields represent the same data in the two datasets, but have different field names (e.g., a "state" in one dataset may match "state_name" or "state_code" in another dataset).

In some implementations, the data visualization region has a plurality of worksheets, where each worksheet has a distinct set of characteristics that define a respective data visualization. In some implementations, the method includes creating a first worksheet for the primary data visualization and creating a second worksheet for the secondary data visualization. The device receives user input in the graphical user interface to invoke a tooltip definition window for the primary data visualization. The device then receives user input, in the tooltip definition window, to specify a reference to the secondary data visualization. When the user takes a subsequent action (for the primary data visualization) that invokes a tooltip, the device uses the reference specified in the tooltip definition window to dynamically generate the secondary data visualization.

In some implementations, displaying the tooltip further comprises automatically resizing the secondary data visualization such that the secondary data visualization is displayed within the tooltip.

In some instances, the tooltip definition for the primary data visualization includes references to two or more data visualizations (e.g., each referring to a different worksheet tab in the data visualization region). In this case, in addition to generating the secondary data visualization, the device also generates a tertiary data visualization according to the one or more data values. The tertiary data visualization represents a third set of data fields of the plurality of data fields from the dataset. The device concurrently displays, in the tooltip, both the generated secondary data visualization and the generated tertiary data visualization.

In some implementations, the primary data visualization and secondary data visualization each has a respective view type that is one of: bar chart, line graph, map, scatter plot, pie chart, heat map, area chart, circle plot, treemap, and bubble chart.

The primary and secondary data visualizations can be related in a variety of ways. In each case, one or more data values for data fields in the first set are used to modify what data is displayed in the secondary data visualization. In some instances, one or more data values for the first data visualization are used to filter the data displayed in the secondary data visualization. In some instances, a first data value of the one or more data values corresponds to a first data field, in the first set of data fields, which is not in the second set of data fields. Generating the secondary data visualization includes computing one or more aggregate values for a second data field in the second set of data fields, aggregating only rows from the dataset whose corresponding data values for the first data field match the first data value.

In accordance with some implementations, a method executes at a computer with a display. For example, the computer can be a smart phone, a tablet, a notebook computer, or a desktop computer. The method includes displaying a graphical user interface on the display. The graphical user interface includes a data visualization region, which displays a primary data visualization. The primary data visualization includes a plurality of visual marks. The visual marks in the primary data visualization represent a first set of data fields of a plurality of data fields from a dataset. The method further includes receiving user input in the graphical user interface to select a visual mark of the plurality of visual marks. In response to the user input, the method generates a secondary data visualization, for a second set of data fields of the plurality of data fields. The secondary data visualization highlights specific visual marks. In particular, visual marks in the second data visualization are highlighted only when their corresponding data values for a shared data field between the first and second sets matches a data value of the selected visual mark in the primary data visualization. The method then displays the generated secondary data visualization in a tooltip overlaying a portion of the primary data visualization.

In some implementations, the secondary data visualization is a static image representing the second set of data fields. In some implementations, the secondary data visualization is a dynamic interactive data visualization. For example, the secondary data visualization can be expanded to a larger size (e.g., full screen or the full size of the data visualization region). When the secondary data visualization is dynamic, a user can select data marks (e.g., displaying tooltips for the marks in the secondary data visualization), apply quick filters, add analytic objects, such as average lines or trend lines, and so on, in the same way that a user can interact with the primary data visualization.

In some implementations, a computing device includes one or more processors, memory, a display, and one or more programs stored in the memory. The programs are configured for execution by the one or more processors. The one or more programs include instructions for performing any of the methods described herein.

In some implementations, a non-transitory computer readable storage medium stores one or more programs configured for execution by a computing device having one or more processors, memory, and a display. The one or more programs include instructions for performing any of the methods described herein.

Thus methods, systems, and graphical user interfaces are disclosed that enable users to easily interact with multiple related data visualizations.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Some methods and devices described in the present specification improve upon data visualization methods by displaying one or more secondary data visualizations in a tooltip from a primary data visualization. Such methods and devices reduce the burden on the user interface by providing a quicker and easier access to a data visualization without the need to switch between different worksheets. The one or more secondary data visualizations are dynamically rendered and displayed in the tooltip based on a user input that selects a visual mark of the primary data visualization. Such dynamic data visualization based on user actions with the primary data visualization improves on conventional methods. As illustrated below, the content of tooltips is dynamically generated based on data values corresponding to the visual mark where a user interaction occurs (e.g., hover). The data values from the visual mark are used to generate a secondary data visualization in the tooltip that is specific to the data at that visual mark. Displaying data visualizations in a tooltip provides additional relevant data to the user while efficiently using the limited space available on a display.

In some implementations, data visualizations are classified according to how they present data to the user. In some implementations, the classifications are referred to as "view types" or "chart types." In some implementations, the view types are text tables, highlight tables, heat maps, bar charts, scatter plots, line charts, area charts, circle plots, treemaps, maps, pie charts, bubble charts, Gantt charts, box plots, and bullet graphs. Some implementations include more or fewer view types. In some implementations, some of the view types include two or more variations or sub-types, so after selection of a view type, the user is prompted to select an appropriate sub-type as well. A user can select or change the view type at any time. In particular, the view type can be changed after other features are selected, or even after a data visualization has been generated and displayed. This allows a user to quickly view the same data in alternative ways, such as a bar chart or a line chart of the same data.

Figure 1:
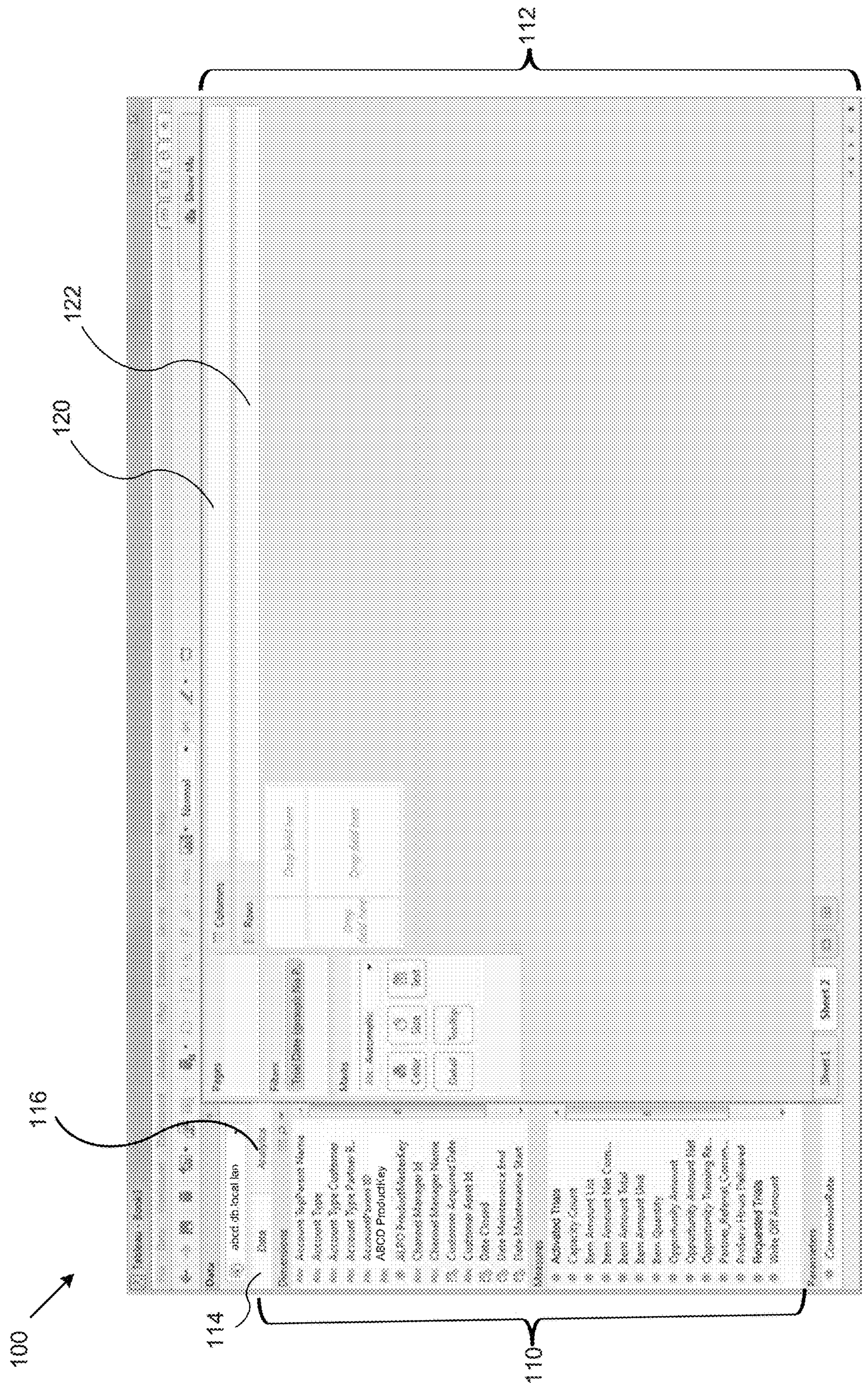
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides data fields that may be selected and used to build a data visualization. In some implementations, the data fields of a schema are separated into a group of dimensions (e.g., categorical data) and a group of measures (e.g., numeric quantities) in the schema information region 110.

In some implementations, a data field may be designated as a dimension or as a measure in the database itself (e.g., if the data source is a cube data source). In other implementations, a data visualization application 222 automatically assigns a default role to each data field, which is either a measure or a dimension based on the data type of the data field. For example, numeric fields by default are used as measures, whereas non-numeric fields (e.g., text fields and date fields) by default are used as dimensions. A user can override the assigned default role when appropriate. For example, a numeric "ID" field may be initially classified as a measure, but a user may reclassify the "ID" field as a dimension.

A dimension is a data field that organizes data into categories (also referred to as "buckets"). For example, if a data source includes data associated with the "United States" and the data source includes a data field corresponding to "State," the "State" is used as a dimension. Each dimension creates distinct divisions within a data visualization, such as separate bars in a bar chart (e.g., a separate bar for each state). These divisions are typically labeled with dimension headers, with one header for each corresponding dimension value (e.g., each bar may be labeled with the name of the corresponding state).

A measure is a data field that is used to measure something, such as sales amount, profit, or order quantity, and is typically continuous. For example, whereas the dimension 'State' has a fixed set of discrete possible values, a 'Sales Amount' data field can have any value within a large range. A significant number of records could include a variety of small sales amounts correlating to lower-priced items and many other records may include larger amounts of sales for higher-priced items. Each measure is typically aggregated to a single value (e.g., by default measures are summed) at a level of detail (grouping) according to the selected dimensions (e.g., sales may be aggregated by state).

In some implementations, the schema information region 110 also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic. Because no data elements have been selected yet, the space initially has no visual graphic. In some implementations, the data visualization region 112 has multiple layers that are referred to as sheets.

Figure 2:
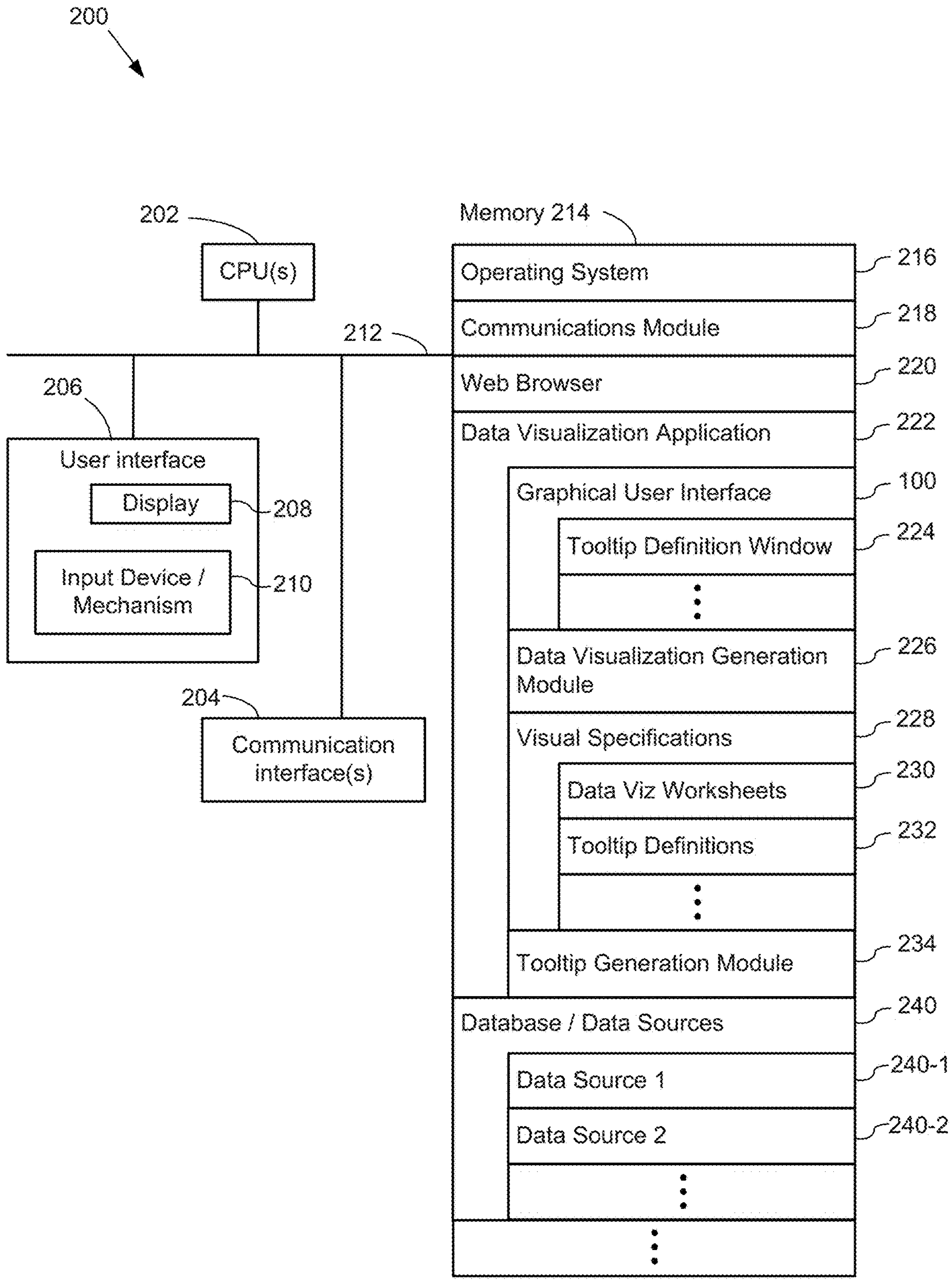
FIG. 2 is a block diagram of a computing device according to some implementations.

FIG. 2 is a block diagram illustrating a computing device 200 that can display the graphical user interface 100 in accordance with some implementations. Various examples of the computing device 200 include a desktop computer, a laptop computer, a tablet computer, and other computing devices that have a display and a processor capable of running a data visualization application 222. The computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components.

The computing device 200 includes a user interface 206 comprising a display device 208 and one or more input devices or mechanisms 210. In some implementations, the input device/mechanism includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternatively the non-volatile memory device(s) within the memory 214, comprises a non-transitory computer-readable storage medium. In some implementations, the memory 214, or the computer-readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other application capable of displaying web pages), which enables a user to communicate over a network with remote computers or devices;
- a data visualization application 222, which provides a graphical user interface 100 for a user to construct visual graphics. For example, a user selects one or more data sources 240 (which may be stored on the computing device 200 or stored remotely), selects data fields from the data source(s), and uses the selected fields to define a visual graphic. In some implementations, the information the user provides is stored as a visual specification 228. The data visualization application 222 includes a data visualization generation module 226, which takes the user input (e.g., the visual specification 228), and generates a corresponding visual graphic (also referred to as a "data visualization" or a "data viz"). The data visualization application 222 then displays the generated visual graphic in the user interface 100. In some implementations, the data visualization application 222 executes as a standalone application (e.g., a desktop application). In some implementations, the data visualization application 222 executes within the web browser 220 or another application using web pages provided by a web server; and
- zero or more databases or data sources 240 (e.g., a first data source 240-1 and a second data source 240-2), which are used by the data visualization application 222. In some implementations, the data sources are stored as spreadsheet files, CSV files, XML files, flat files, or JSON files, or stored in a relational database.

In some implementations, the graphical user interface 100 includes a tooltip definition window 224, which enables users to specify what is displayed within a tooltip for each data visualization.

In some implementations, the graphical user interface 100 includes a data visualization region, which includes one or more data visualization worksheets 230. Each data visualization worksheet 230 includes its own set of characteristics and its own data visualization.

In some implementations, the tooltip definitions 232 (as specified in the tooltip definition window 224) are stored as part of a visual specification. Each tooltip definition 232 is associated with a respective specific worksheet 230 (and is thus associated with a specific data visualization).

While viewing a data visualization, the tooltip generation module 234 generates and displays the appropriate tooltip according to the corresponding tooltip definition 232 and according to the location of the user action (e.g., hover, click, or touch).

Each of the above identified executable modules, applications, or sets of procedures may be stored in one or more of the memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3A:
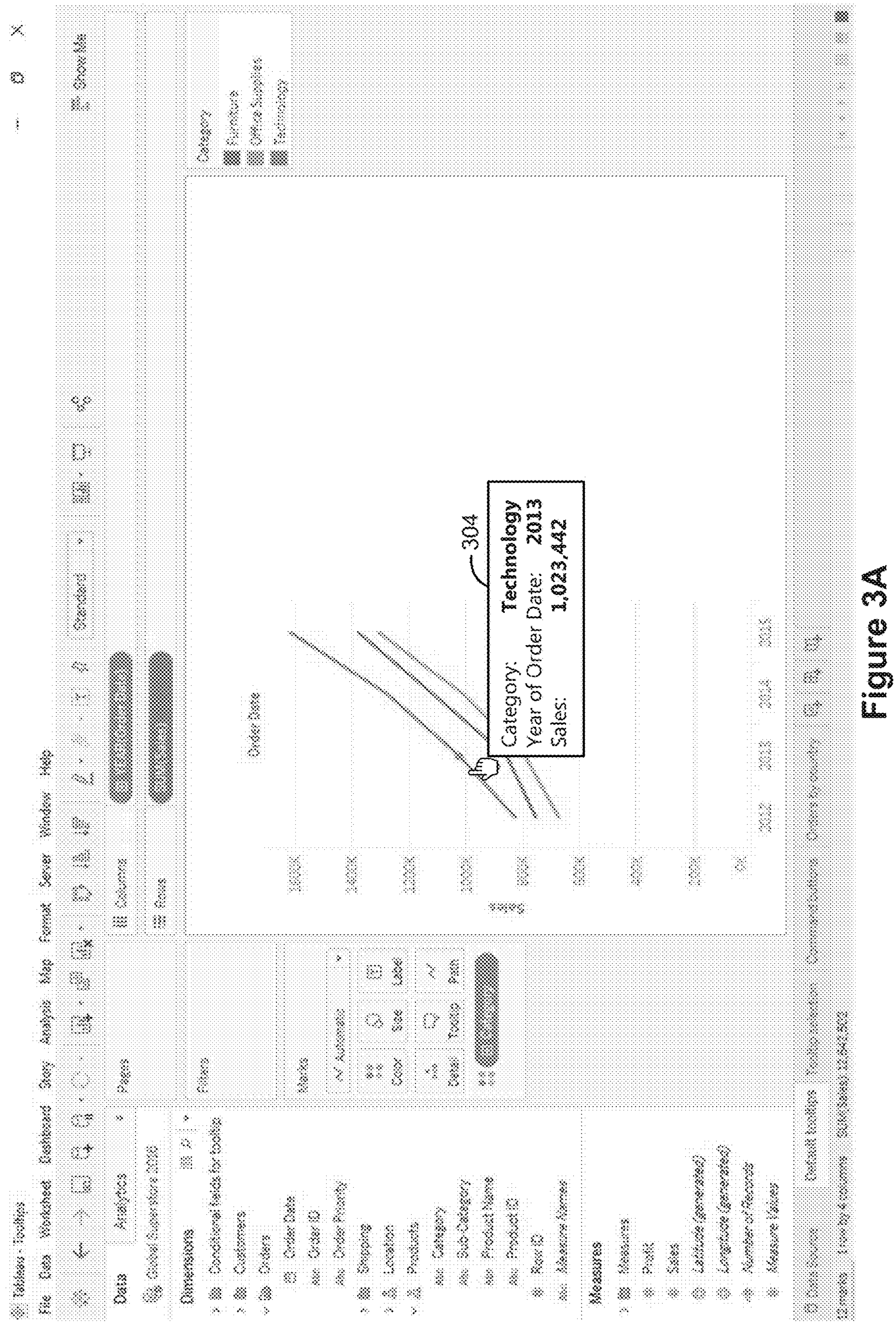
FIGS. 3A and 3B illustrate a graphical user interface for editing a tooltip according to some implementations.
Figure 3B:
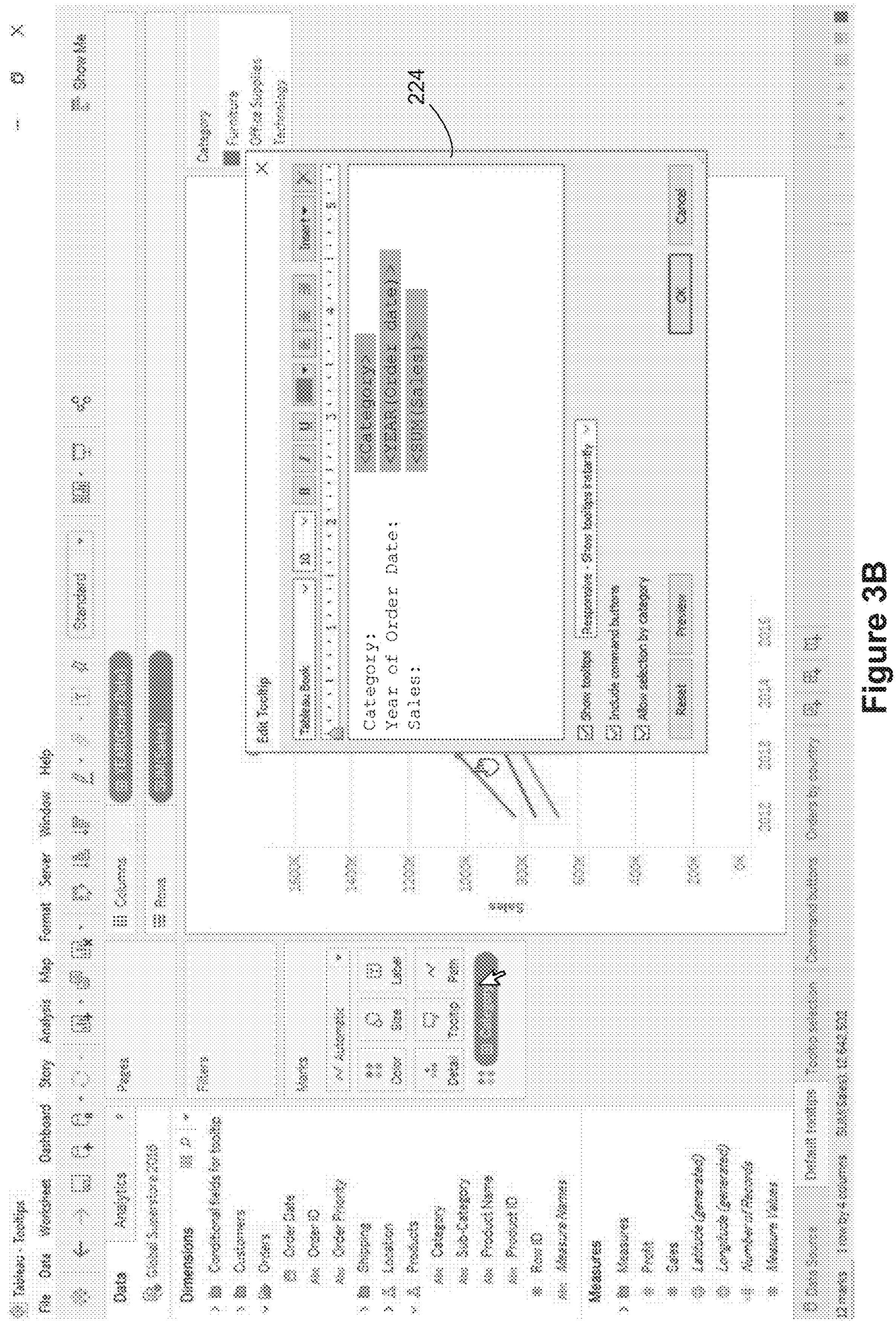

FIGS. 3A and 3B illustrate a graphical user interface for defining and displaying a tooltip according to some implementations. As illustrated in FIG. 3A, the tooltip 304 is displayed in response to a user input, such as a user hovering over a portion of the user interface. For example, a user hovers (e.g., using a cursor or other input) over a portion of the graph shown in FIG. 3A, and in response to the user input, the tooltip 304 is generated and/or displayed. In some implementations, the tooltip 304 displays more detailed information related to a portion of the image (e.g., the tooltip displays the data corresponding to a data point identified by the user's input). For example, FIG. 3A illustrates a line graph with three categories, each category corresponding to one of the three lines of the graph: a top line corresponding to "technology," a middle line corresponding to "furniture," and a bottom line corresponding to "office supplies." The line graph represents order date on the x-axis, measured in years, and the sales is on the y-axis. The user input corresponds to a portion of the "technology" line. In response to the user input, the tooltip 304 is displayed to provide more detail about the portion of the "technology" line corresponding to the user input. Thus, the tooltip 304 shows that the category is "technology," the year of order date is 2013, and the sales is 1,023,442 (e.g., dollars).

FIG. 3B illustrates a tooltip definition window 224, which enables users to define the tooltip contents. The tooltip definition 232 includes both literal text (e.g., "Category:") as well as references to data fields. The tooltip definition 232 in FIG. 3B shows that the tooltip will display the data fields <Category>, <YEAR(Order date)> and <SUM(Sales)>. The tooltip definition 232 shown in FIG. 3B is used by the tooltip generation module 234 to generate and display the tooltip 304 in FIG. 3B. In this example, the tooltip does not include an embedded data visualization.

Figure 4A:
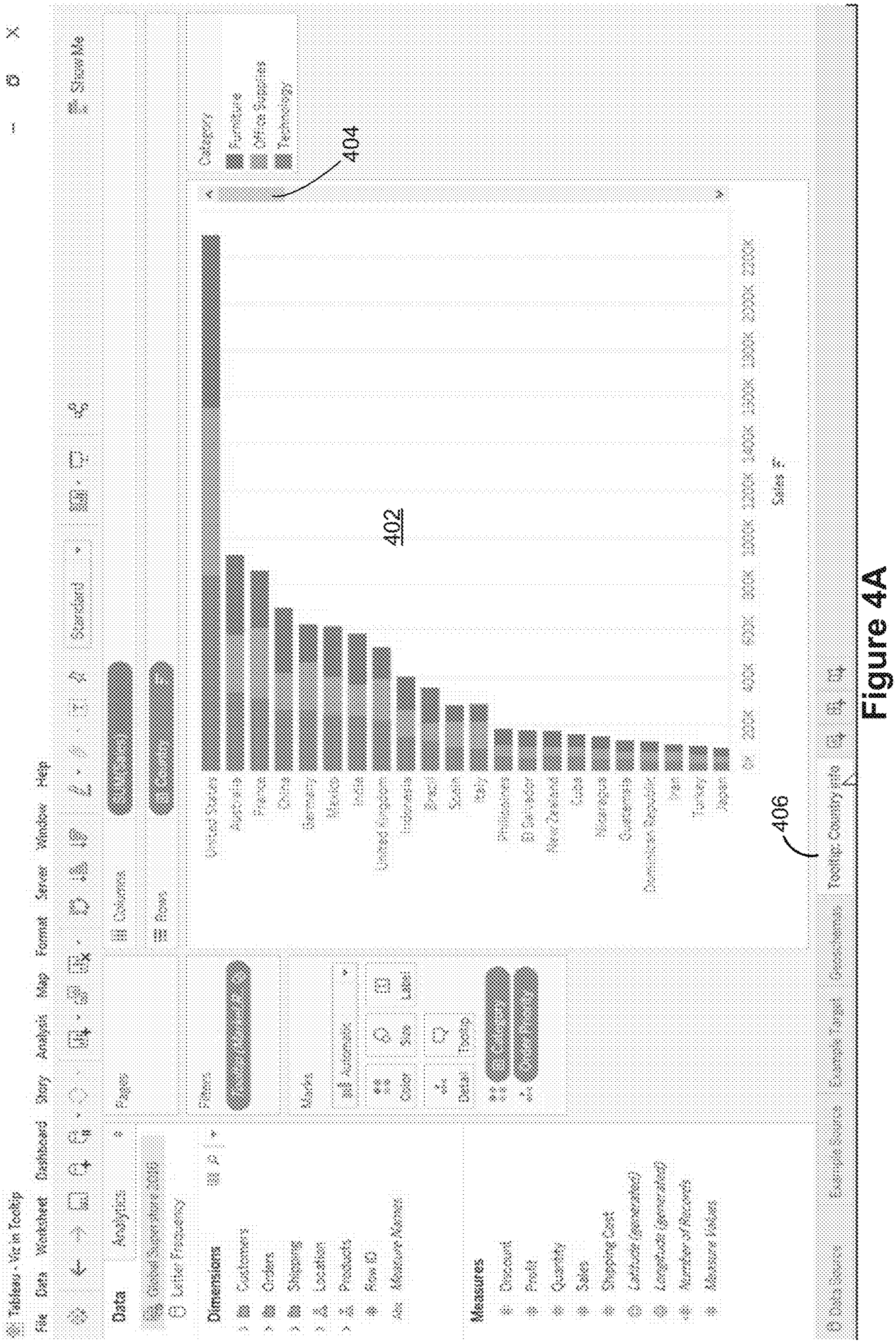
FIGS. 4A-4H illustrate a series of graphical user interfaces for a plurality of data visualizations according to some implementations.

FIGS. 4A-4H illustrate a series of graphical user interfaces for a plurality of data visualizations according to some implementations. FIG. 4A illustrates a first worksheet 406, labeled "Tooltip: Country info." This worksheet is displaying a stacked bar chart 402, showing sales for each country.

Because there are too many countries to display on one screen, there is a scroll bar 404. This bar chart has the countries sorted (descending) according to total sales. As illustrated below in FIGS. 4E-4H, the data visualization 402 on this worksheet 406 will be used within a tooltip for a data visualization on another worksheet.

Figure 4B:
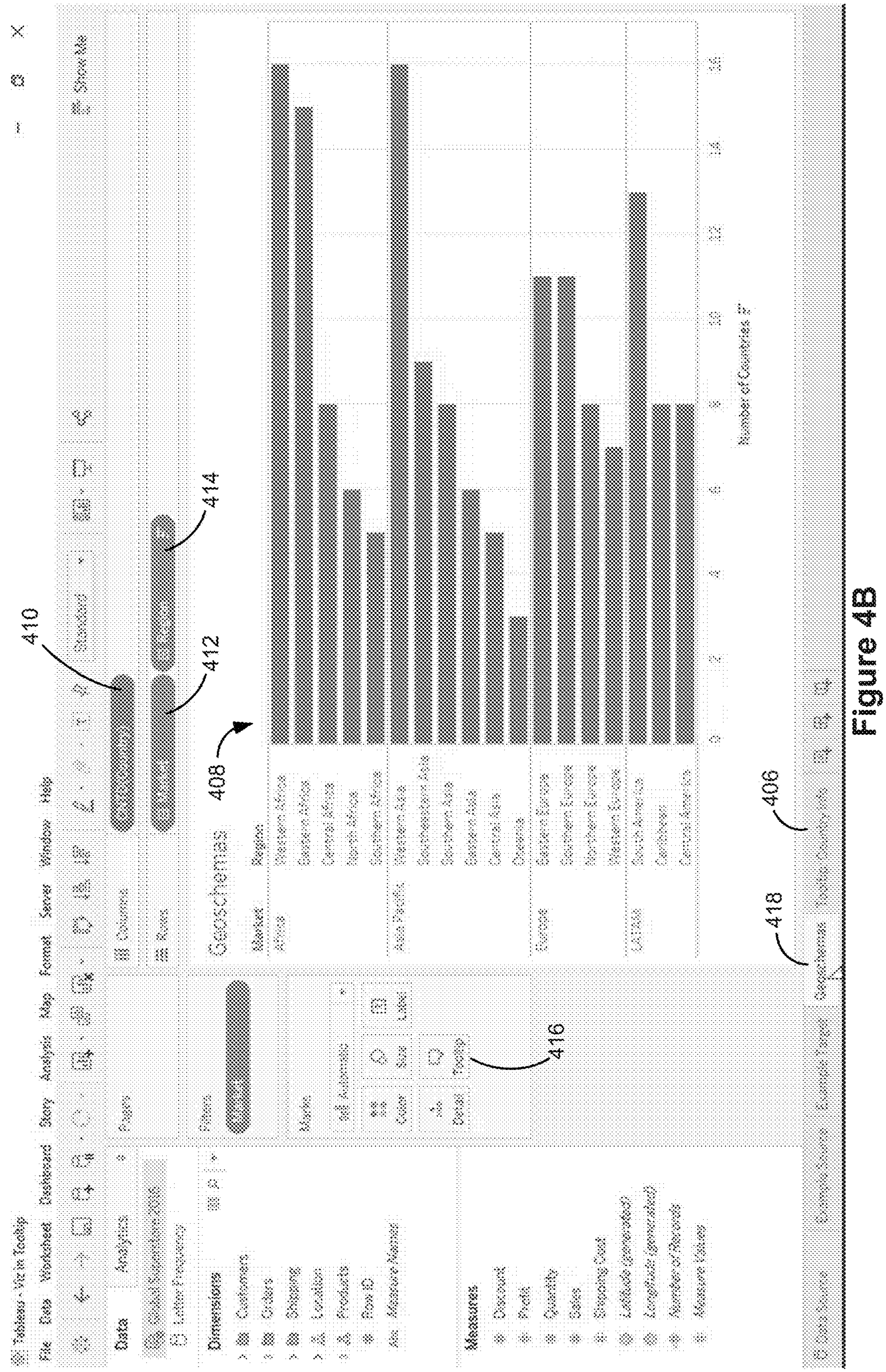

FIG. 4B displays a "Geoschemas" worksheet 418, and a corresponding data visualization 408. The first worksheet 406 still shows as an unselected tab. The Geoschemas data visualization 408 illustrates, by region within particular markets (e.g., countries), the number of distinct countries in each region where there have been sales. The market data field 412 and the region data field 414 have been placed onto the row shelf to create this arrangement. The function CNTD( ) in the calculated field 410 counts the number of distinct countries. There may be many sales in each country (and therefore many rows in the database for the same country), but the goal is to count each country only once, so CNTD( ) produces the desired result. In some implementations, the graphical user interface includes a selectable "Tooltip" icon 416 (e.g., a button). In some implementations, a user can drag data fields from the schema region to the tooltip icon 416 to have the data field included in the tooltip. In some implementations, selecting the "Tooltip" icon 416 invokes a tooltip definition window 224, as illustrated in FIG. 4C.

Figure 4C:
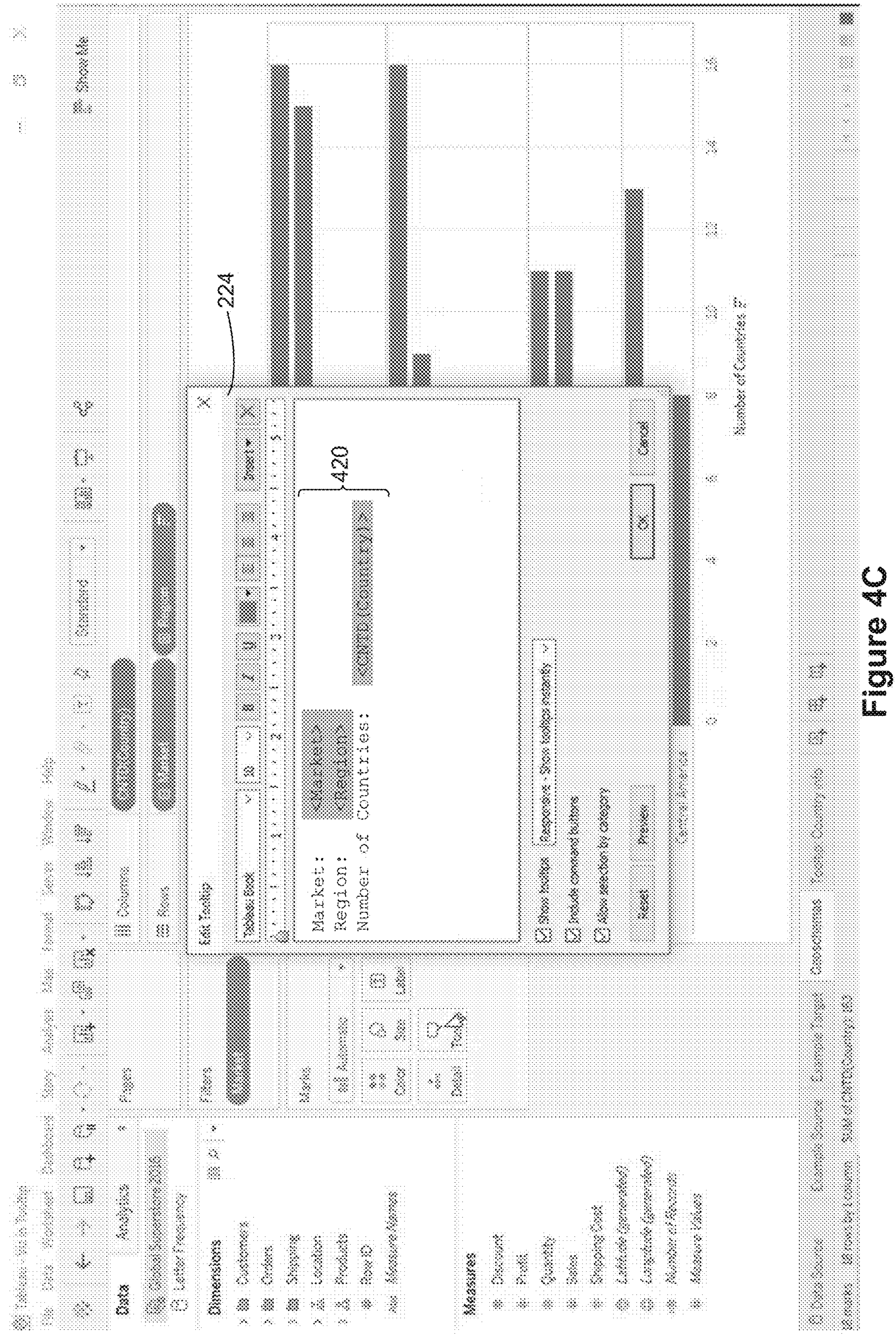
Figure 4D:
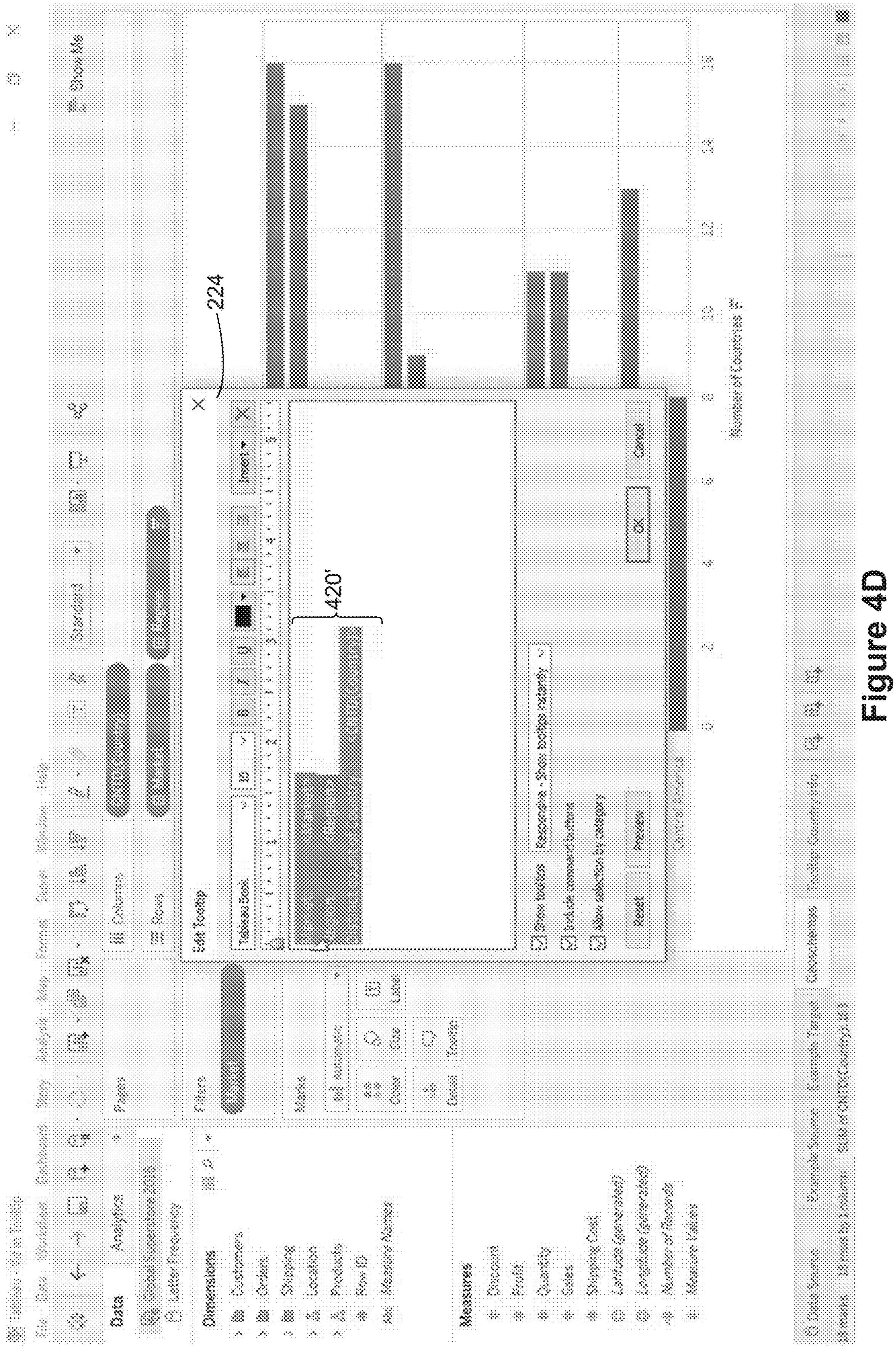

FIG. 4C illustrates the tooltip definition window 224. When the tooltip definition window is initially opened, it displays the current definition 420. The definition 420 in FIG. 4C includes labels and corresponding data field references for the three data fields 410, 412, and 414 placed on the row and column shelves. In some implementations, the tooltip definition defaults to all data fields placed on shelves in the user interface. In this case, the user does not want the default tooltip, to the user selects the entire definition 420', as illustrated in FIG. 4D, and deletes this definition. At this point the tooltip definition is blank.

Figure 4E:
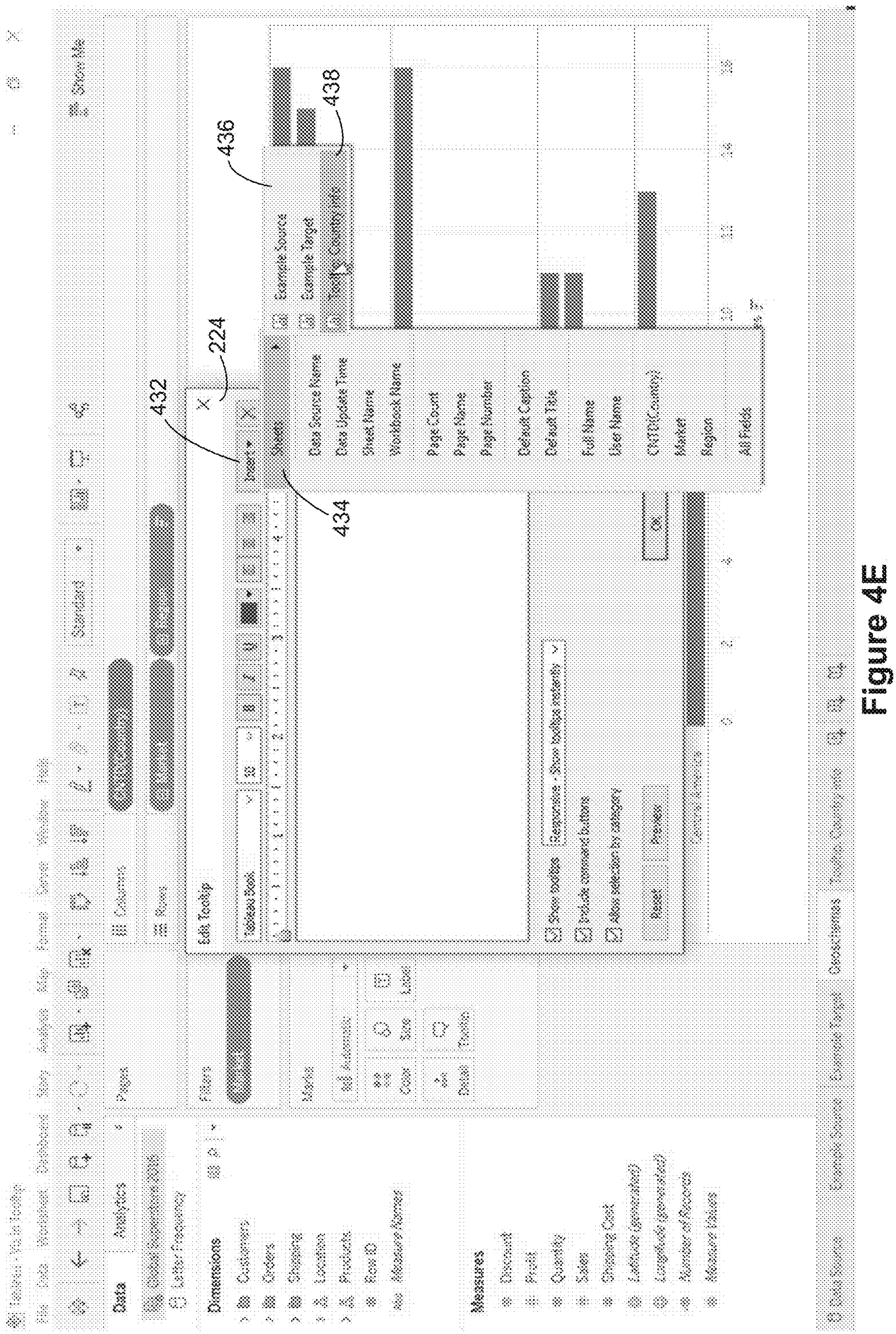

FIG. 4E illustrates inserting a data visualization into a tooltip. In this implementation, the tooltip definition window 224 includes an insert menu 432. When selected, a drop-down menu appears, which includes a "Sheets" option 434. The Sheets option 434 allows users to import a reference to a data visualization on another worksheet 230. Selecting the Sheets option 434 brings up a submenu 436, which shows the other available worksheets 230. In this example, the three potential sheets to use are "Example Source," Example Target," and "Tooltip Country info" 438. Note that each of these corresponds to a worksheet tab at the bottom of the graphical user interface.

Figure 4F:
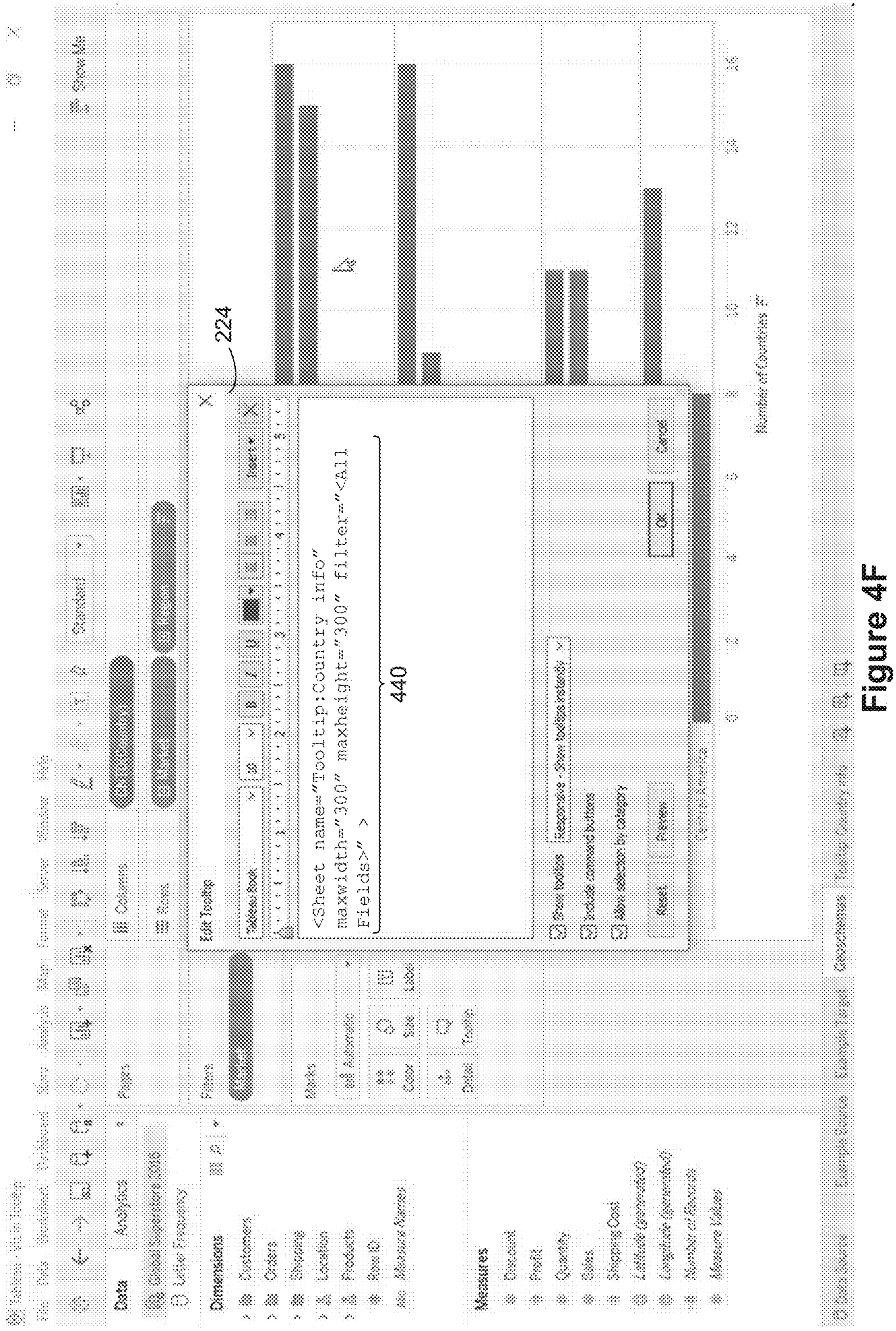

FIG. 4E illustrates inserting a reference to a secondary worksheet, which is the "Tooltip Country info" worksheet 406, by selecting the corresponding menu item 438. In response to selecting the secondary worksheet, a script 440 is generated and displayed in the tooltip definition window 224, as shown in FIG. 4F. The script 440 identifies the secondary worksheet "Tooltip: Country info" 406, as well as graphical constraints for displaying a tooltip (e.g., maxwidth and maxheight), and identifies filters (if any) to be applied to the data (e.g., <All Fields>). The generated script 440 is editable, so the user can change the parameters (e.g., maxwidth and/or maxheight).

Figure 4G:
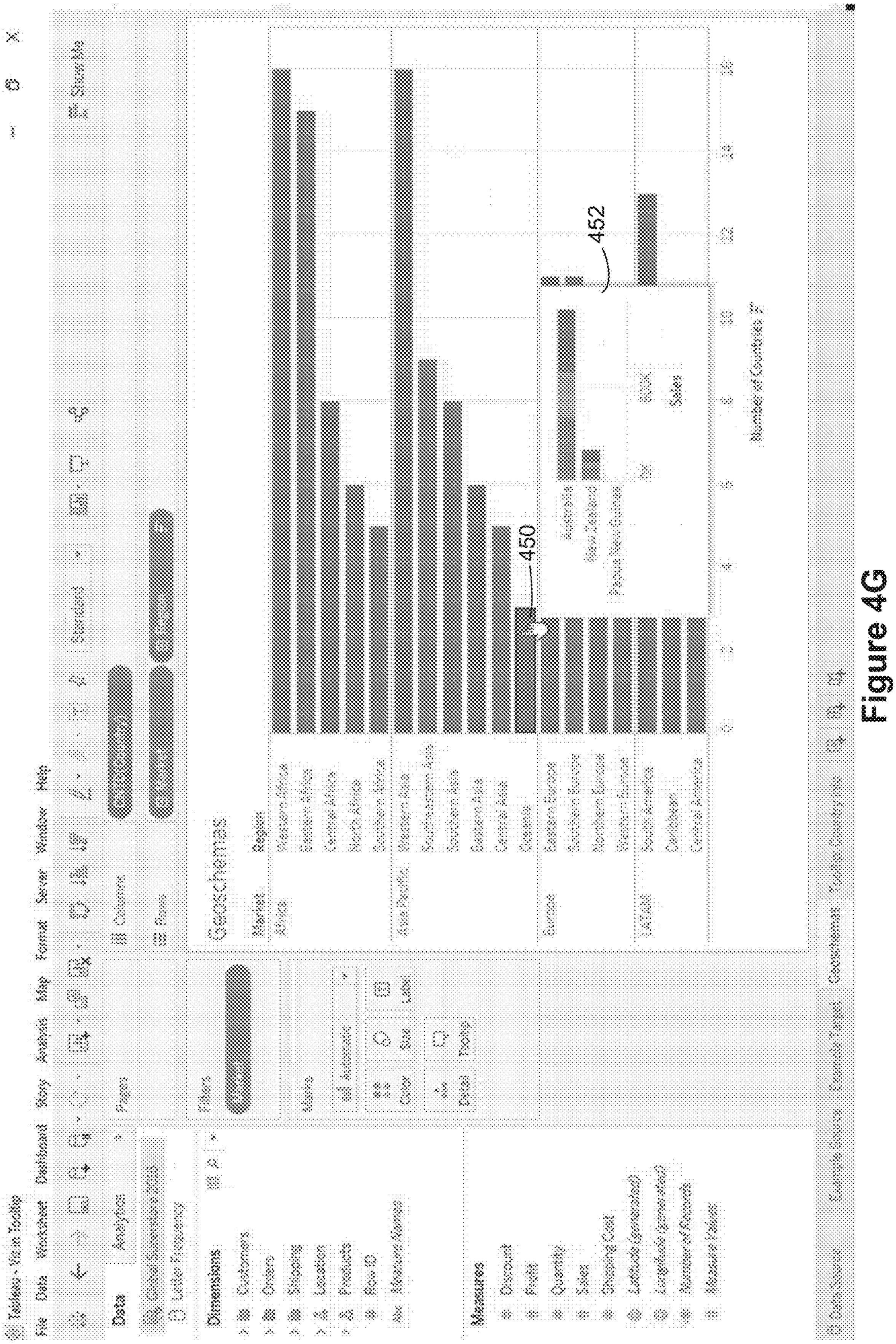

Once a tooltip definition 232 has been specified in the tooltip definition window 224, subsequent tooltips use this definition. FIG. 4G illustrates a tooltip 452 generated according to the script 440 shown in FIG. 4F. In response to a user input (e.g., hovering near or selecting the visual mark corresponding to "Oceania" 450) the tooltip 452 is displayed. In general, the tooltip partially overlays a portion of the data visualization 408. The tooltip shown in FIG. 4G includes a data visualization generated according to the worksheet "Tooltip: Country info" 406 in order to display more detail about the region Oceania. Note that the data visualization in the tooltip 452 is not the entire data visualization 402. Instead, the tooltip uses the data values for the select mark (Market="Asia Pacific" and Region="Oceania") to generate a secondary data visualization corresponding to the selection (i.e., limited to Australia, New Zealand, and Papua New Guinea). This allows a user to easily view, within the populated tooltip, more information related to the selected visual mark 450.

Figure 4H:
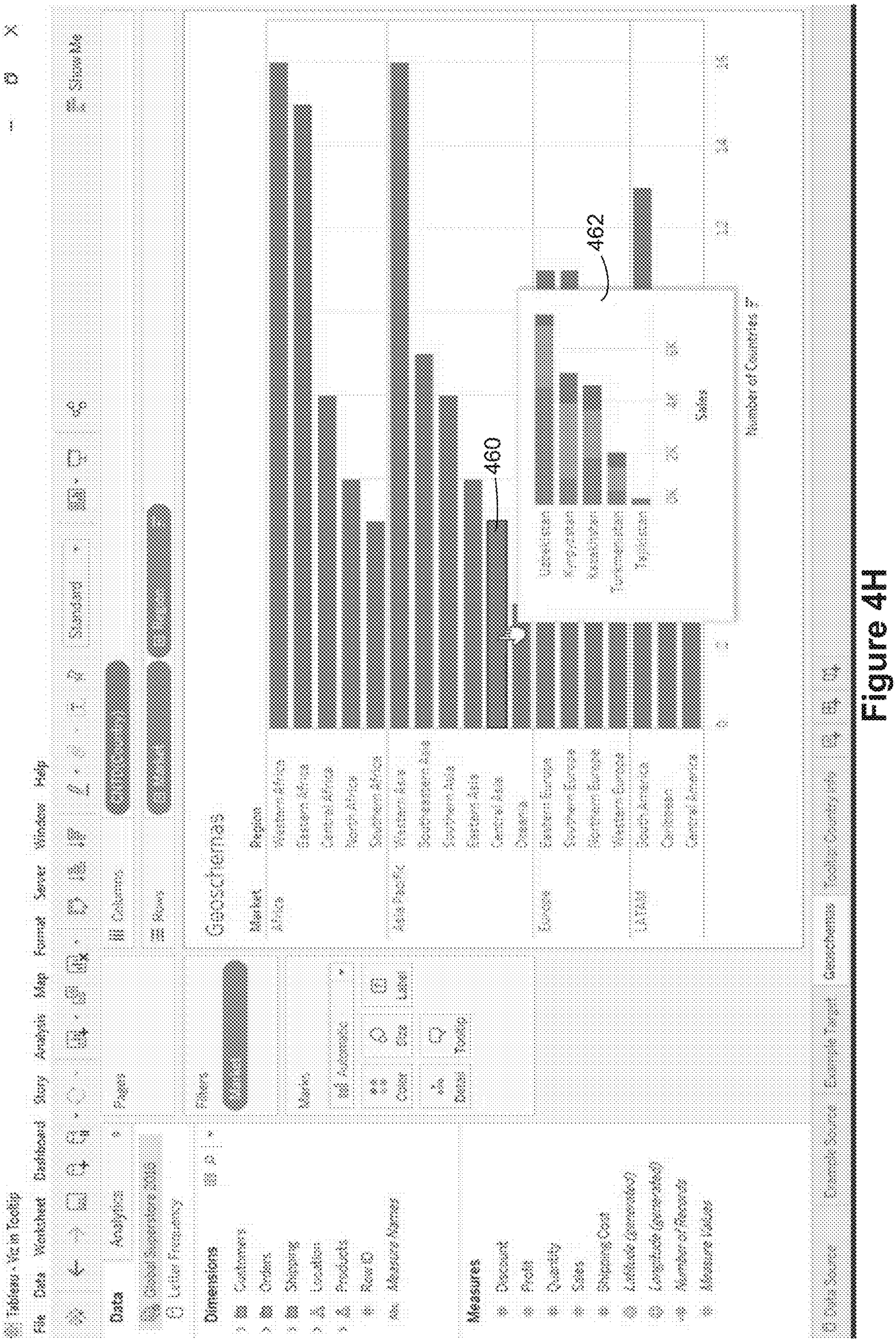

When the user makes a new selection (e.g., hovering near or clicking on a different visual mark), the tooltip dynamically updates its contents based on the newly selected mark. This is illustrated in FIG. 4H, where the user has moved the mouse cursor to the visual mark 460 for "Cnetral Asia." The tooltip generation module 234 generates a second tooltip 462 according to the data values of the selected visual mark 460. This displays more detailed information about the Central Asia region. As a user changes the user input (e.g., hovers over different regions), the secondary data visualization in the tooltip dynamically updates according to the data values of the selected visual mark.

Figure 5A:
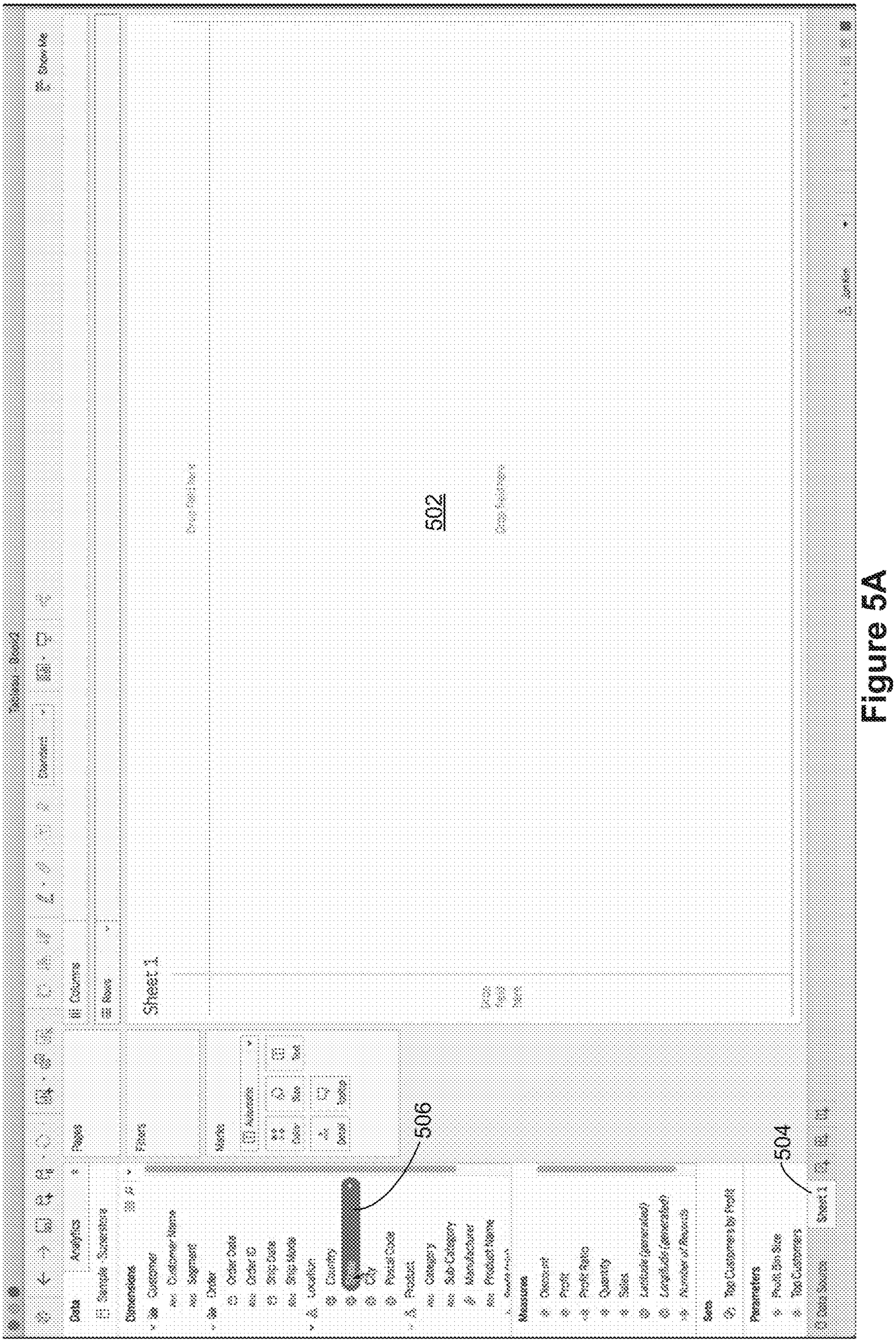
FIGS. 5A-5T illustrate a series of graphical user interfaces for building data visualizations and tooltips according to some implementations.
Figure 5B:
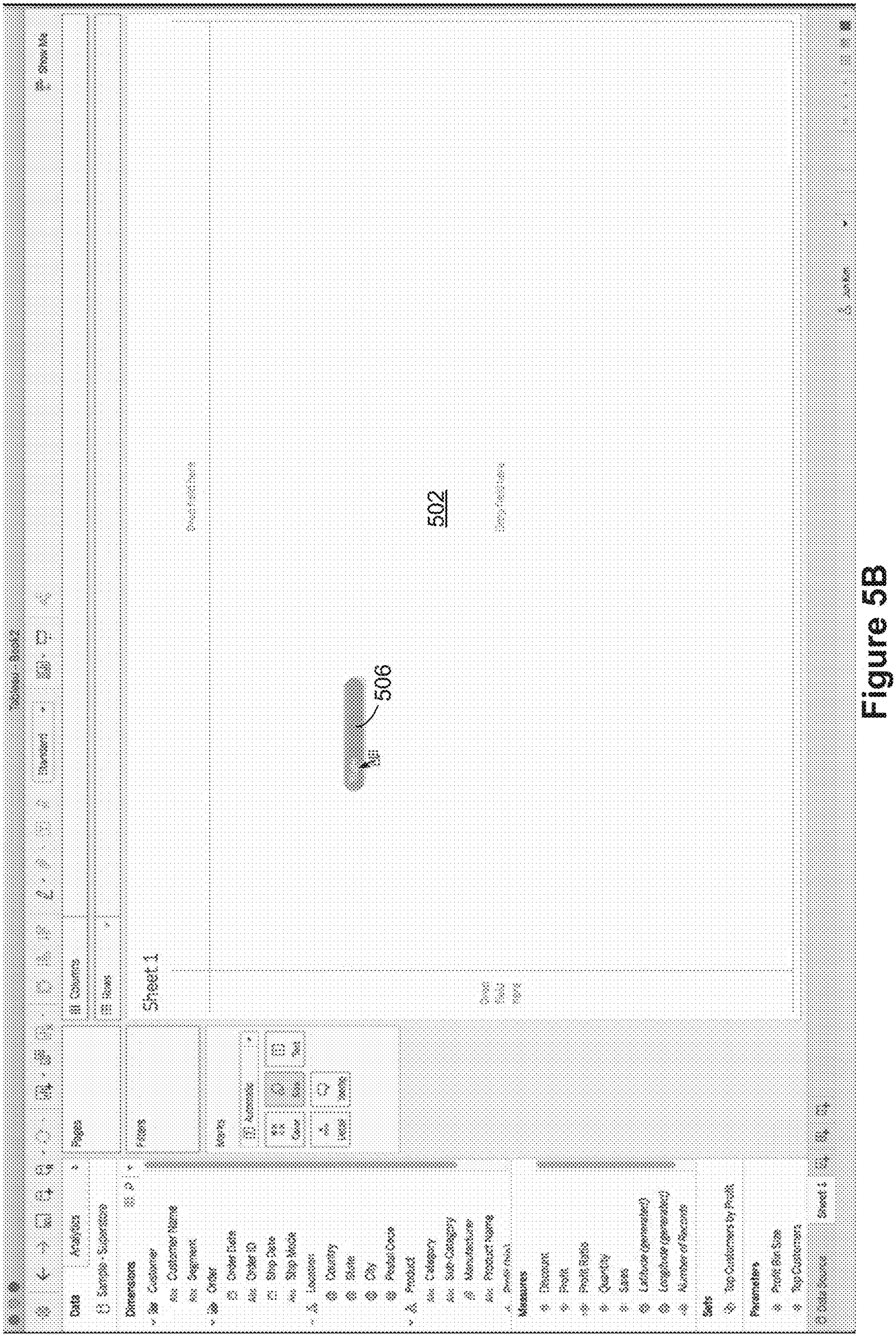
Figure 5C:
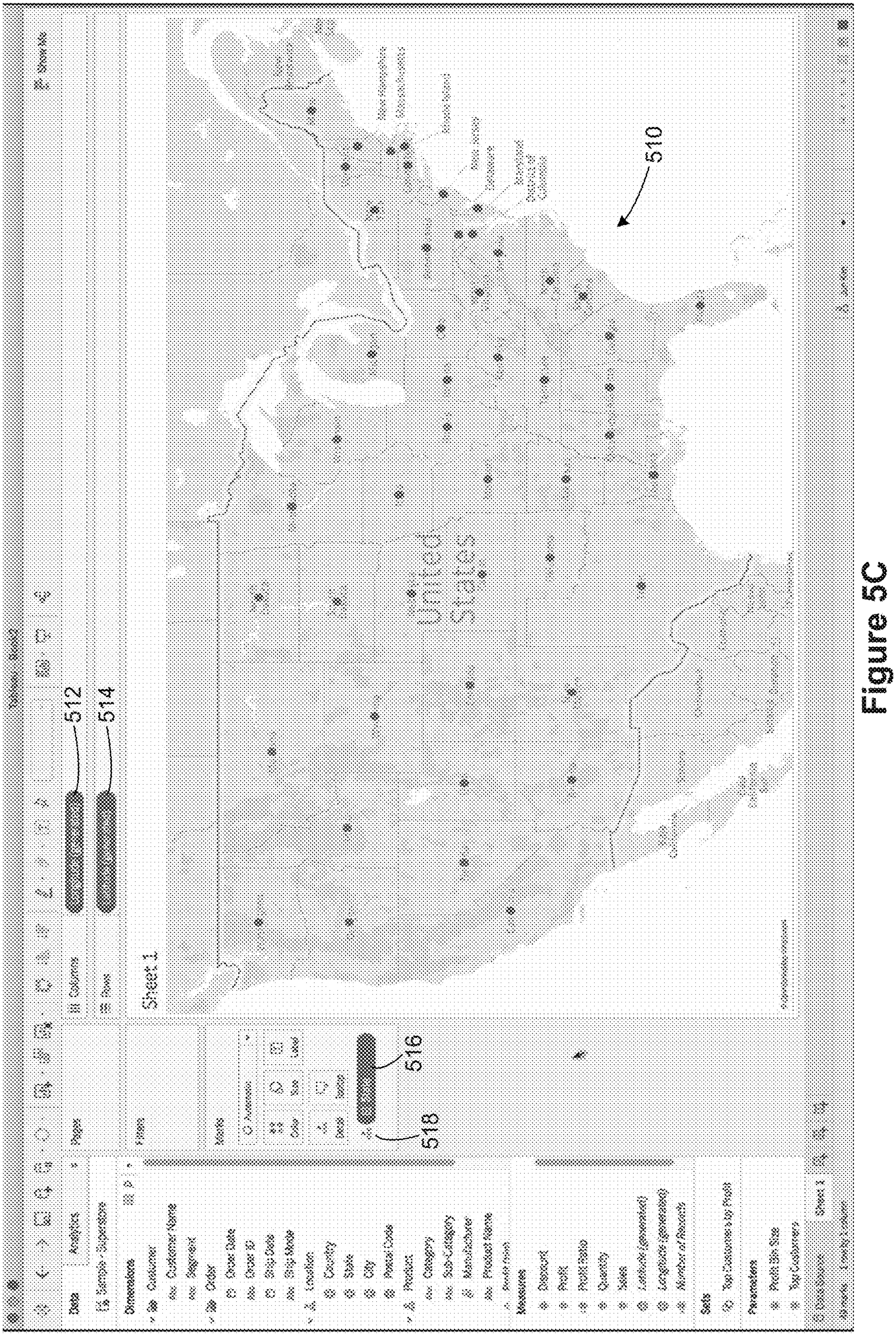
Figure 5D:
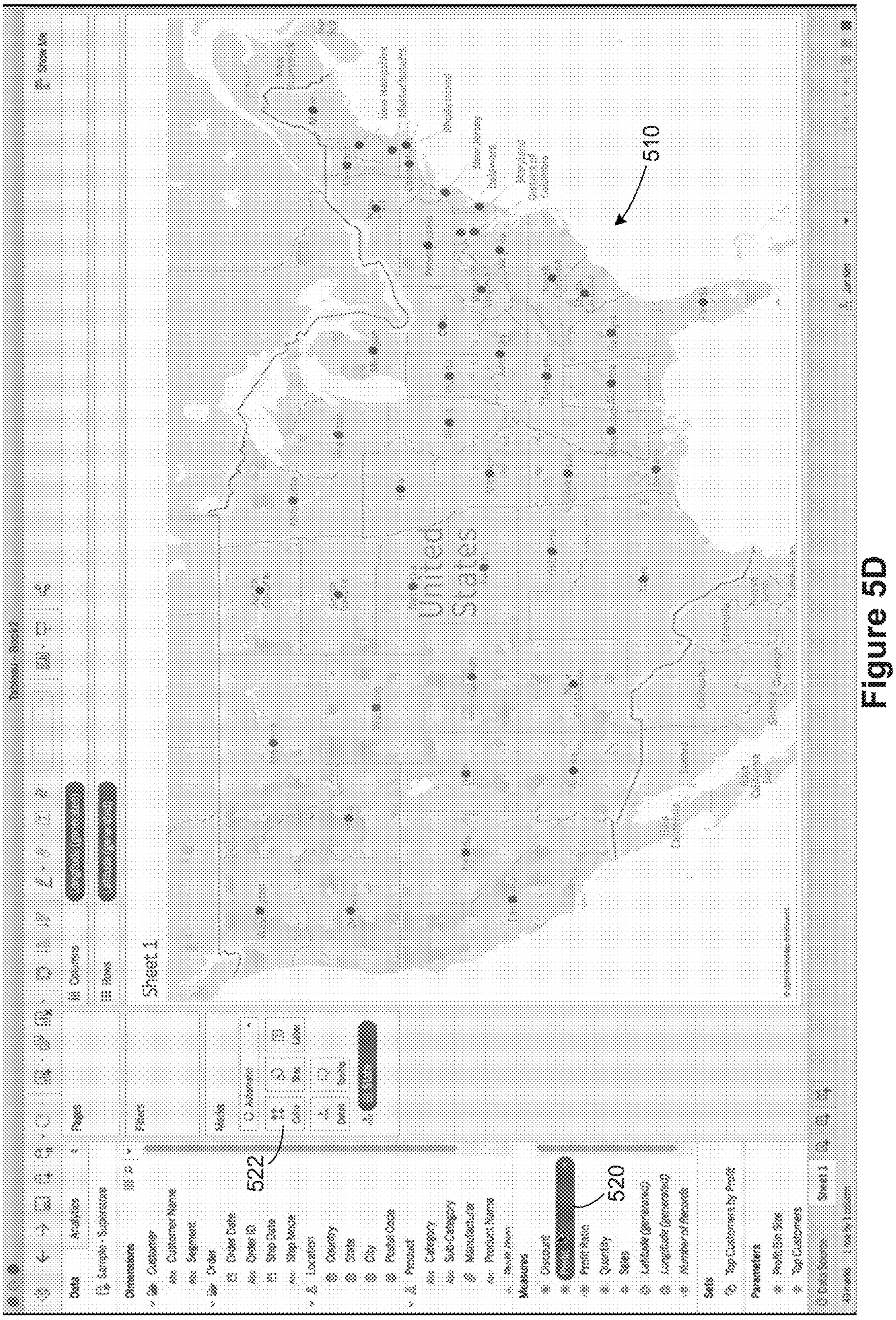
Figure 5E:
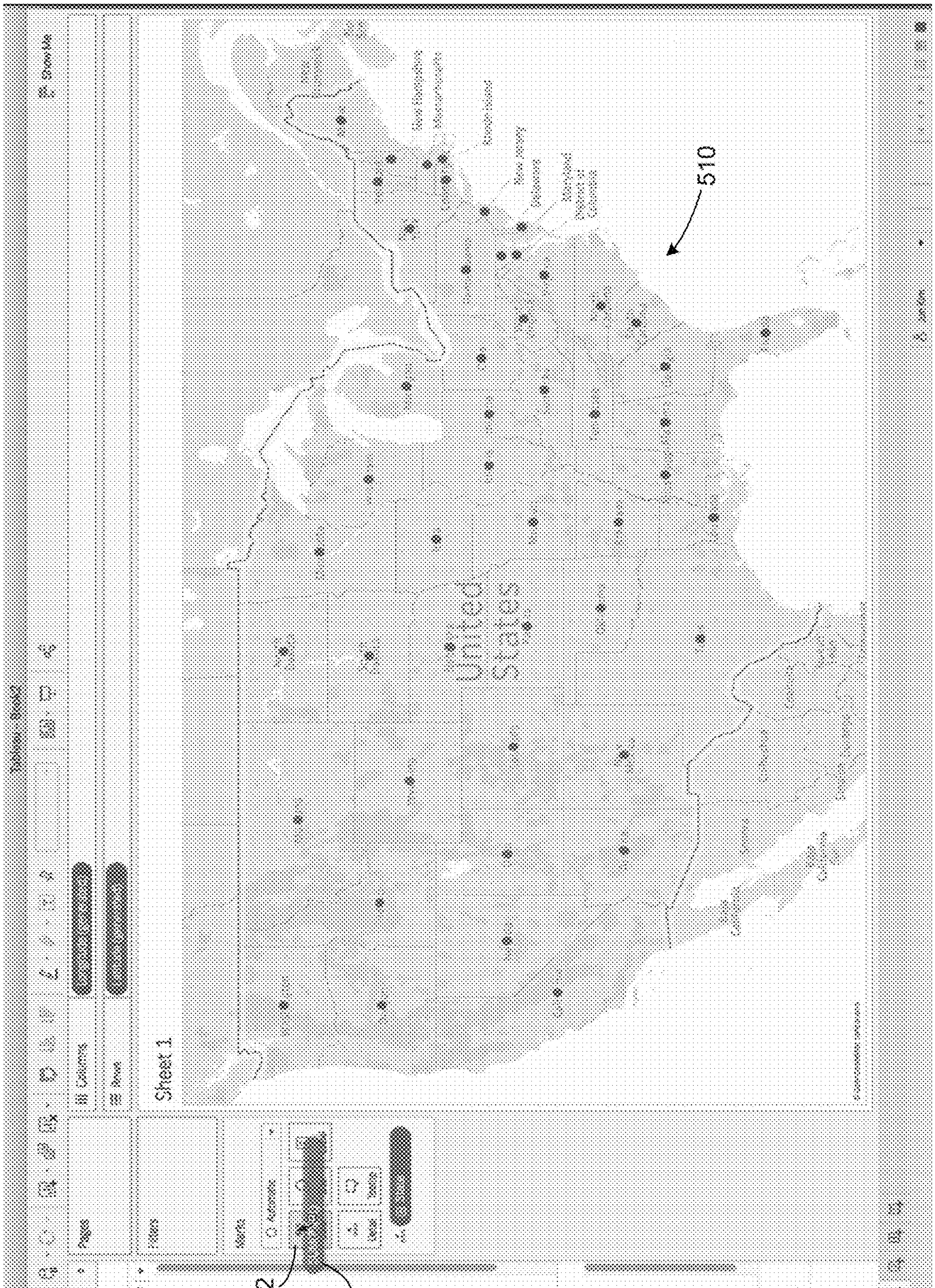
Figure 5F:
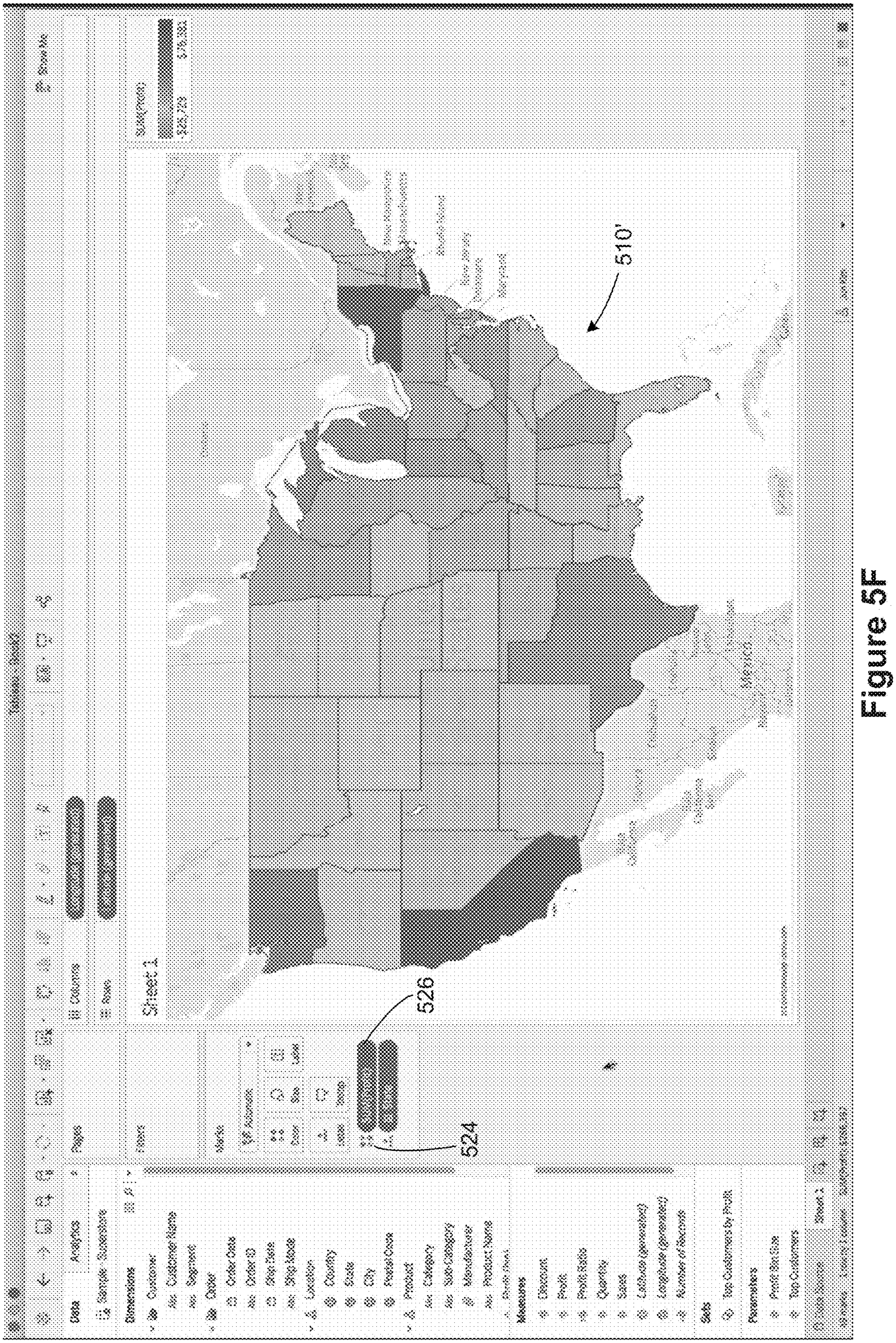
Figure 5G:
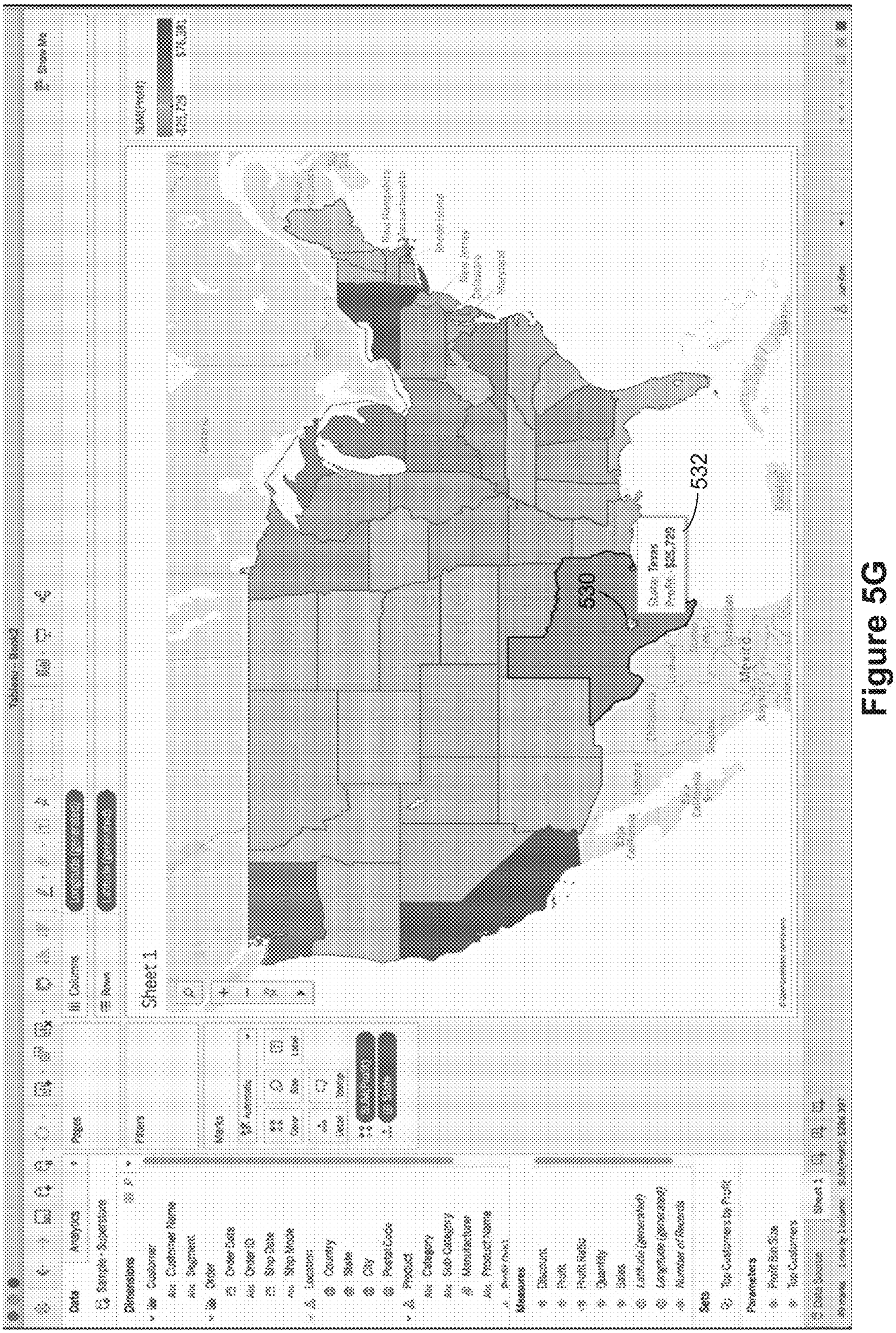
Figure 5H:
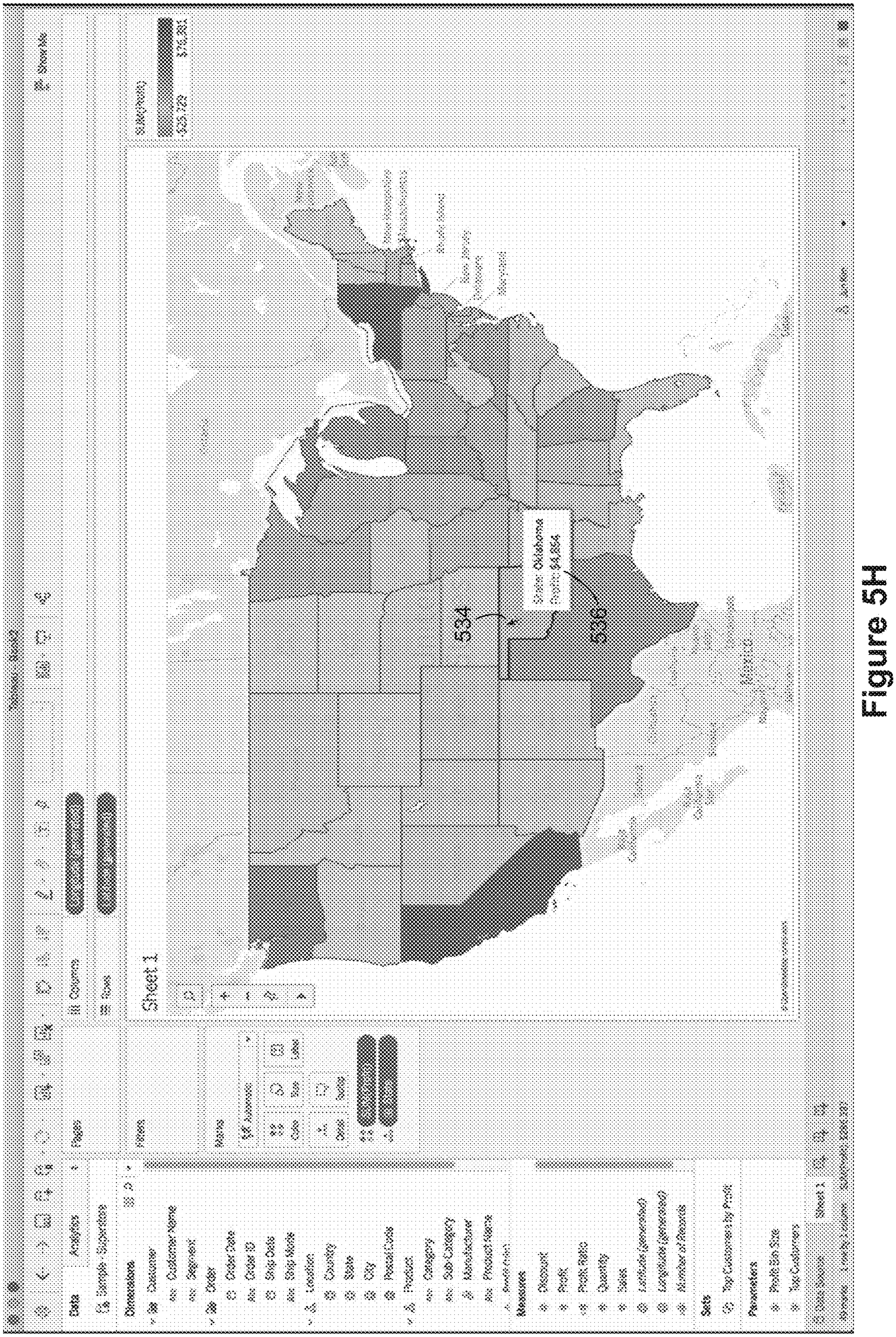
Figure 5I:
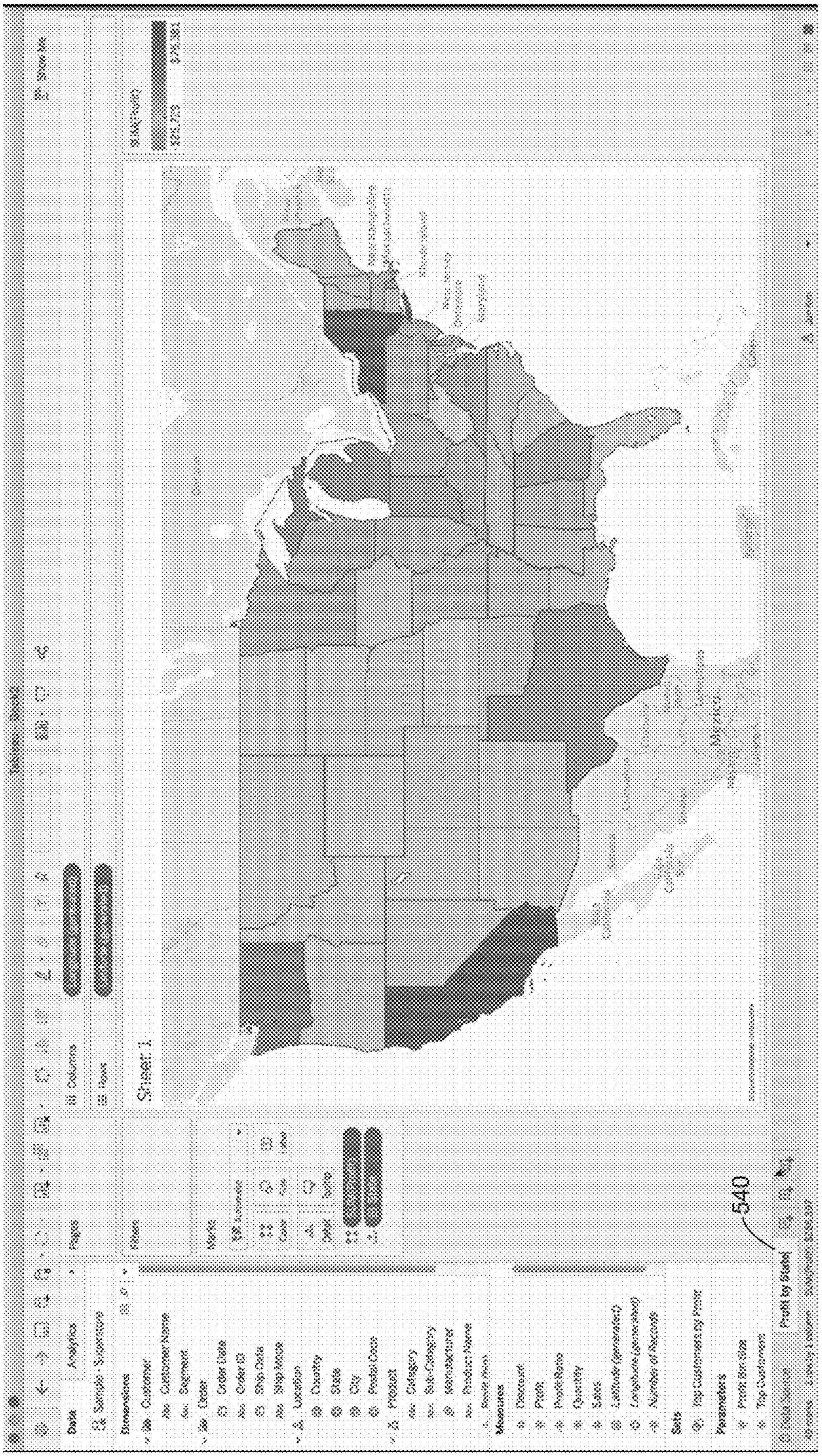
Figure 5J:
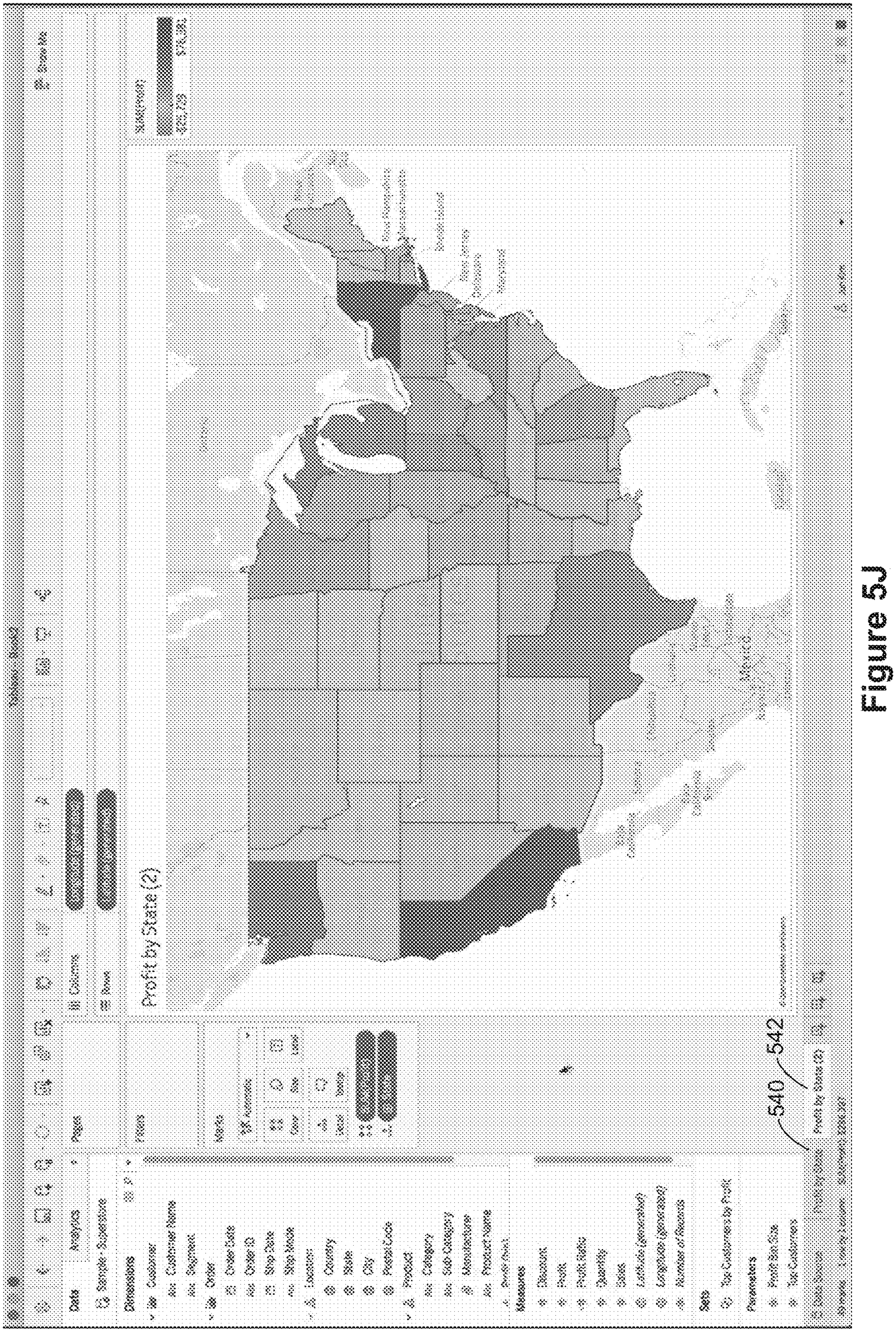
Figure 5K:
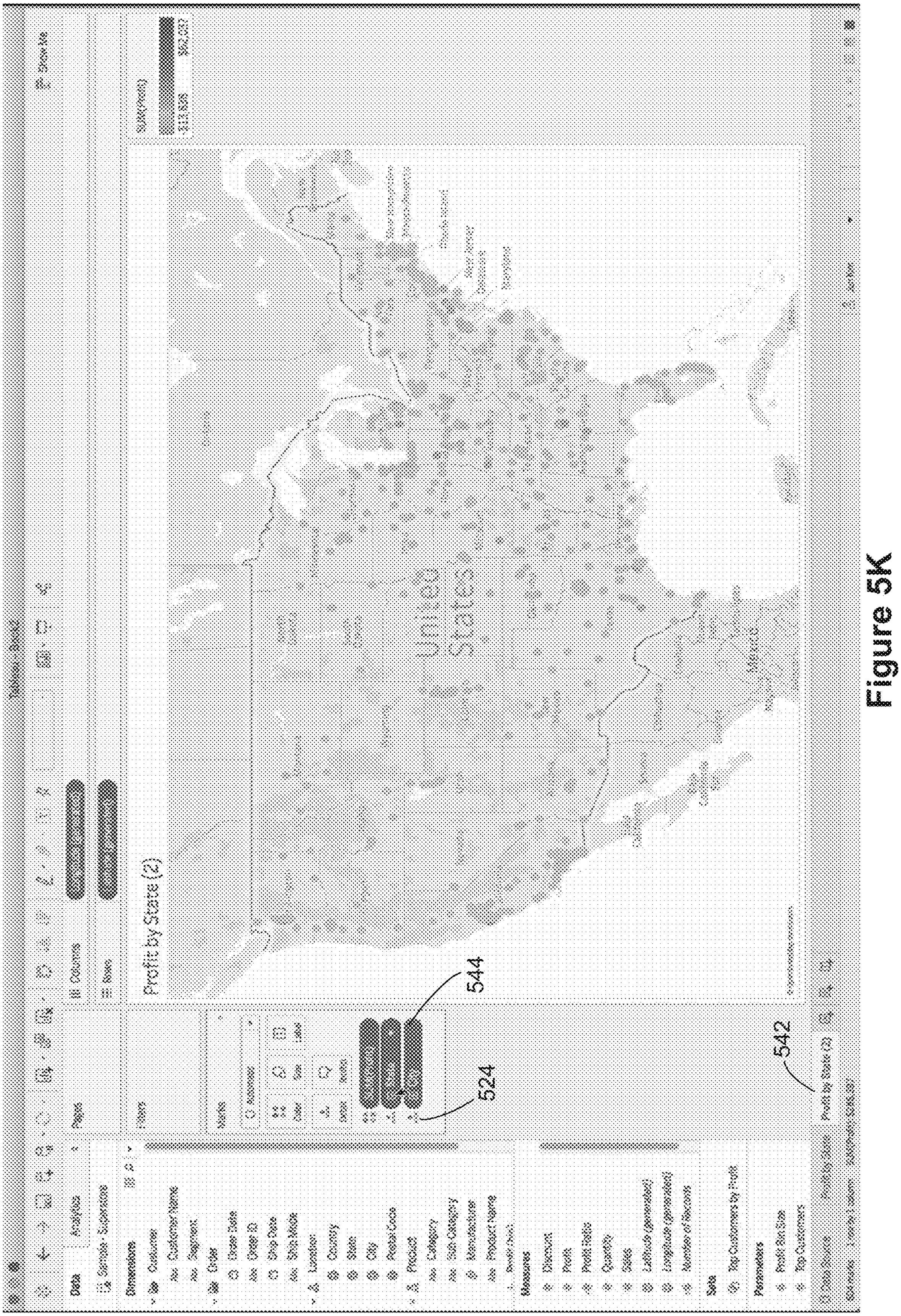
Figure 5L:
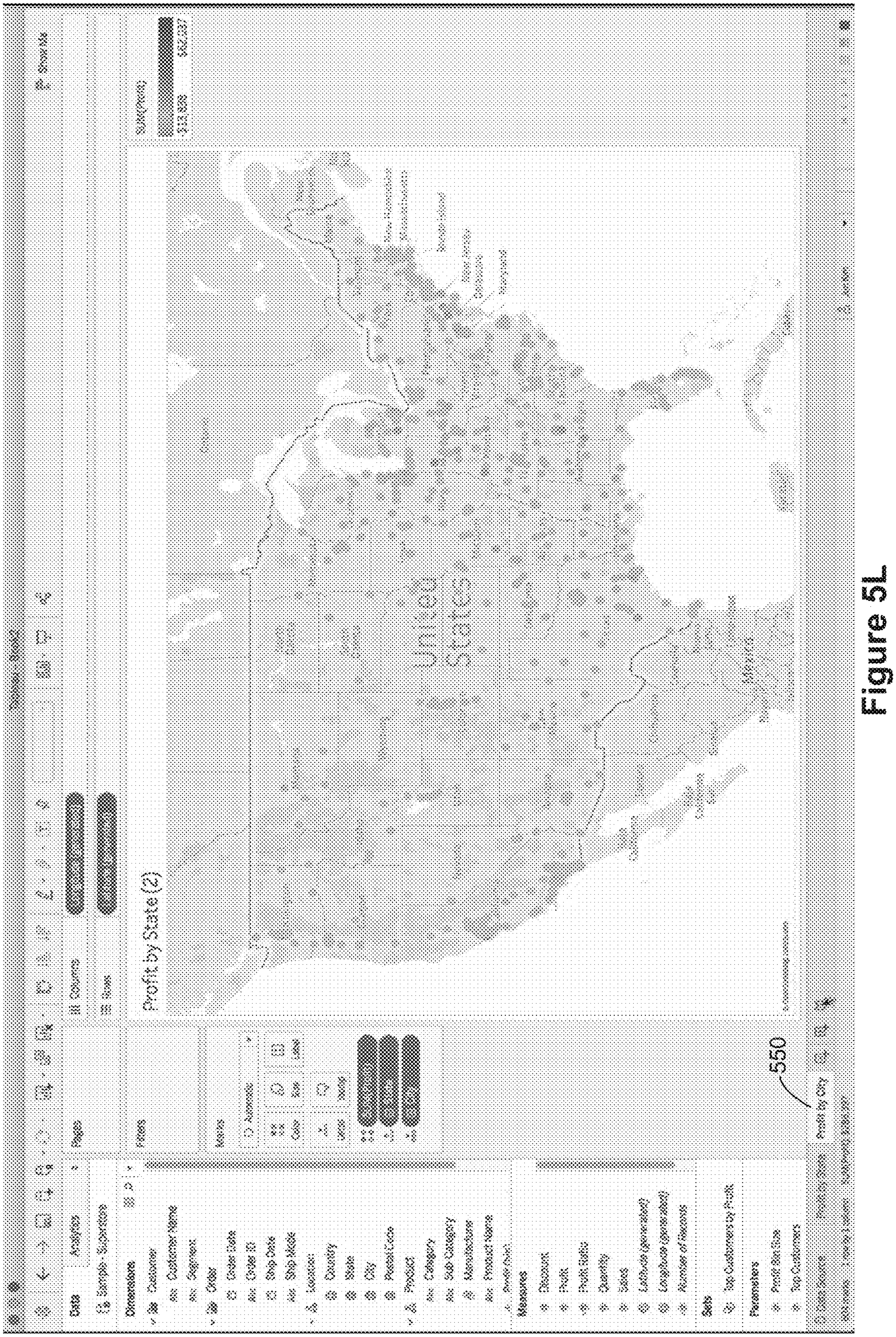
Figure 5M:
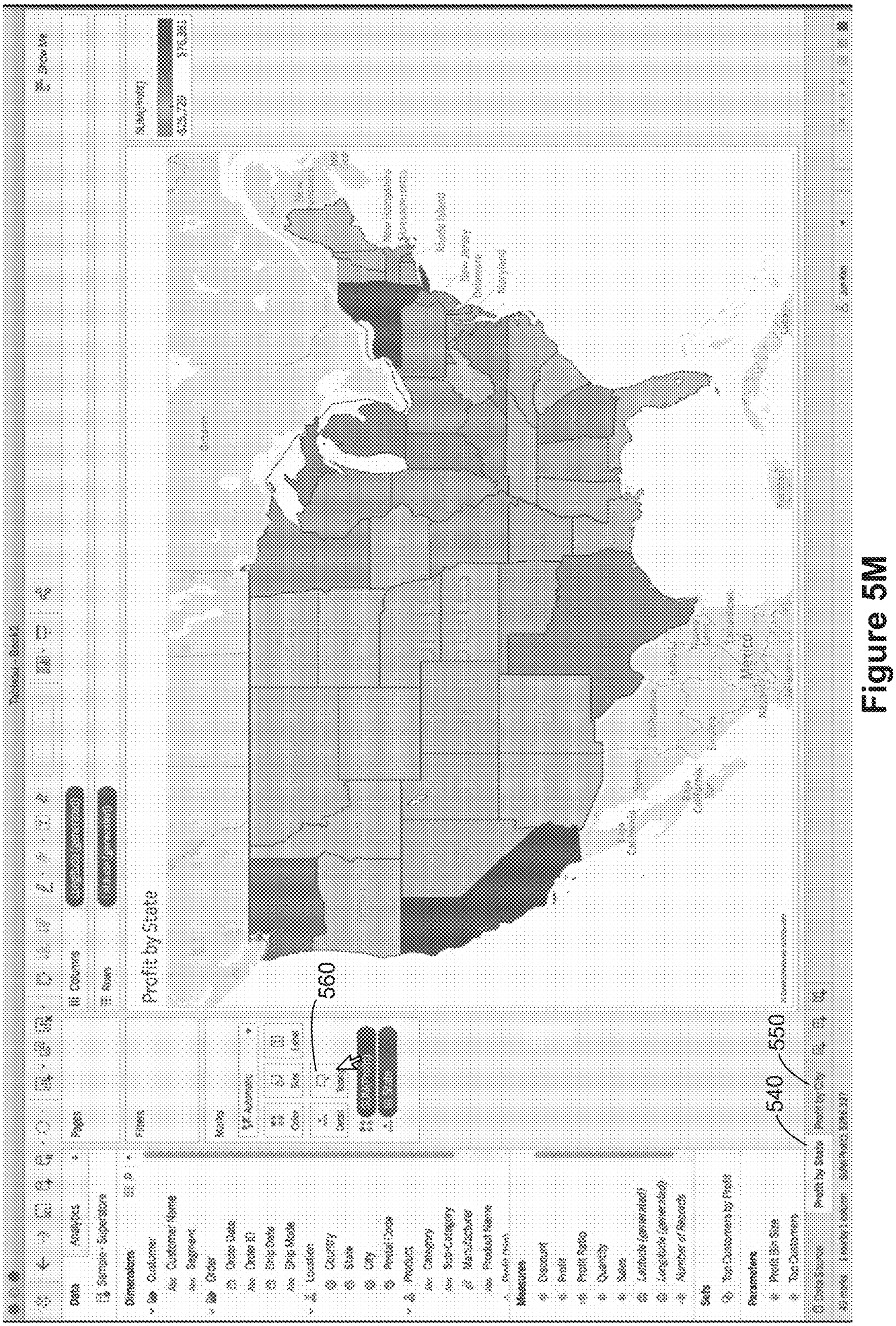
Figure 5N:
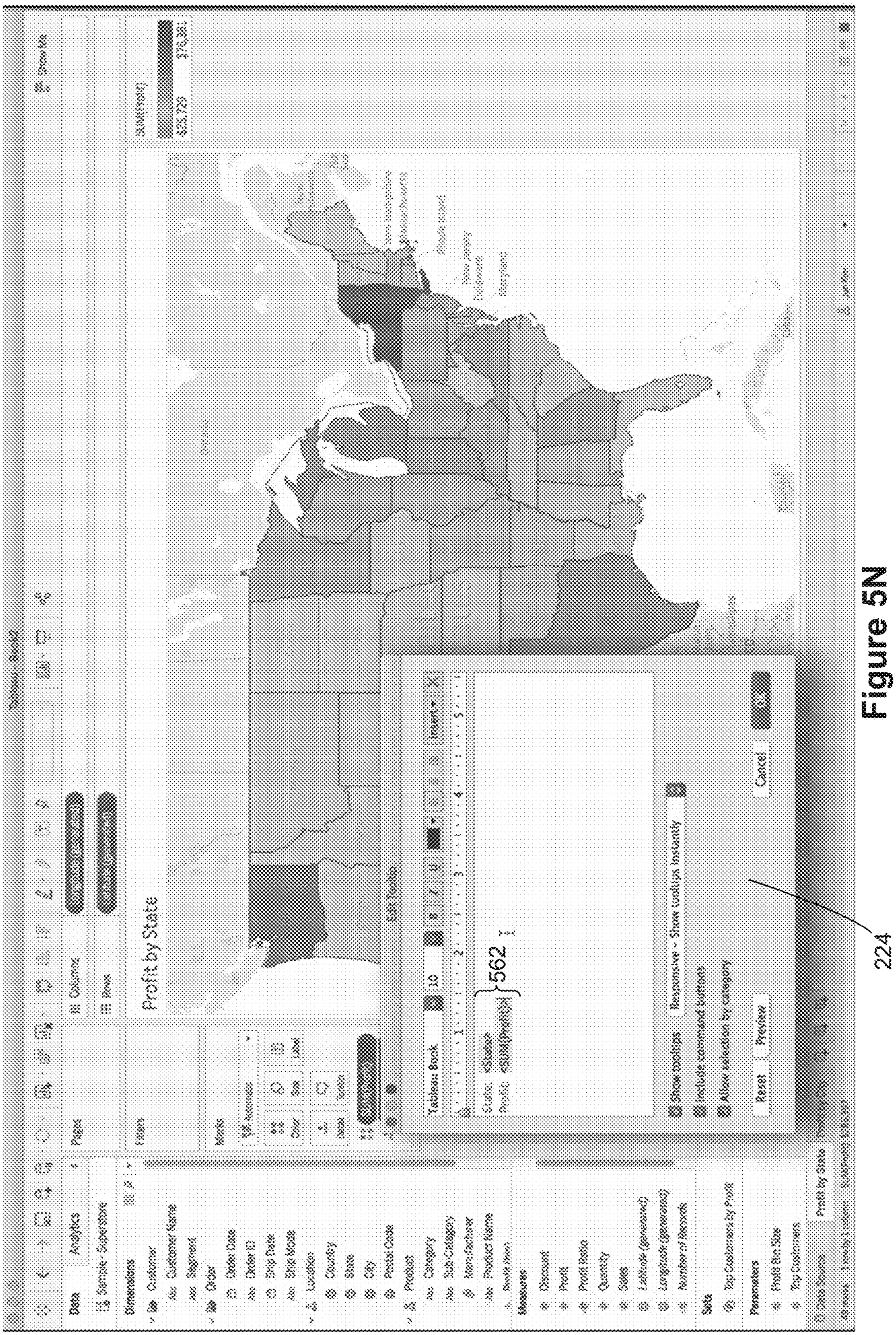
Figure 5O:
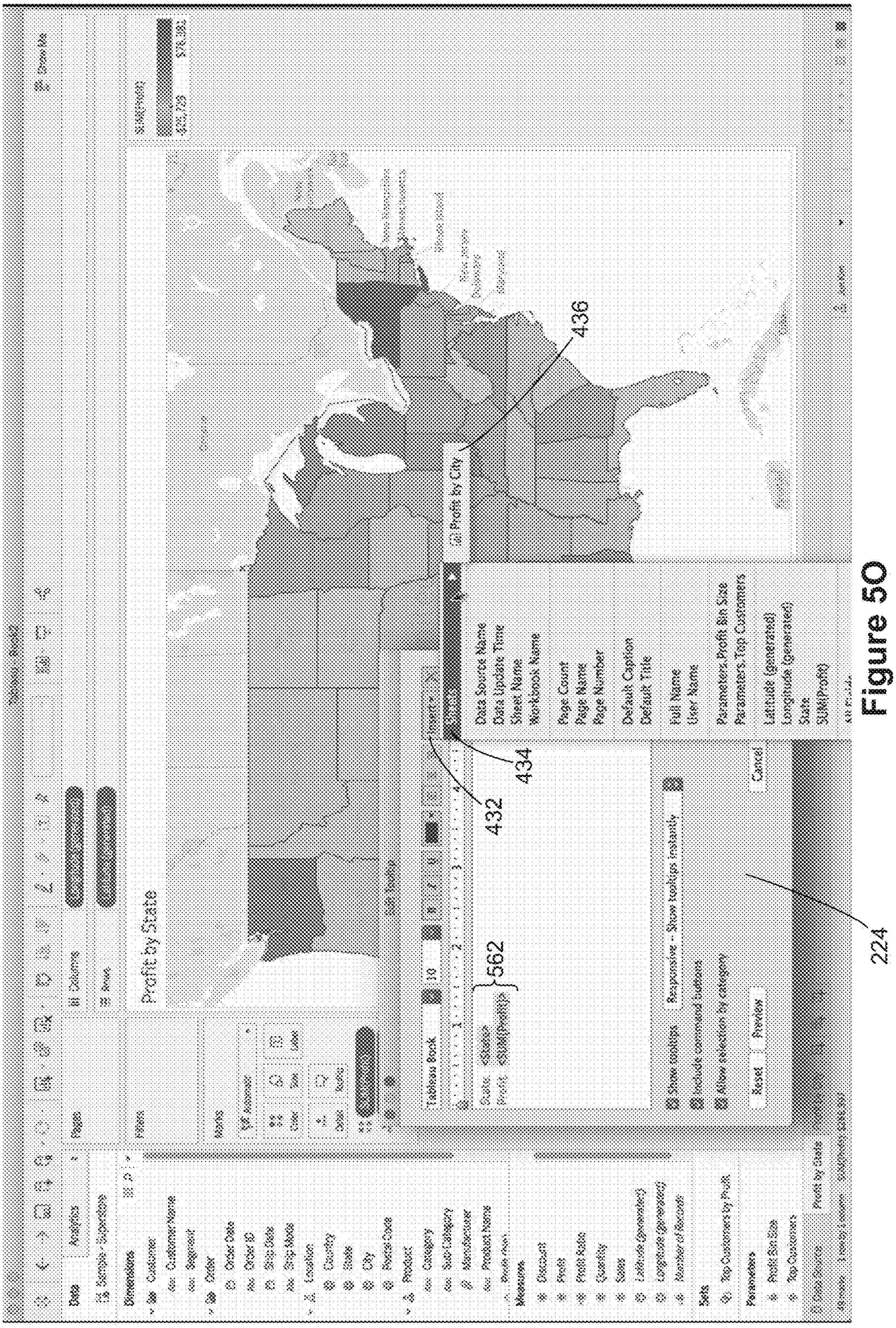
Figure 5P:
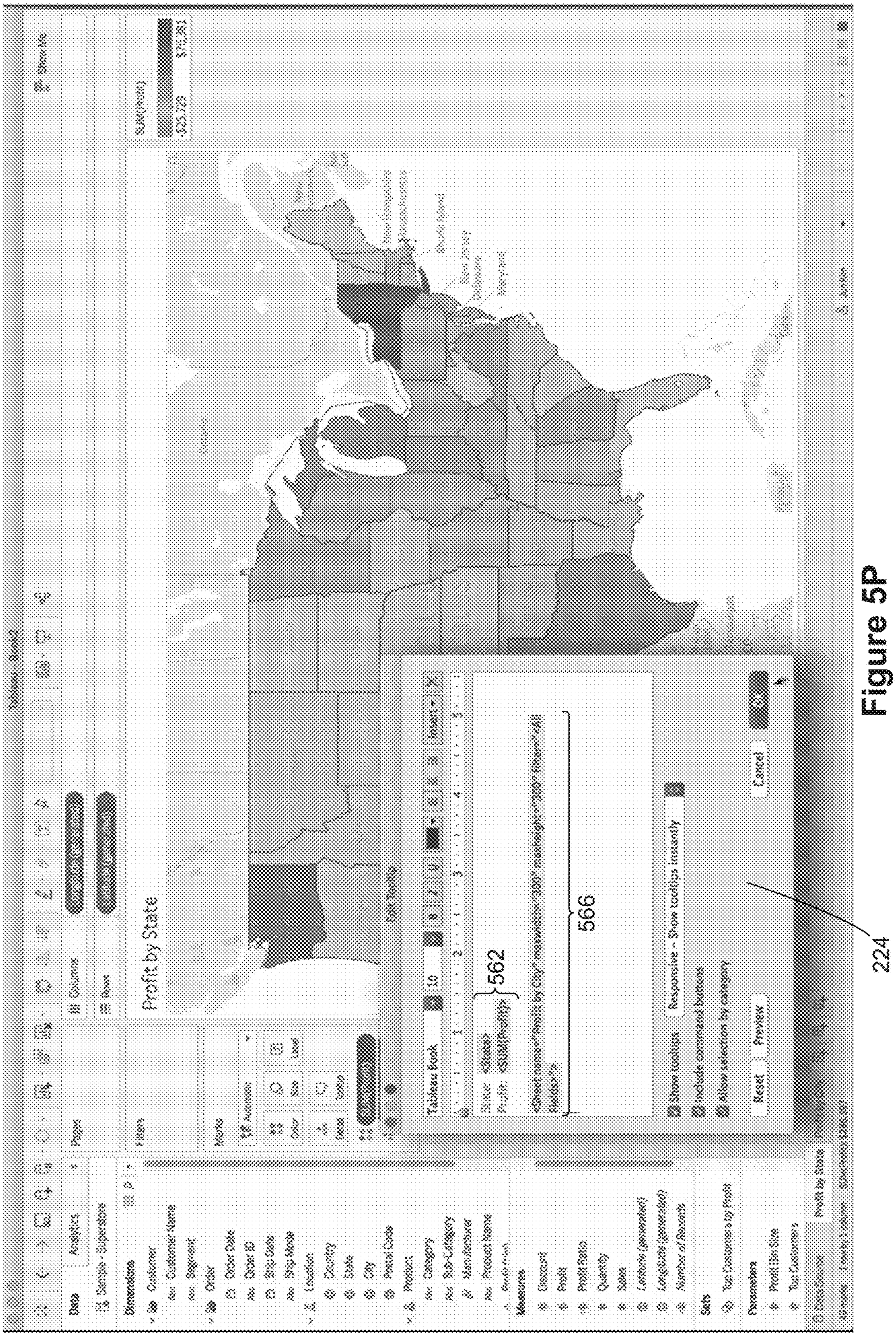
Figure 5Q:
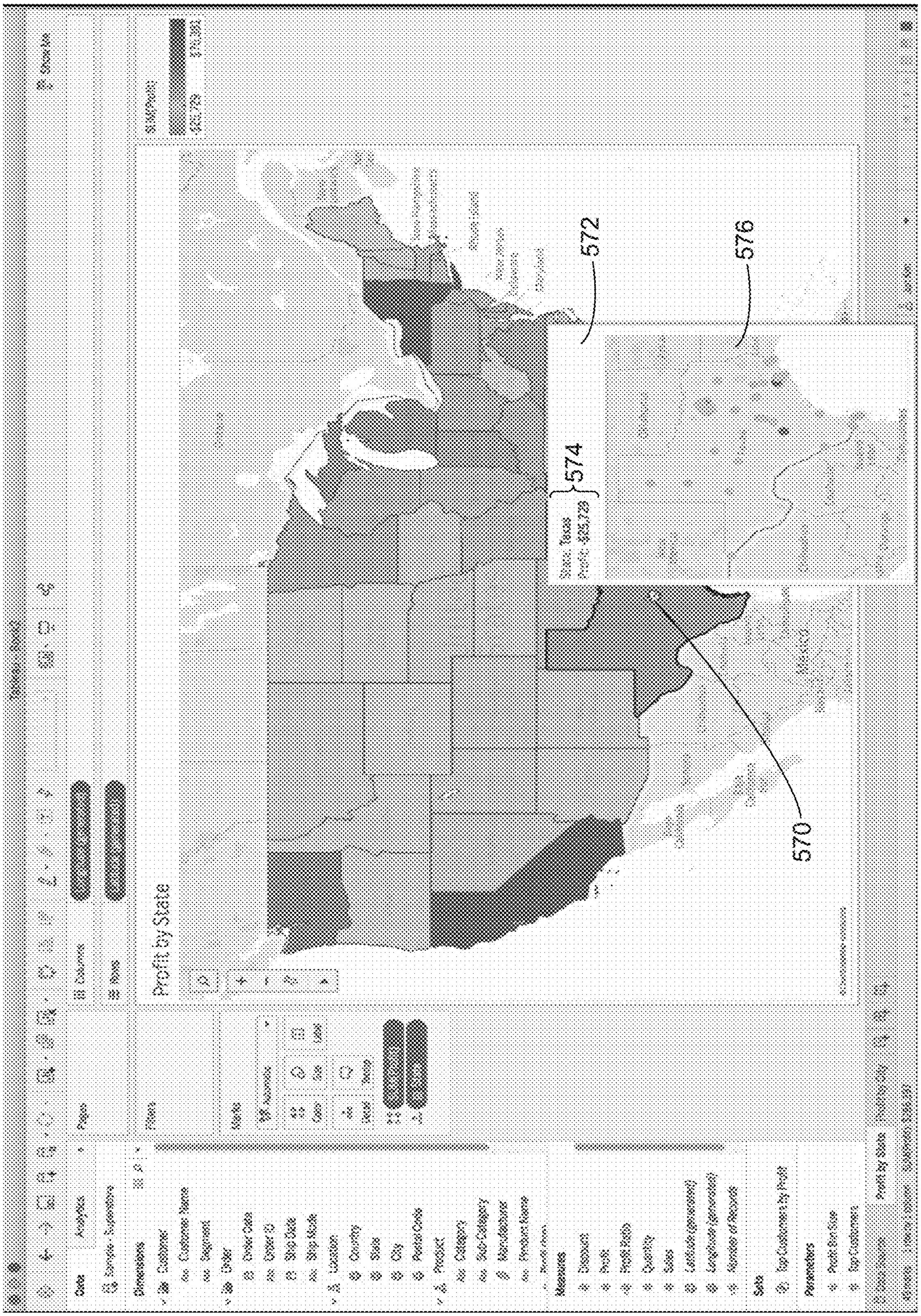
Figure 5R:
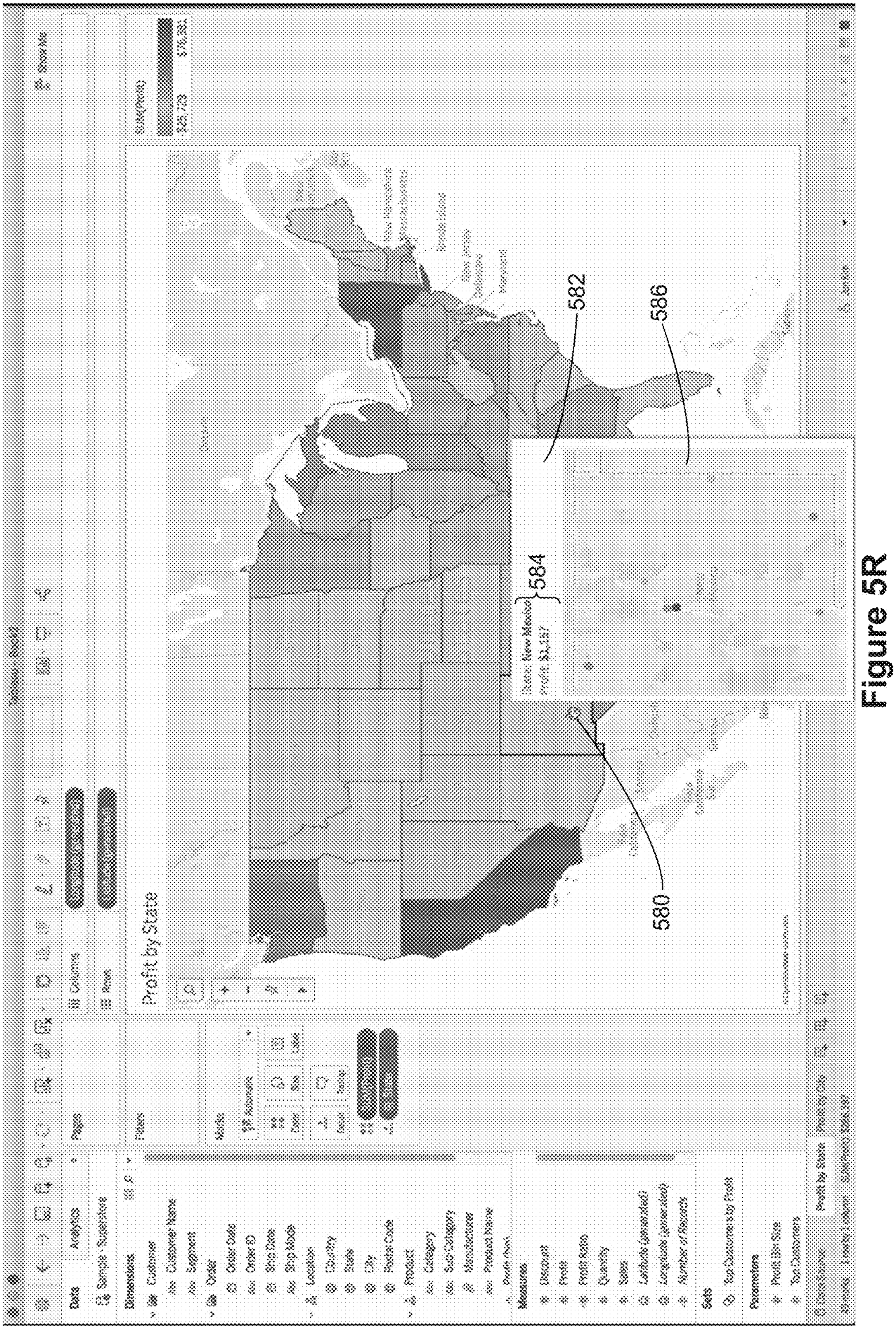
Figure 5S:
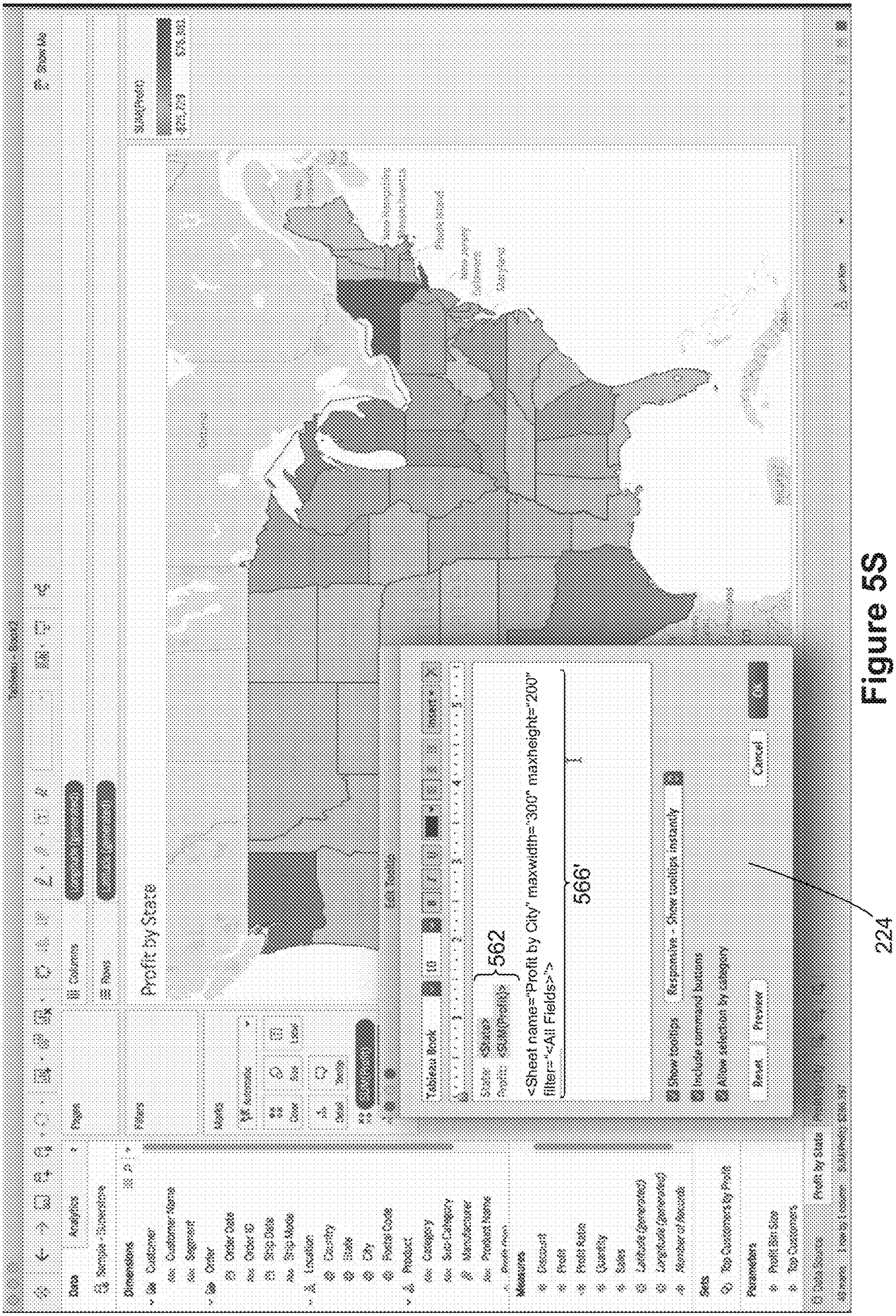
Figure 5T:
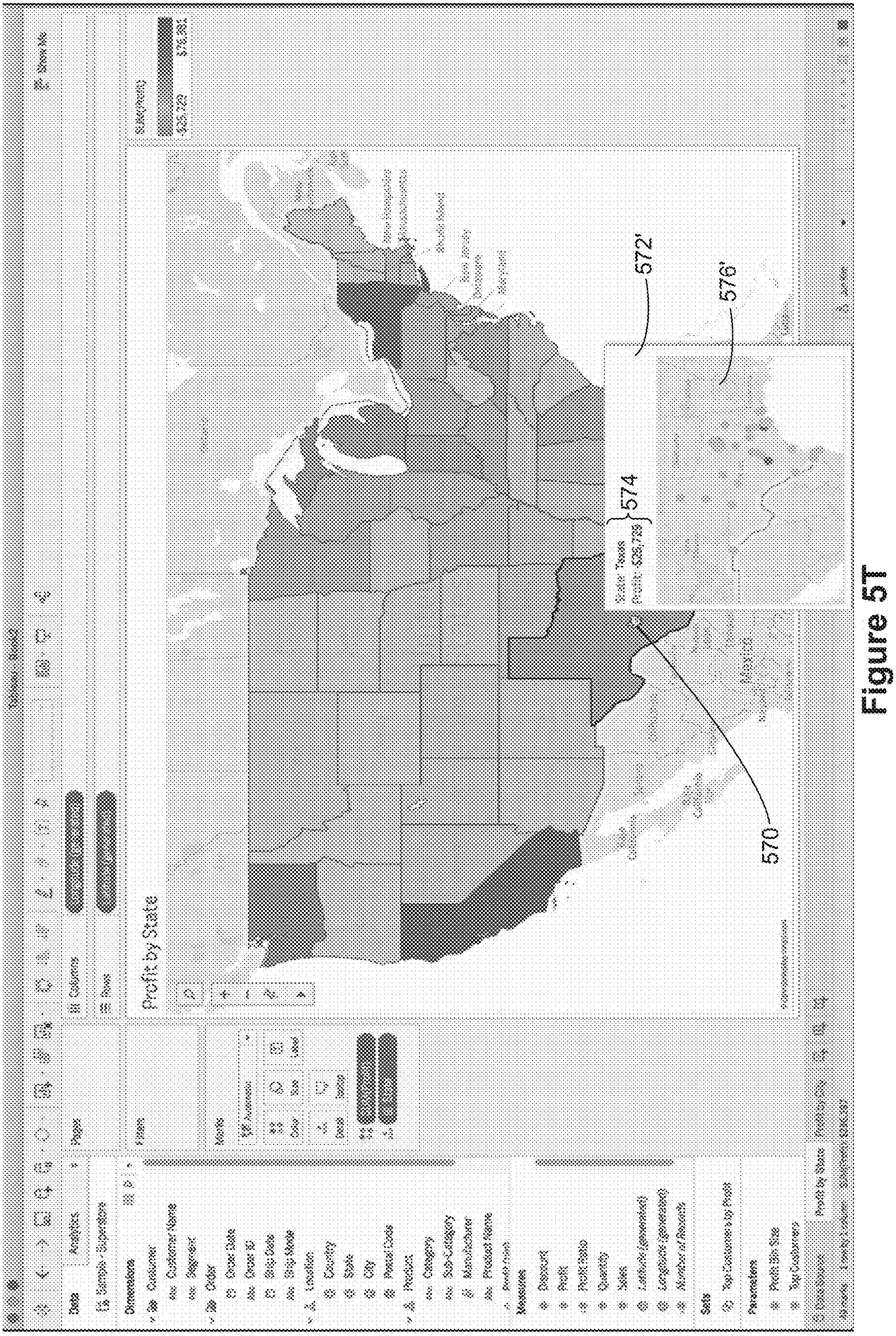

FIGS. 5A-5T illustrate a series of graphical user interfaces for building data visualizations and tooltips according to some implementations. In FIG. 5A there is no data visualization in the data visualization region 502 yet because the user has not yet selected any data fields. The data visualization region 502 is displayed on a first data visualization worksheet 504, which is labeled "Sheet 1" by default. As shown in this figure, a user has selected the "State" data field 506 and has begun dragging this field to the data visualization region. In FIG. 5B, the user has dragged the State date field 506 to the canvas (the data visualization region 502). In this example, the State data field is designated as a location, so dropping the data field 506 on the canvas results in the creation of a map data visualization 510. The calculated field Longitude 512 is placed on the Columns shelf, and the calculated field Latitude 514 is placed on the Rows shelf. In addition, the state field is used to specify the level of detail for the data visualization. This is illustrated by the State pill 516 adjacent to the level of detail indicator 518.

In FIG. 5D, the user has selected the Profit data field 520, and has begun dragging the Profit data field 520 to the color encoding icon 522. In FIG. 5E, the user drops the Profit data field 520 onto the color encoding icon 522. Because Profit is a measure, the default behavior is to compute a sum, so "SUM(Profit)" is displayed for the Profit data field 520 as it is dragged and dropped. FIG. 5F illustrates that each state is now colored according to the profit within that state, creating a modified data visualization 510'. At the same time, the SUM(profit) pill 526 is displayed adjacent to the color encoding indicator 524, which indicates visually that color encoding is being used and how it is being used. Within the series of FIGS. 5A-5T to illustrate tooltips, the modified data visualization 510' is referred to as the primary data visualization.

FIGS. 5G and 5H show the default tooltip behavior according to some implementations. In response to a first user input 530 over Texas (e.g., hovering), the tooltip generation module 234 generates and displays a first tooltip 532, which identifies Texas as the selected state and specifies the profit for Texas, as illustrated in FIG. 5G. In response to a second user input 534 over Oklahoma, the tooltip generation module 234 generates and displays a second tooltip 536, which identifies Oklahoma as the selected state and specifies the profit for Oklahoma. As illustrated in these two examples, a tooltip displays more detailed information related to the corresponding user input.

In Figure SI, the user renames the worksheet, changing it from "Sheet 1" 504 to "Profit by State" 540. In FIG. 5J the user has duplicated the "Profit by State" worksheet 540 to create another worksheet labeled "Profit by State (2)" 542. The user then proceeds to modify the second worksheet 542. In this case, the user adds the City data field to the level of detail, as illustrated by the "City" pill 544 adjacent to another level of detail indicator 524. Because City has been added to the level of detail (which is more granular than state), the color encoding now applies to individual cities. That is, each city is colored according to the profit associated with that city. After this change, the user renames the second worksheet "Profit by State (2)" to "Profit by City" 550, as illustrated in FIG. 5L. This data visualization on the "Profit by City" worksheet 550 will be used within a tooltip for the first worksheet "Profit by State" 540, so the data visualization on the "Profit by City" worksheet 550 is sometimes referred to as a secondary data visualization.

FIGS. 5M-5P illustrate adding a secondary data visualization to a tooltip. As shown in FIG. 5M, a user invokes the tooltip definition window 224 by selecting the tooltip icon 560. This brings up the tooltip definition window 224, as illustrated in FIG. 5N. The default tooltip script 562 specifies information identifying each state and the profit for the state (as illustrated by the tooltip renderings in FIGS. 5G and 5H above). In FIG. 5O, the user selects the "Insert" menu 432 and the "Sheets" menu item 434 to bring up a list 436 of the other worksheets that could be included in the tooltip. Because this is a tooltip for the "Profit by State" worksheet 540, the only available worksheet is the worksheet "Profit by City" 550. When this is selected, the worksheet reference 566 is added to the tooltip script in the tooltip definition window 224, as illustrated in FIG. 5P.

FIGS. 5Q and 5R illustrate the display of tooltips based on the updated tooltip definition 232. In FIG. 5Q, the user input 570 is in Texas, so the tooltip generation module generates and displays a tooltip 572 for Texas. Generating the tooltip 572 uses the data value "Texas" for the data field "State." As in FIG. 5G, some data 574 is displayed for the state. In addition, the data visualization from the referenced worksheet "Profit by City" 550 is displayed in the tooltip 572. However, rather than displaying the data visualization for the entire United States as shown in FIG. 5L, the secondary data visualization 576 in the tooltip is filtered according to the selected state ("Texas").

FIG. 5R is similar to FIG. 5Q, but the user has selected "New Mexico" 580, so the displayed tooltip 582 has data for New Mexico, including textual data 584, and a secondary data visualization 586.

FIGS. 5S and 5T illustrates modifying a parameter within a worksheet reference to change how the embedded data visualization is displayed. As shown in FIG. 5S, the user has reopened the tooltip definition window 224 and changed the "maxheight" parameter from 300 to 200. The updated worksheet reference 566' is then used the next time the tooltip is triggered, as illustrated in FIG. 5T. Because the maxheight for the secondary data visualization is smaller, the overall tooltip size is smaller for the modified tooltip 572' versus the previous tooltip 572 in FIG. 5Q.

Figure 6A:
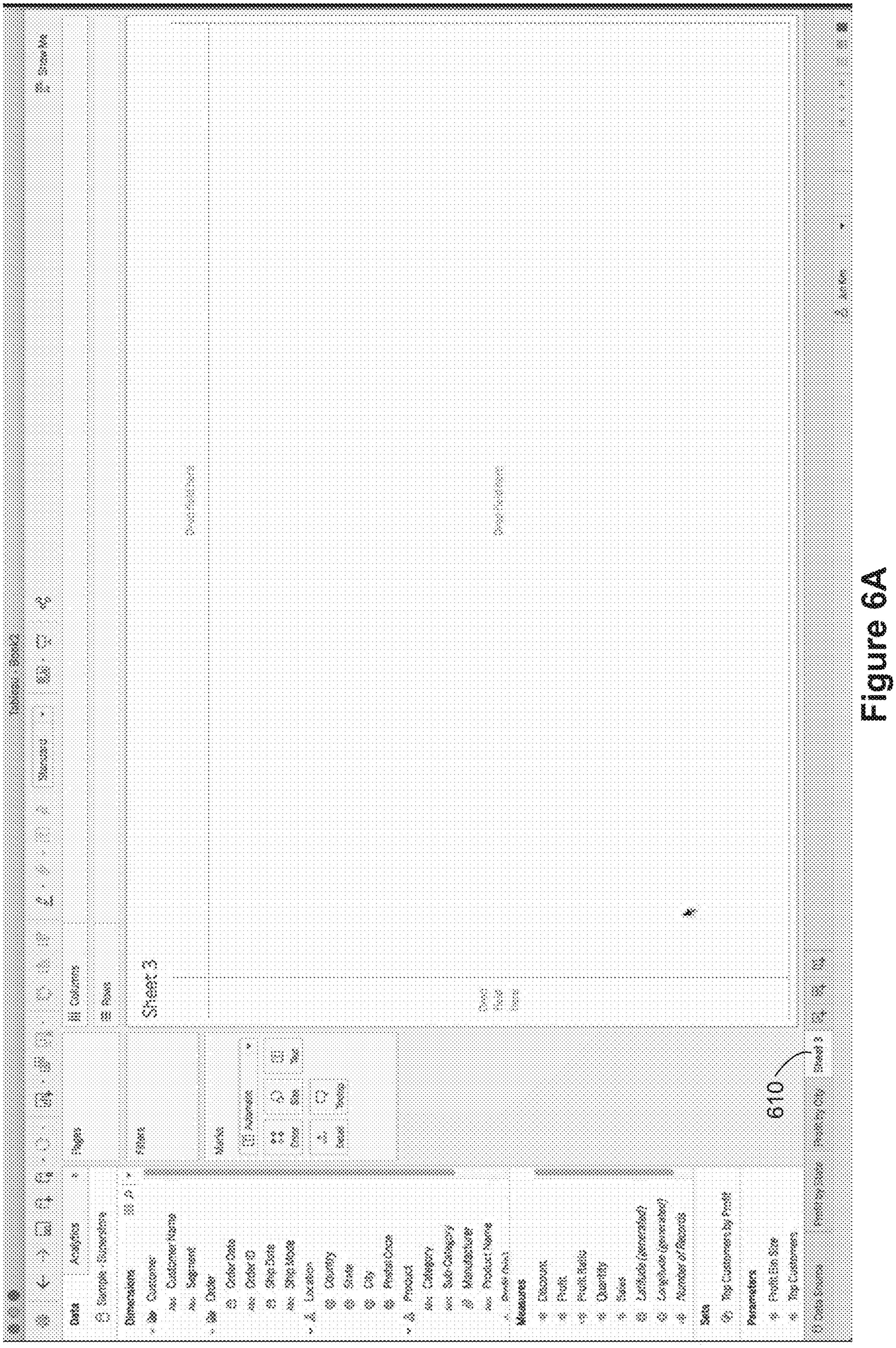
FIGS. 6A-6N illustrate another series of graphical user interfaces for building data visualizations and tooltips according to some implementations.
Figure 6B:
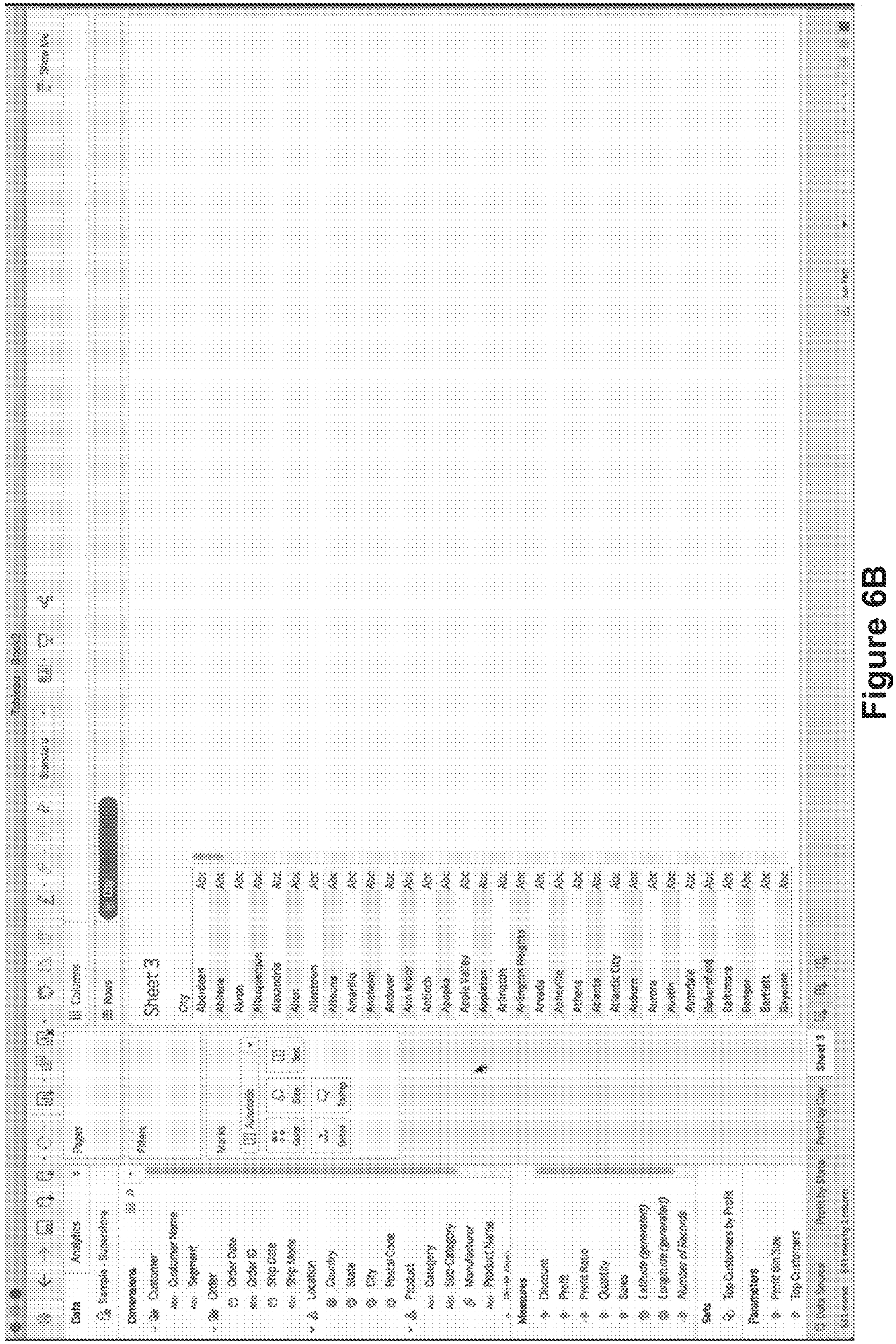
Figure 6C:
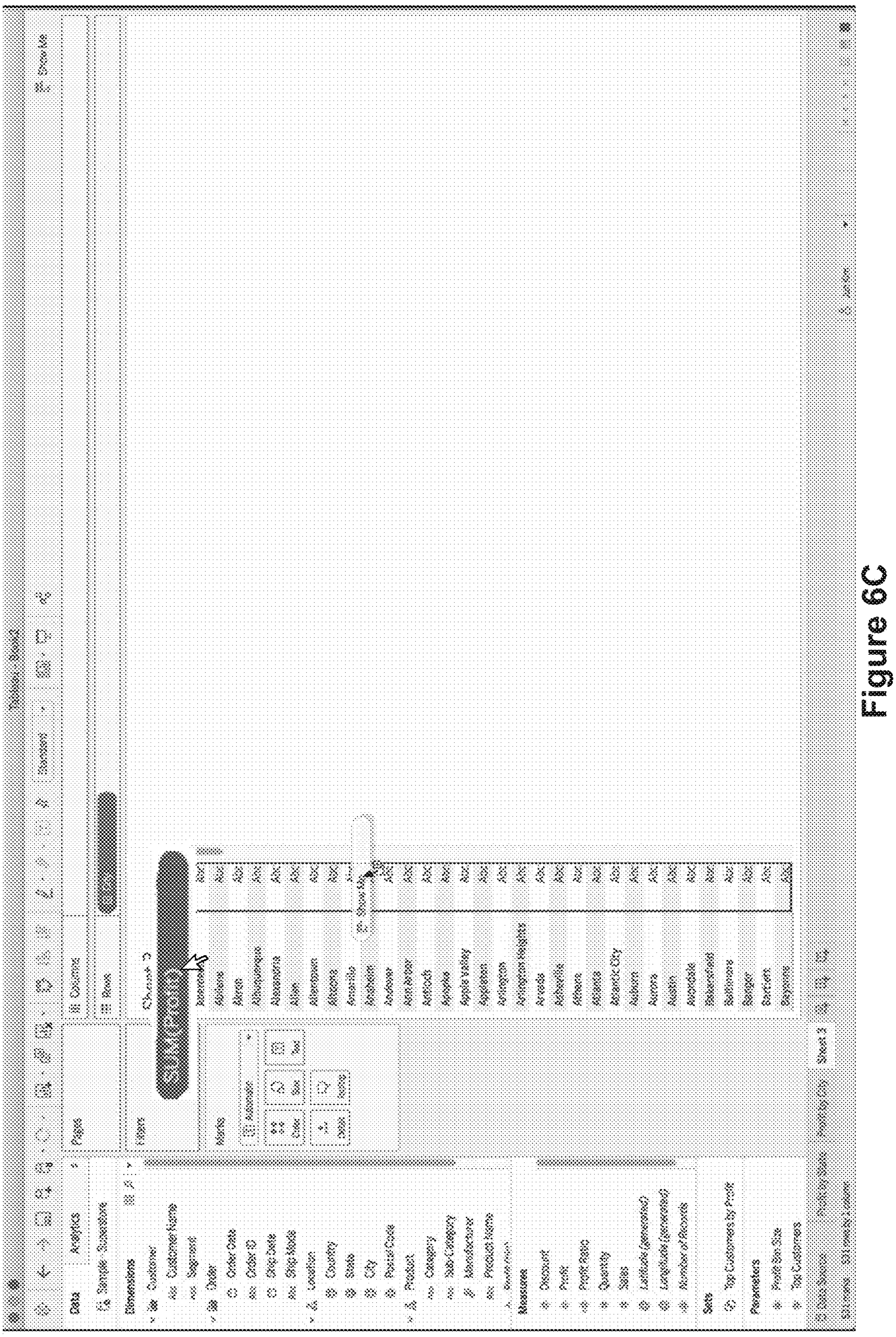
Figure 6D:
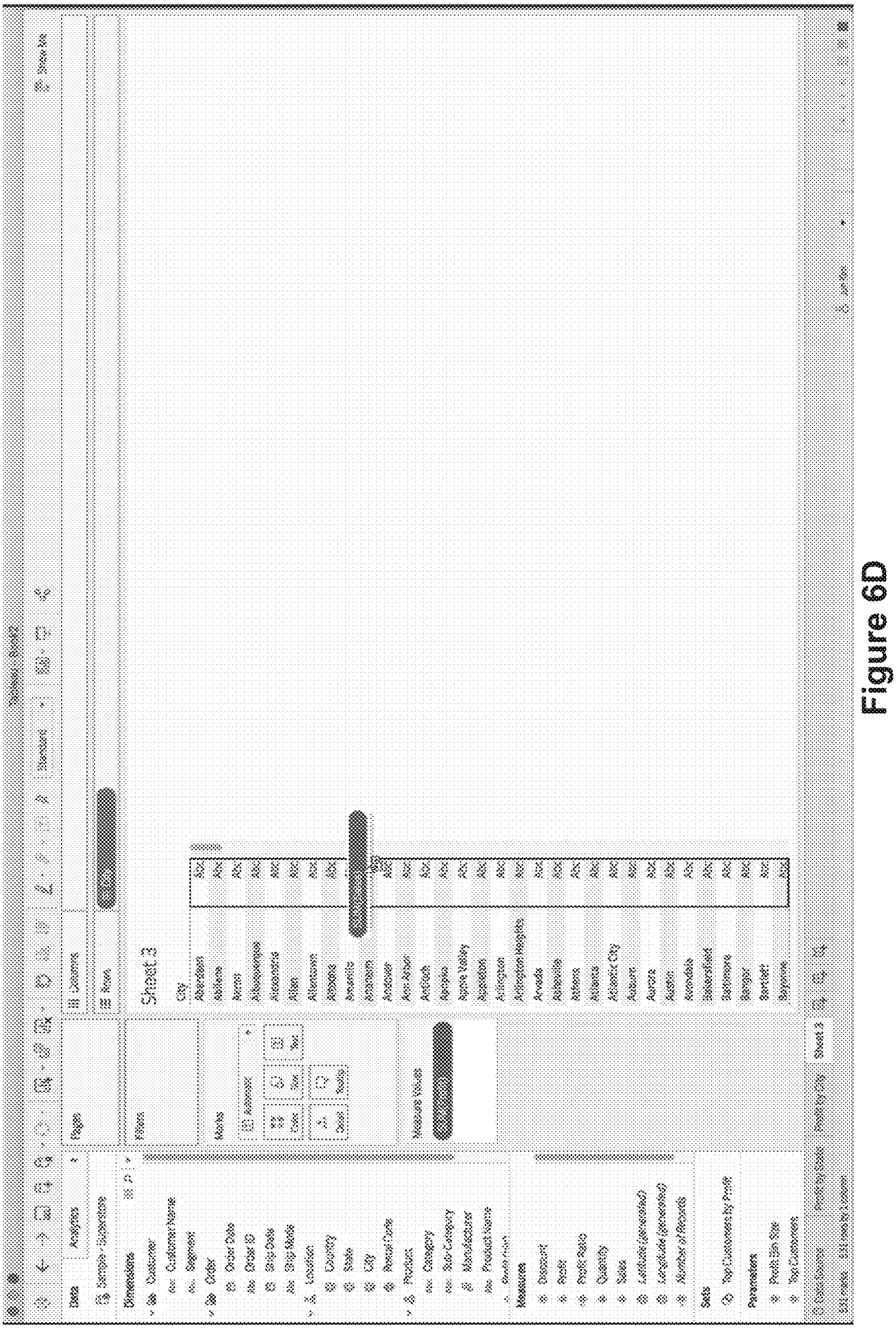
Figure 6E:
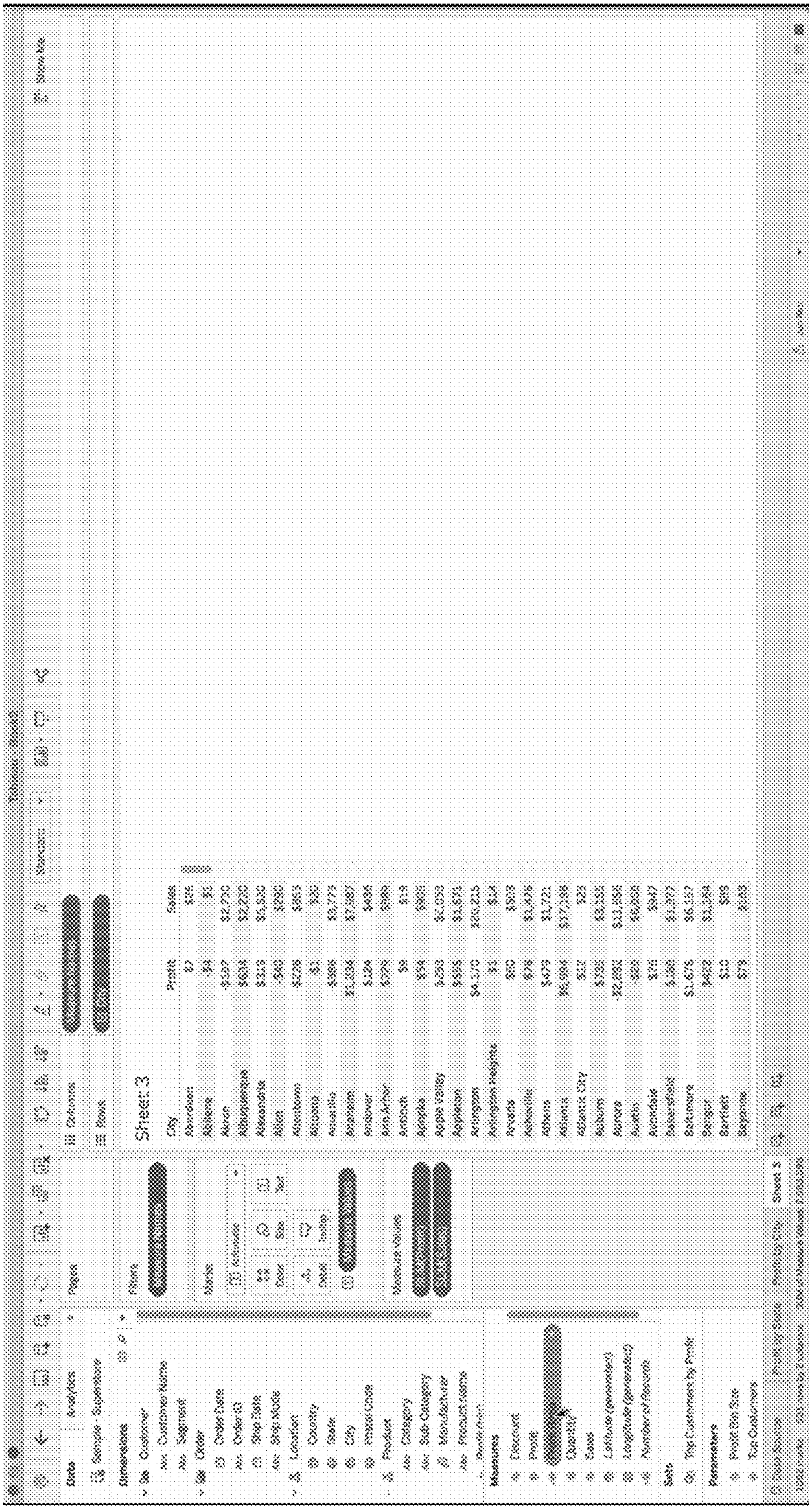
Figure 6F:
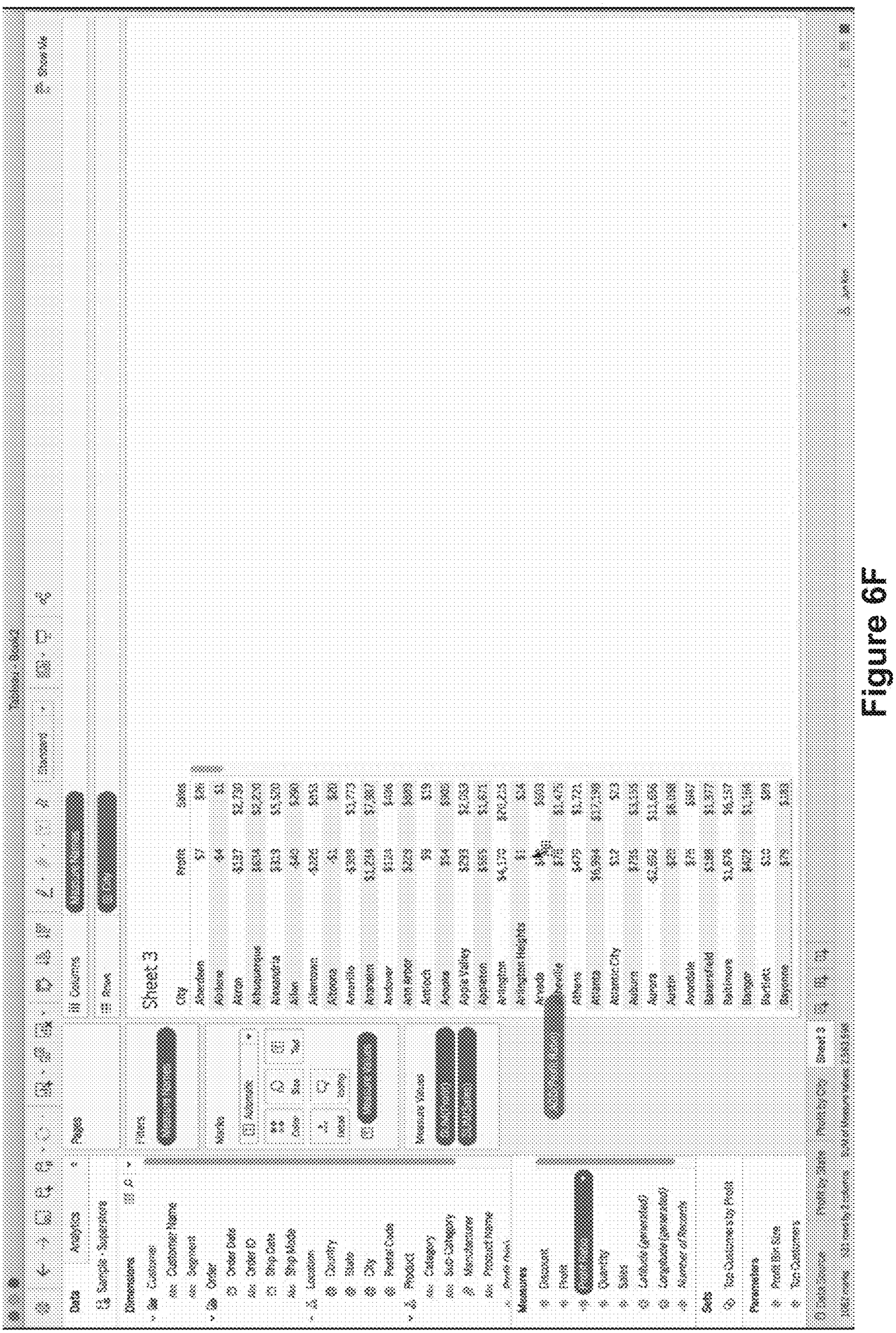
Figure 6G:
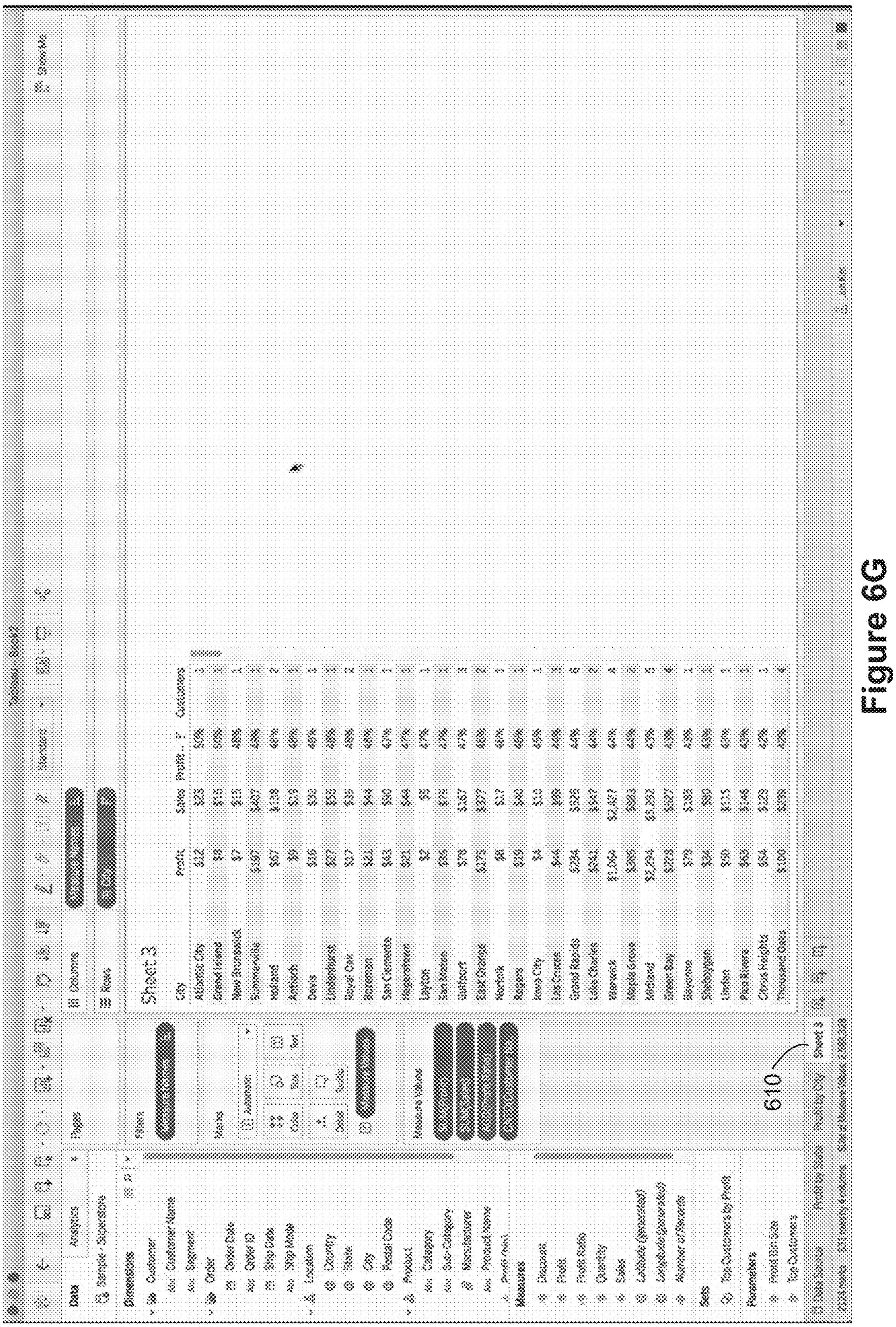
Figure 6H:
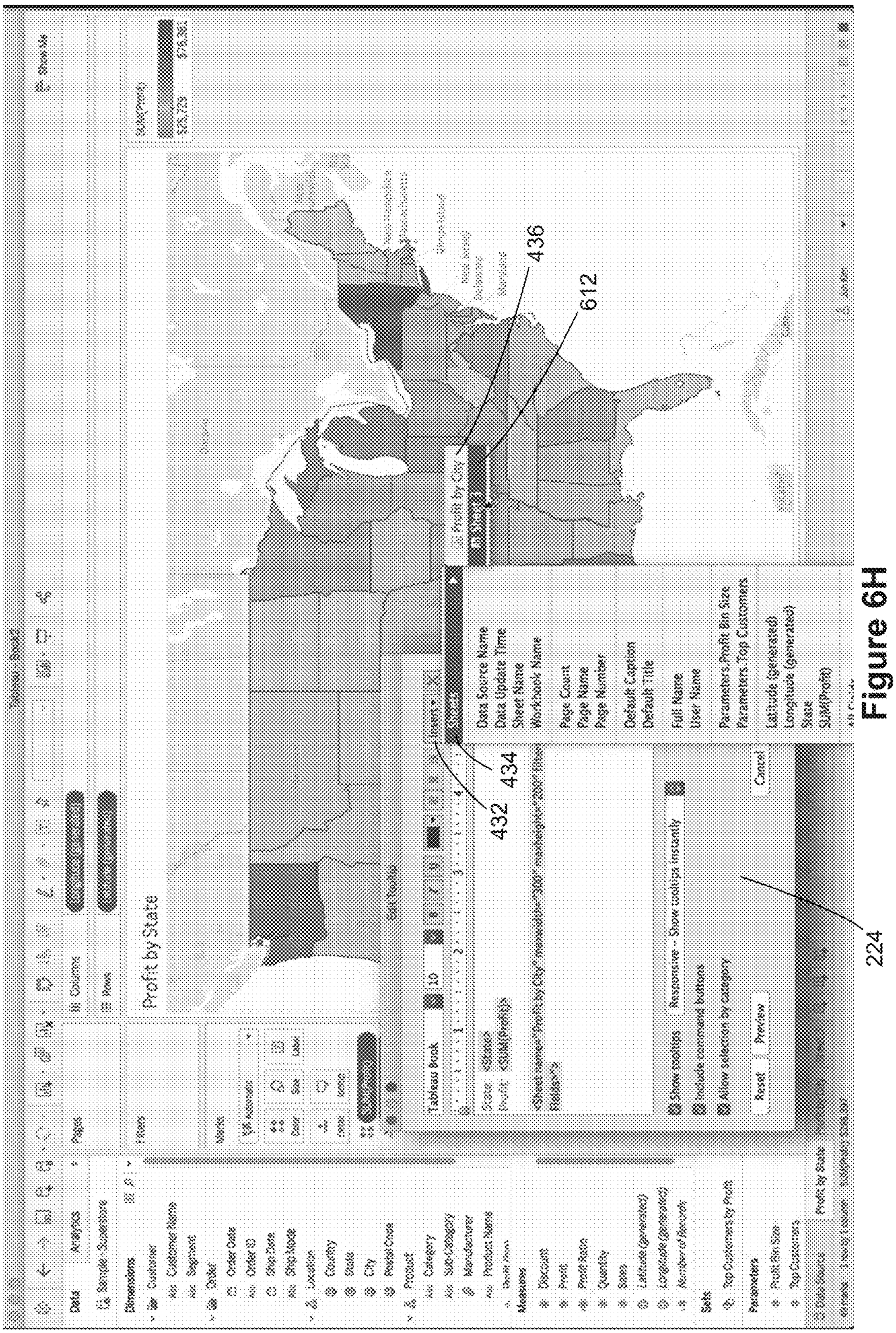
Figure 6I:
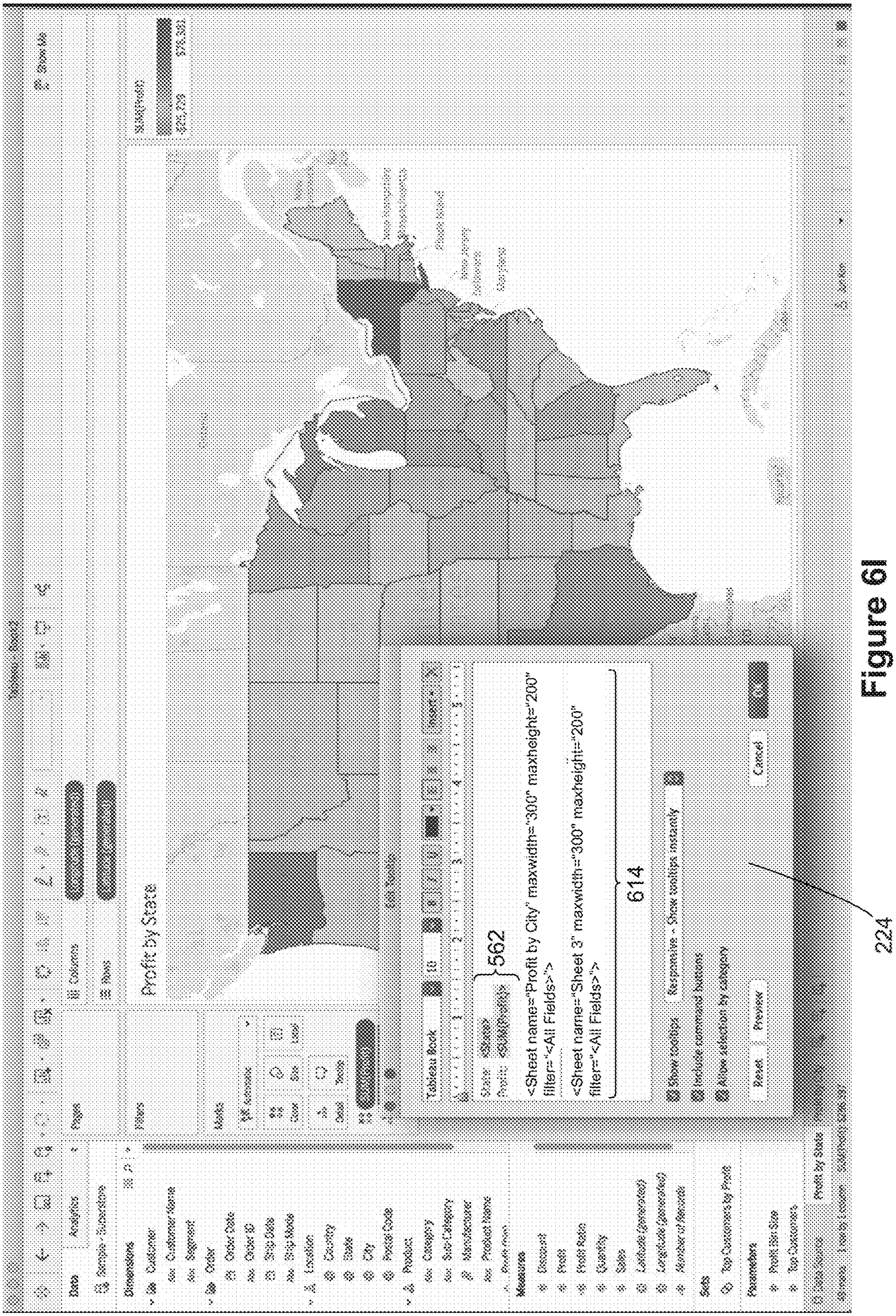
Figure 6J:
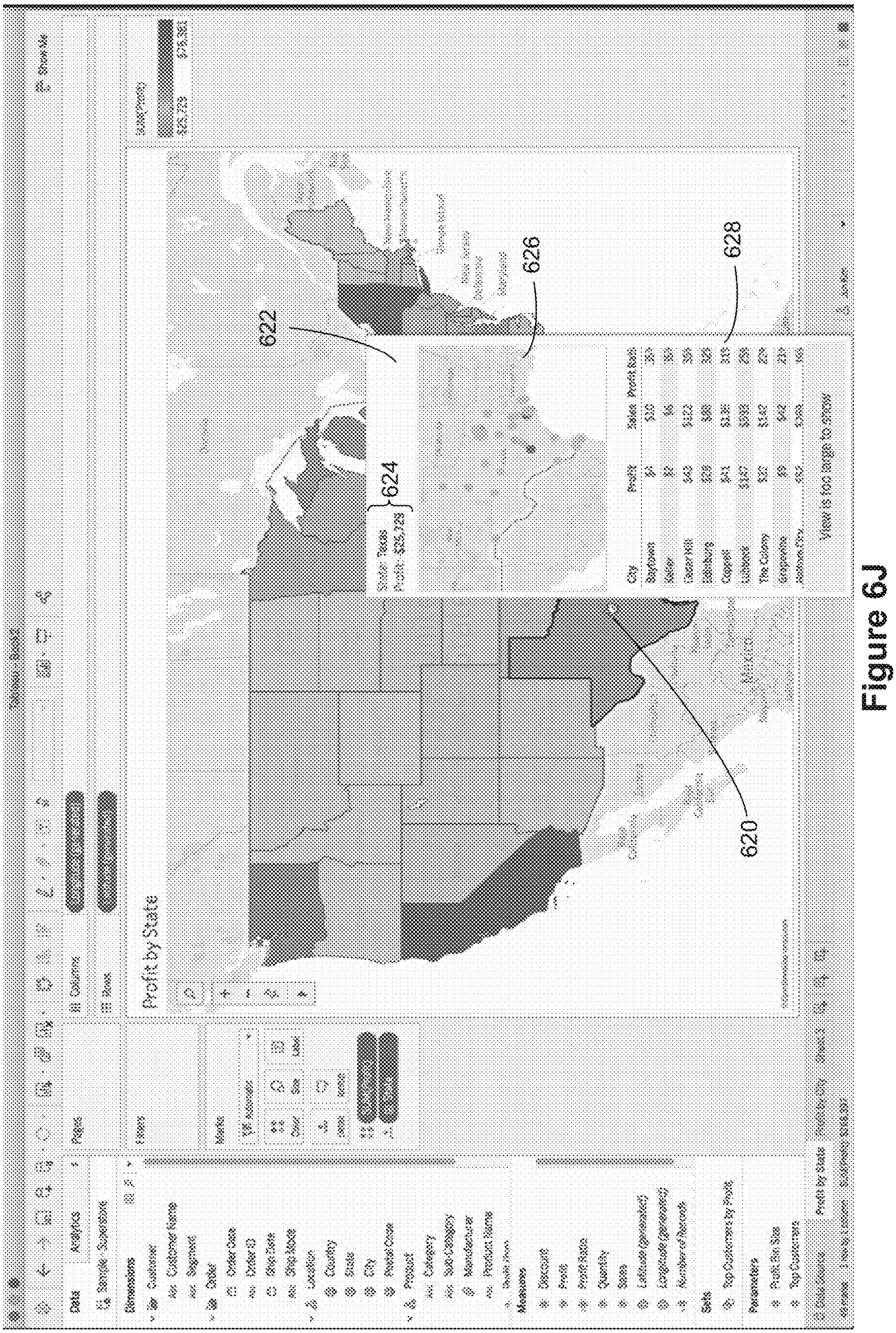
Figure 6K:
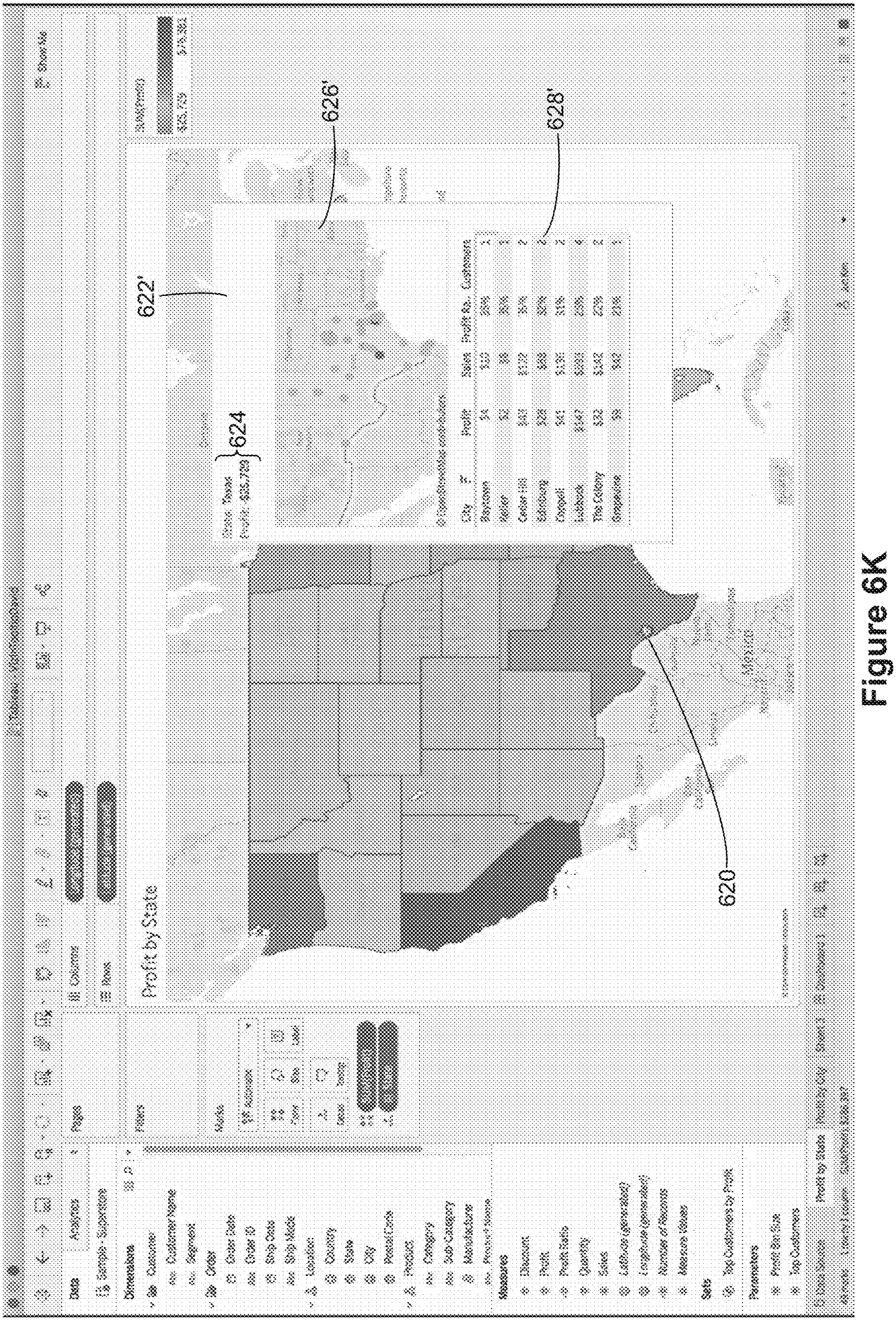
Figure 6L:
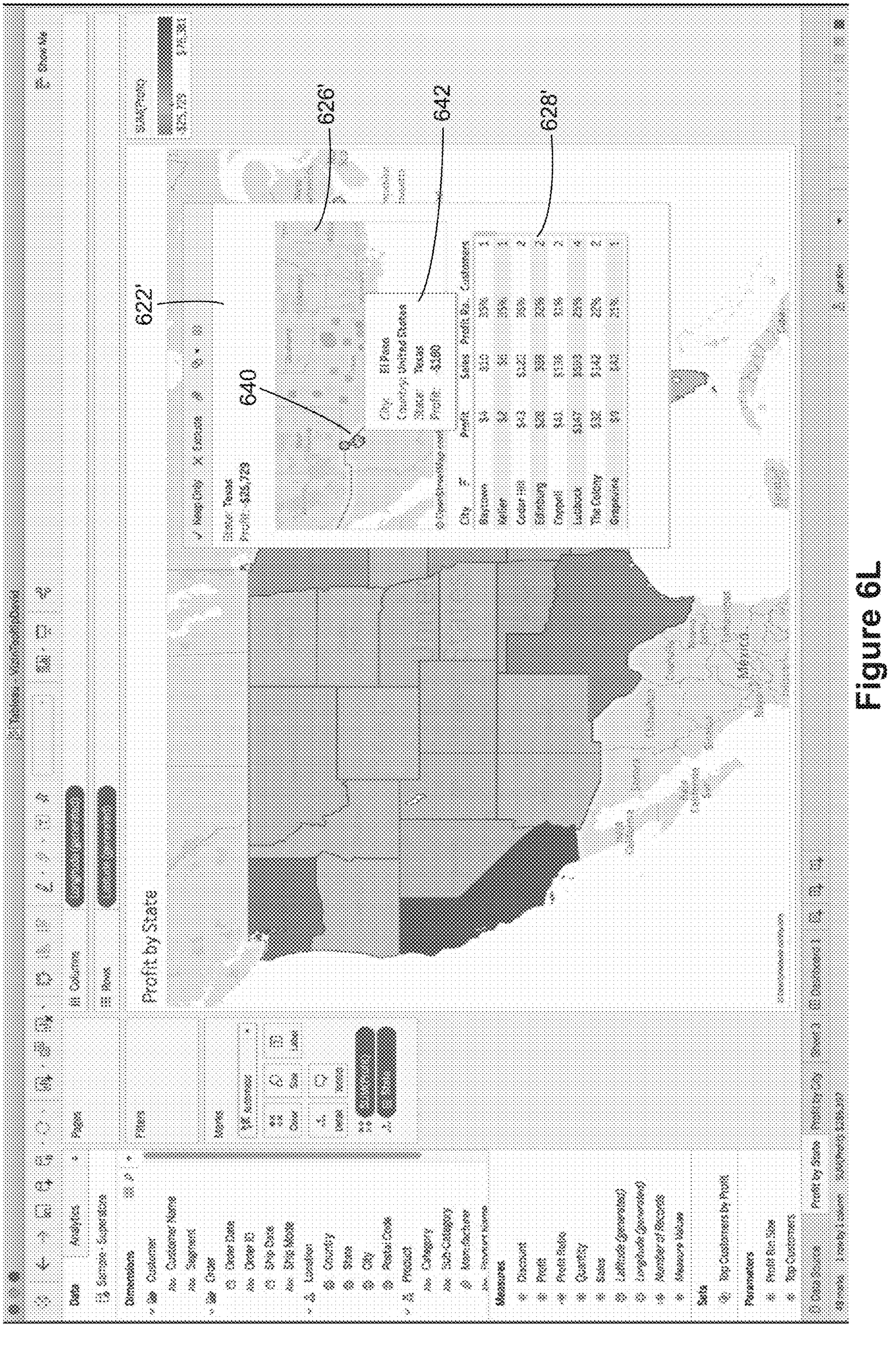
Figure 6M:
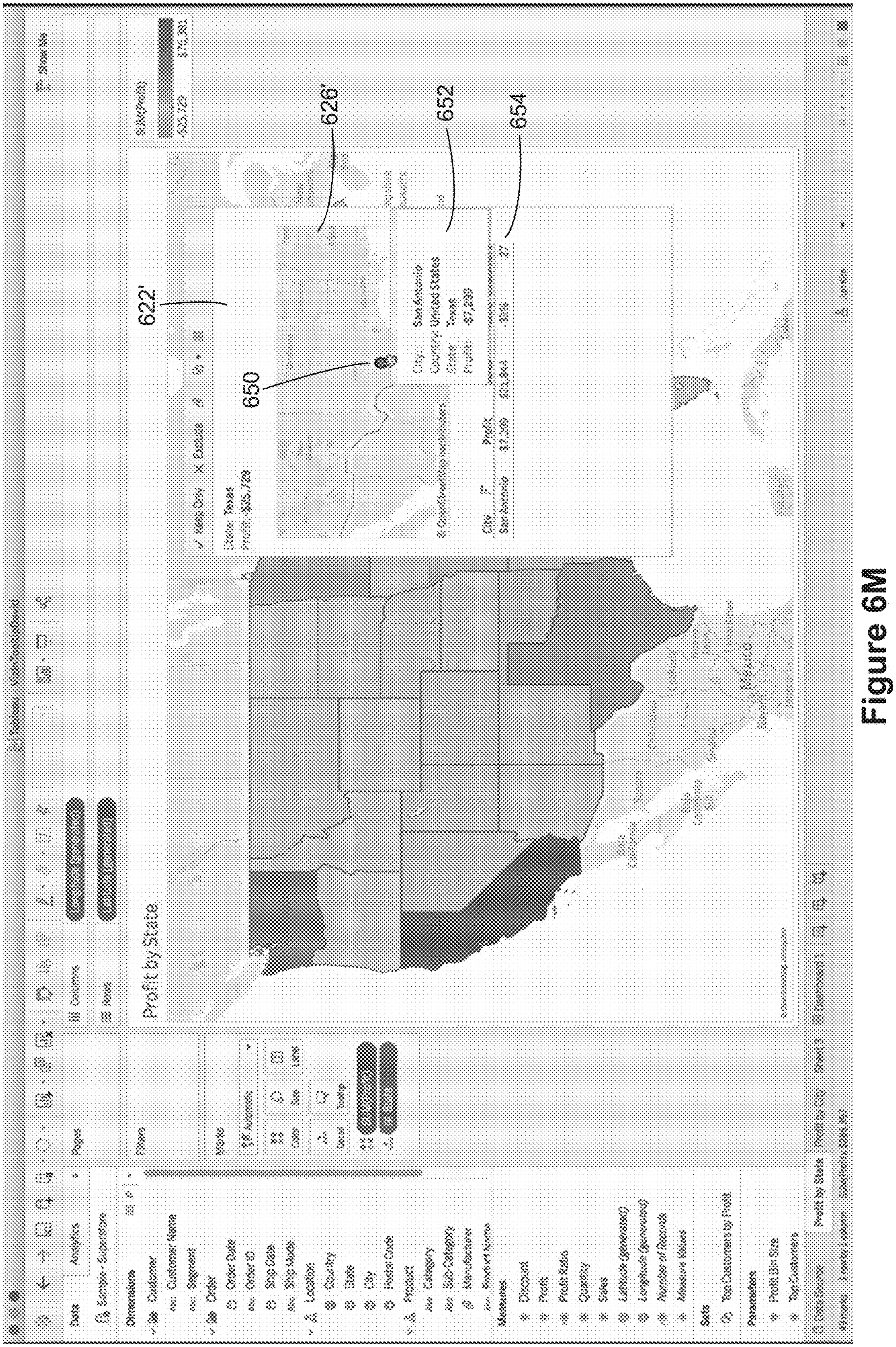
Figure 6N:
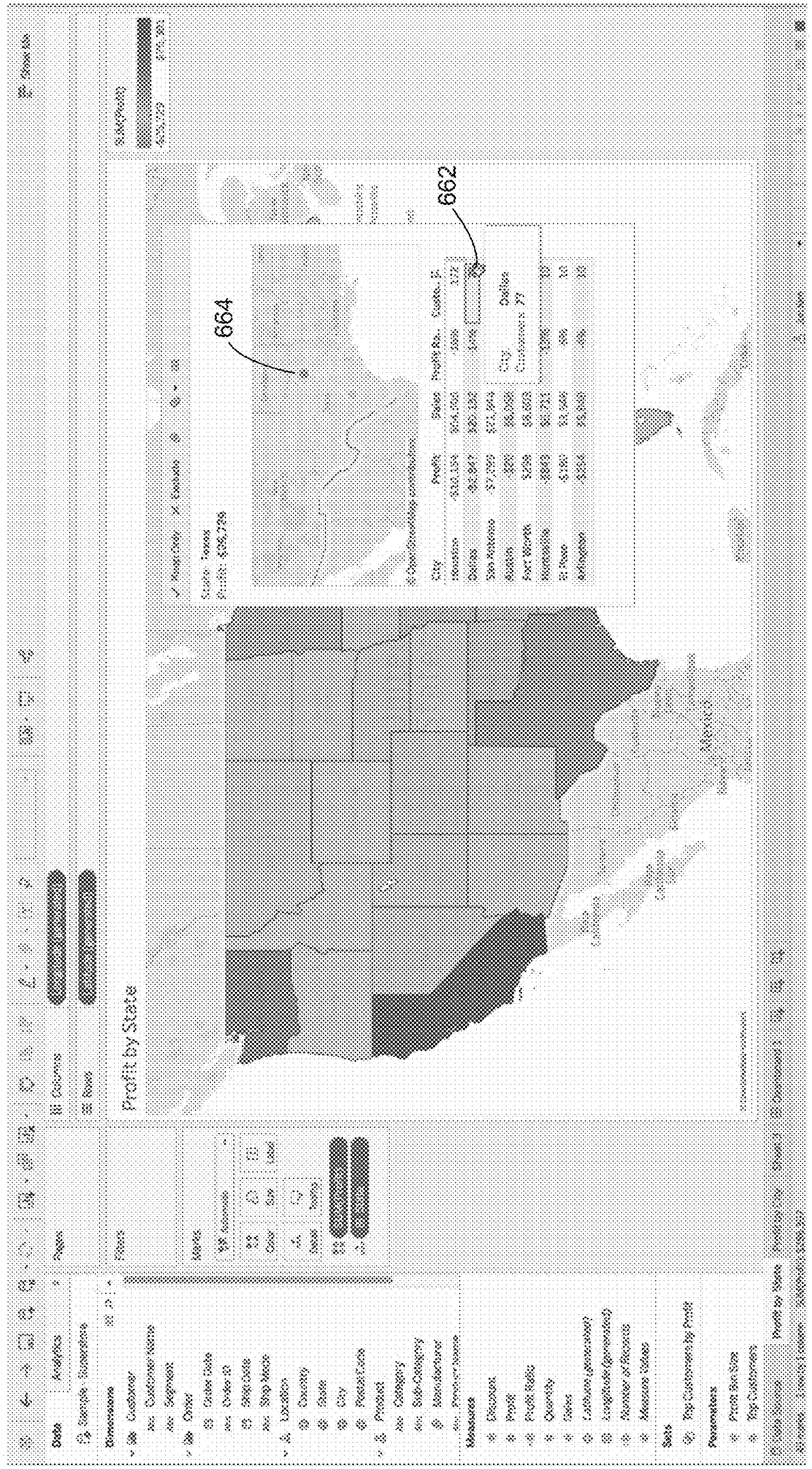

FIGS. 6A-6N illustrate constructing tooltips with two or more secondary data visualizations. FIGS. 6A-6G illustrate building a text table visualization on a third worksheet "Sheet 3" 610.

FIG. 6H illustrates adding a second data visualization to a tooltip definition 232. In FIG. 6H, the user has selected the Insert menu 432 and the Sheets menu option 434 to bring up a list 436 of usable worksheets. Because the user has created the third worksheet "Sheet 3" 610, the "Sheet 3" menu option 612 is available. When the user selects the "Sheet 3" option 612, the corresponding worksheet reference 614 is added to the script in the tooltip definition window 224, as illustrated in FIG. 6I.

When a user action invokes a tooltip, both of the secondary data visualizations 626 and 628 are displayed in the tooltip 622, along with the textual data 624, as illustrated in FIG. 6J. In this case, the display is in response to a user action 620 over the displayed state of Texas. In this example, the allowed width is inadequate to display the full data visualization from Sheet 3, so it is truncated and a message displays that the "View is too large to show." Note that the text table 628 in the tooltip includes only cities in the state of Texas. In this example, the rows are displayed in descending order based on the Profit Ratio. If the maxwidth parameter for the second worksheet reference is increased (e.g., to 400), the text table data visualization 628' is not truncated, as illustrated in FIG. 6K. In this example, the updated tooltip 622' has an expanded width for the first embedded data visualization 626' as well. In some instances, all of the data visualizations within a tooltip are referred to as "secondary" data visualizations. In some instances, the first data visualization within a tooltip is referred to as the secondary data visualization and the second data visualization within a tooltip is referred to as the tertiary data visualization.

In some implementations, the secondary visualizations in a tooltip are static images. That is, they are not interactive. In some implementations, the secondary data visualizations are interactive, as illustrated in FIGS. 6L and 6M. In FIG. 6L, for example, the upper data visualization is interactive, and has it own tooltips. As illustrated, within the tooltip 622', a user can select a city 640 in the top data visualization 626', and a corresponding tooltip 642 is displayed, which provides information about the selected city (e.g., El Paso). In this example, the nested tooltip includes just textual information, but the nested tooltip could contain data visualizations too.

FIG. 6M illustrates two interactive features for the data visualizations within a tooltip. First, a user selection in the upper data visualization (e.g., San Antonio 650) triggers display of a corresponding tooltip 652. In addition, the selection of San Antonio 650 in the upper data visualization has limited what is displayed in the lower data visualization 654 to just San Antonio. This behavior is similar to a dashboard, but it is inside a tooltip.

FIG. 6N illustrates further interactive features with a pair of data visualizations in a tooltip. In this example, a user selects a row 662 in the lower data visualization, and the corresponding city 664 (Dallas) is highlighted in the upper data visualization. In addition, selection of the Dallas row 662 inside the tooltip brings up a nested tooltip, which specifies the city and number of customers for the selected row.

Some implementations provide additional interactive features for the data visualizations within tooltips. For example, a user may be able to expand a tooltip data visualization to the full screen and interact with it in the same way as the primary data visualization. In some implementations, data visualizations in tooltips can include interactive quick filters, and a user can interact with the quick filters specify what data is displayed in the secondary data visualization.

Figure 7A:
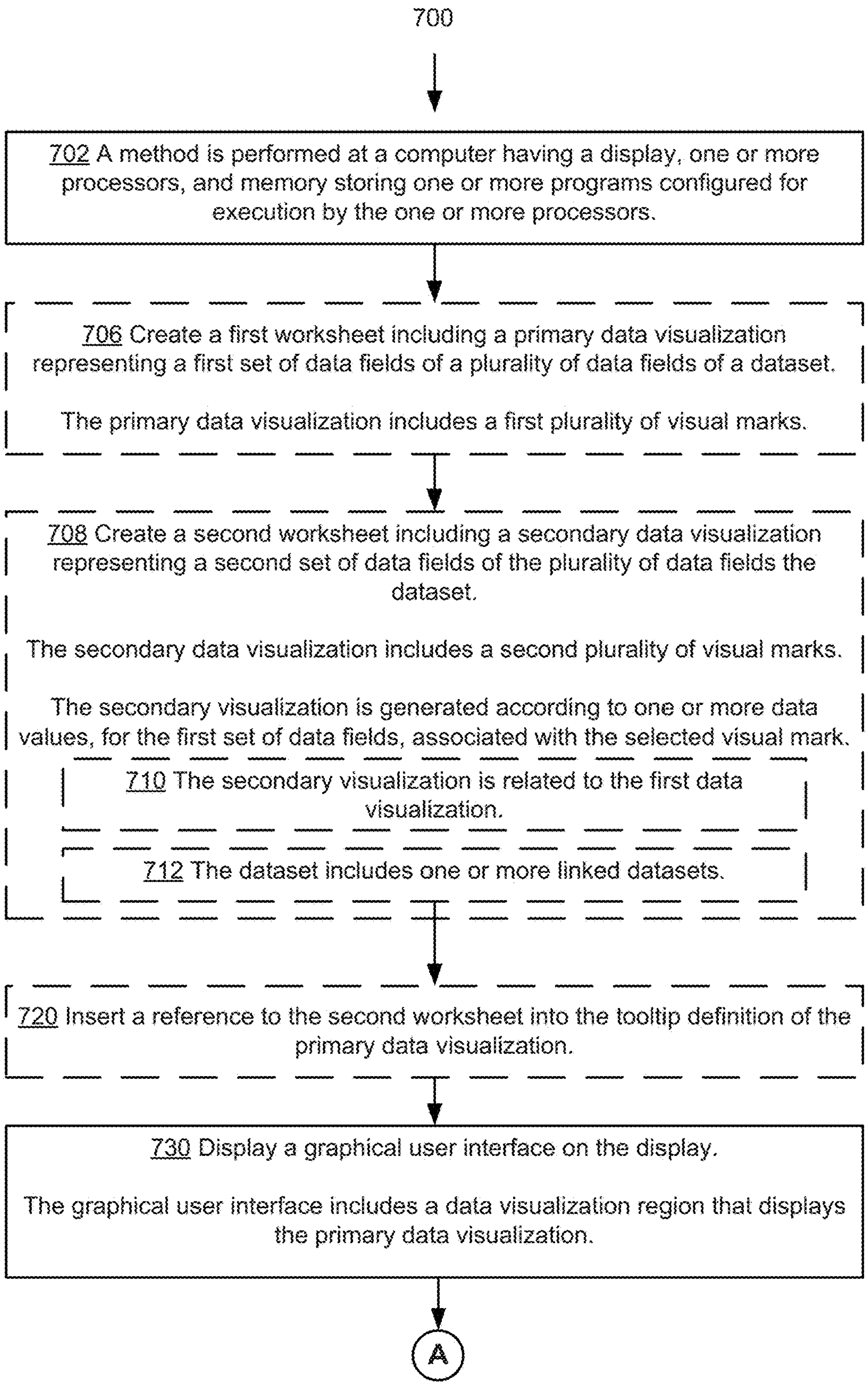
FIGS. 7A-7C provide a flowchart of a process for displaying data visualizations in tooltips according to some implementations.
Figure 7B:
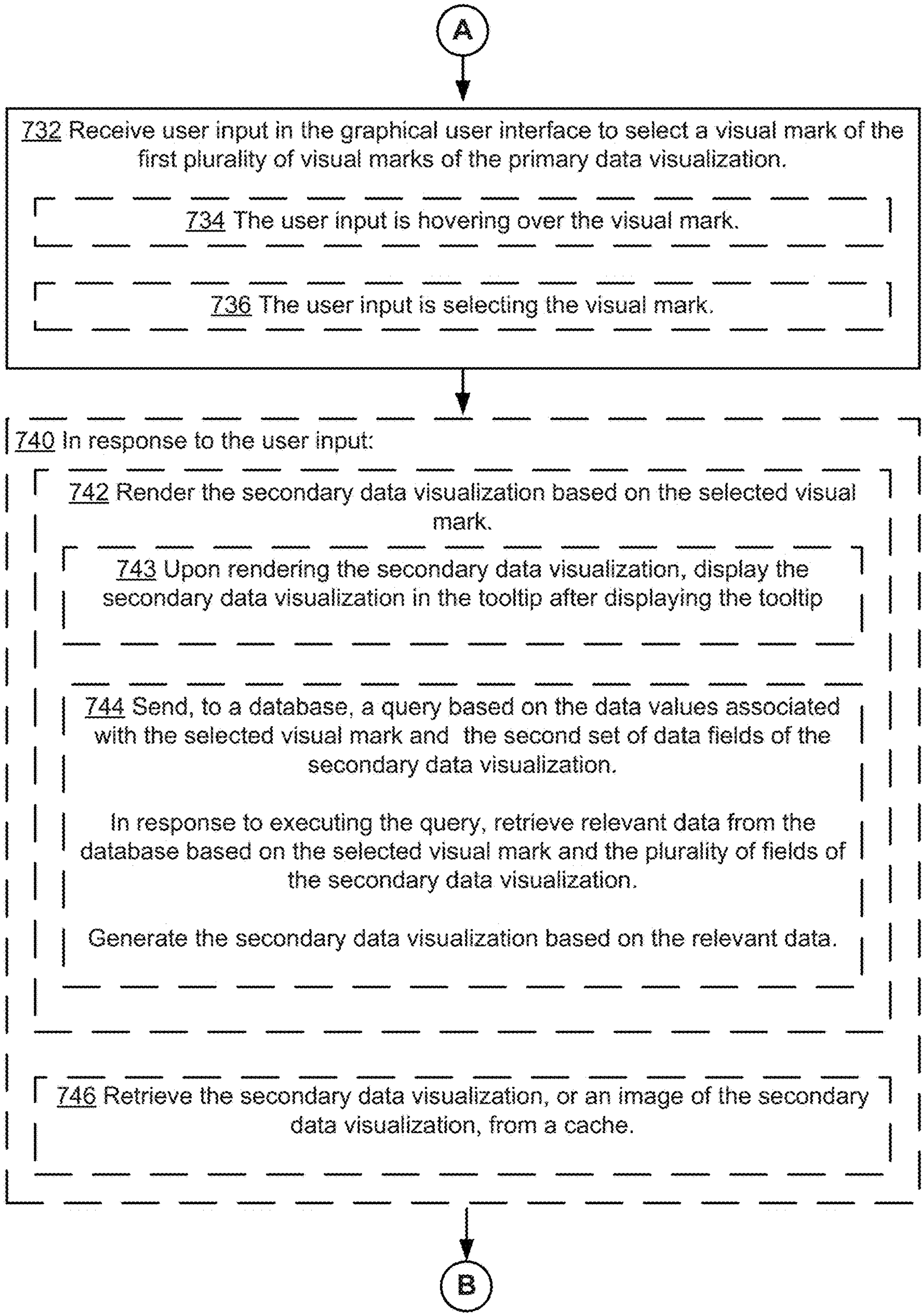
Figure 7C:
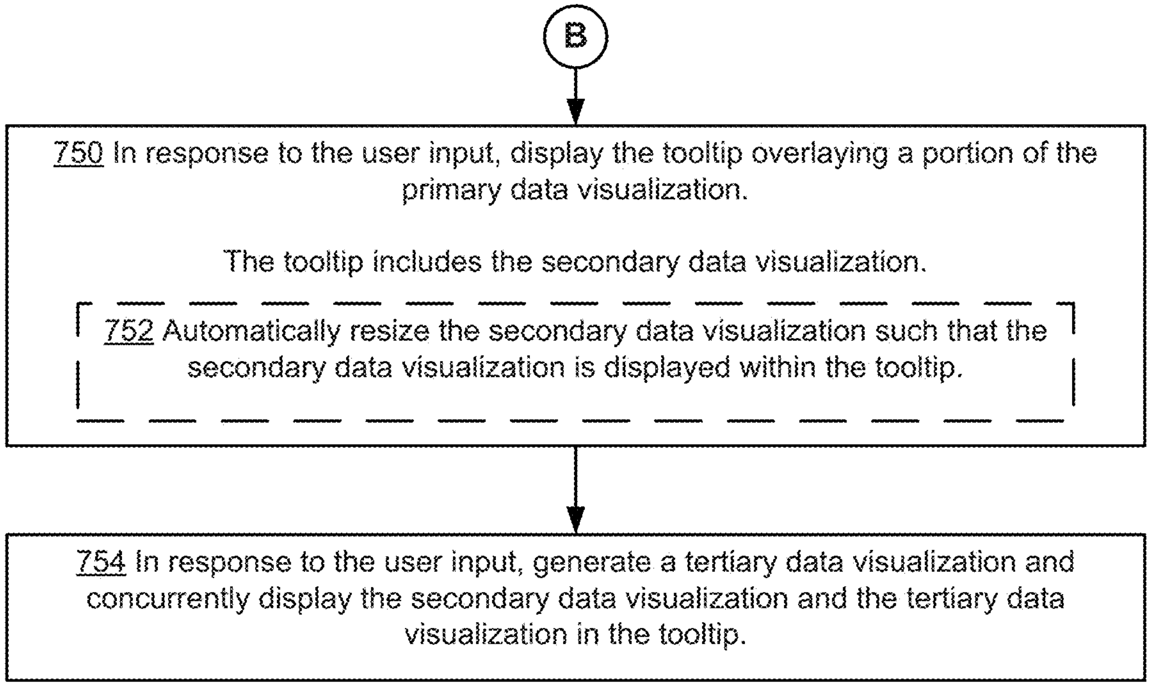

FIGS. 7A-7C illustrate a method 700 of dynamically displaying (702) a data visualization in a tooltip of a primary data visualization according to some implementations. The method 700 is also called a process. In some implementations, the method is executed at and performed by a computer having a display, one or more processors, and memory storing one or more programs configured for execution by the one or more processors. The method 700, as performed by a computer, is optionally governed by instructions that are stored in a non-transitory computer readable storage medium and that are executed by one or more processors of the computer. Each of the operations shown in FIGS. 7A-7C may correspond to instructions stored in a computer memory or non-transitory computer readable storage medium (e.g., the memory 214 of a computing device 200). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in the method 700 may be combined and/or the order of some operations may be changed.

In some implementations, a first worksheet is created (706). The first worksheet includes (706) a primary data visualization visually representing a first set of data fields of a plurality of data fields of a dataset. The primary data visualization includes (706) a first plurality of visual marks. The second worksheet is created (708) and includes (708) a secondary data visualization visually representing a second set of data fields of the plurality of data fields of the dataset. The secondary data visualization includes (708) a second plurality of visual marks. In some implementations, the primary data visualization and the secondary data visualization are related (710). For example, one or more data fields of the first set of data fields and one or more data fields of the second set of data fields may be the same. In some implementations, the dataset includes (712) one or more linked datasets. In some implementations, if the primary and the secondary data visualizations are unrelated, a message is displayed at a predetermined area in the tooltip. The message may notify the user that the secondary data visualization would not be displayed because it is unrelated. In some implementations, the dataset includes one or more datasets that are linked, for example, via table joins, dashboards, or data blending. Data blending combines multiple data sources. Once results are retrieved from the separate data sources, the data visualization application may blend or combine the aggregated results of the independent queries in on a single worksheet. In some implementations, after the primary and the secondary data visualization are created, a reference to the second worksheet is included (720) in the tooltip definition 232 of the primary data visualization, as illustrated in FIG. 4F.

A graphical user interface is displayed (730) on the display of the computer. The graphical user interface includes a data visualization region that includes the primary data visualization. A user input in the graphical user interface is received (732) at the computer. The user input selects a visual mark of the first plurality of visual marks of the primary data visualization (e.g., in FIG. 4H, the mark selected is a bar representing the region 'Central Asia'). In some implementations, the user input is (734) hovering over the visual mark. In some implementations, the user input is (736) selecting, tapping, or clicking the visual mark. In some implementations, in response to (740) the user input in the graphical user interface, the secondary data visualization is rendered (742) based on the selected visual mark.

Rendering the second data visualization is based on one or more data values corresponding to the selected visual mark in the primary data visualization. For example, if the primary data visualization includes a map of the United States, each visual mark may be associated with a state (e.g., data field="State" and date value="OH"). This information is used to dynamically generate the secondary data visualization. For example, the secondary data visualization may filter its data (e.g., generate a secondary data visualization using only rows from the data source having State="OH"). As another example, the secondary data visualization may highlight certain visual marks according to the data values of the selected visual mark from the primary data visualization (e.g., highlight the visual marks in the secondary data visualization that have State="OH"). Note that both filtering and highlighting can be applied at the same time, typically using different data fields. For example, suppose the selected visual mark in the primary data visualization is associated with a city and a state (e.g., City="Seattle" and State="WA"). The secondary data visualization can specify filtering by State and highlighting by City. In this case, the secondary data visualization in the tooltip would be limited to data for the state of Washington, and would highlight just Seattle. If the user moved the cursor to Portland, Oreg., the secondary data visualization in the tooltip would update to show only cities in Oregon, with just Portland highlighted.

In some implementations, upon rendering the secondary data visualization, the method includes displaying (743) the secondary data visualization in the tooltip. In some instances, this results in an asynchronous display of the tooltip and the secondary data visualization of the tooltip. For example, the tooltip is displayed first and, once the secondary data visualization or the image of the secondary data visualization is rendered, the secondary data visualization, or the image of the secondary data visualization, is displayed in the tooltip. Thus, the user may explore and analyze additional information displayed in the tooltip while waiting for the secondary data visualization to be rendered.

In some implementations, in response to the user input, a query may be sent (744) to a database that includes the dataset. The query is (744) based on the data values of the selected visual mark and the second set of data fields of the secondary data visualization. In response to executing the query, relevant data from the database is retrieved (744) based on the selected visual mark. The secondary data visualization is rendered (744) based on the relevant data. For example, values of the second set of data fields that are associated with the selected visual mark are retrieved from the database. In other implementations, the secondary data visualization, an image of the secondary data visualization, or data to generate the secondary data visualization is cached. In this case, the secondary data visualization, or the image of the secondary data visualization, is retrieved (746) from a cache or generated based on data in the cache.

In response to receiving the user input, the tooltip of the primary data visualization is displayed (750). The tooltip includes (750) the secondary data visualization. In some implementations, the tooltip includes an image (e.g., a static image) of the secondary data visualization. In some implementations, a mark within the tooltip is selectable and generates a second tooltip within the tooltip (e.g., as shown in FIGS. 6L and 6M). In some implementations, the secondary data visualization is displayed on a predetermined area of the tooltip. In some implementations, displaying the tooltip further comprises automatically resizing (752) the secondary data visualization so that the secondary data visualization is fully displayed within the tooltip.

In some implementations, the secondary data visualization has a size that is smaller than the size of the primary data visualization. For example, the secondary data visualization has a default height of 300 pixels and a default width of 300 pixels. In some implementations, the size of the secondary data visualization is editable by the user (e.g., by modifying the script using the tooltip definition window as described above). In some implementations, a portion of the primary data visualization that is not overlaid by the tooltip remains displayed. For example, as shown in FIGS. 5Q and 5R, a portion of the primary data visualization (e.g., the map representing profit by state) is visible in the areas around the tooltip displaying the secondary data visualization (e.g., representing the profit by city).

In some implementations, in response to the user input, the tooltip generation module 234 generates (754) a tertiary data visualization. Displaying the tooltip includes displaying concurrently the secondary data visualization and the tertiary data visualization in the tooltip (as shown in FIGS. 6J and 6K).

In some implementations, both the primary data visualization and the secondary data visualization are one of: a bar chart, a line graph, a map, a scatter plot, a pie chart, a heat map, an area chart, a circle plot, a treemap, or a bubble chart.

In some instances, the data values from the primary data visualization are used to filter what is displayed in the secondary data visualization. In this case, a first data value of the one or more data values corresponds to a first data field, in the first set of data fields, which is not in the second set of data fields. Generating the secondary data visualization includes computing one or more aggregate values for a second data field in the second set of data fields, aggregating only rows from the dataset whose corresponding data values for the first data field match the first data value.

The previous examples have illustrated the use of filtering within tooltips. FIGS. 8A-8H illustrate the use of highlighting within tooltips. In this case, rather than filtering the data for the secondary data visualization according to the data values of the selected data mark in the primary data visualization, the process highlights the relevant data marks in the secondary data visualization.

Figure 8A:
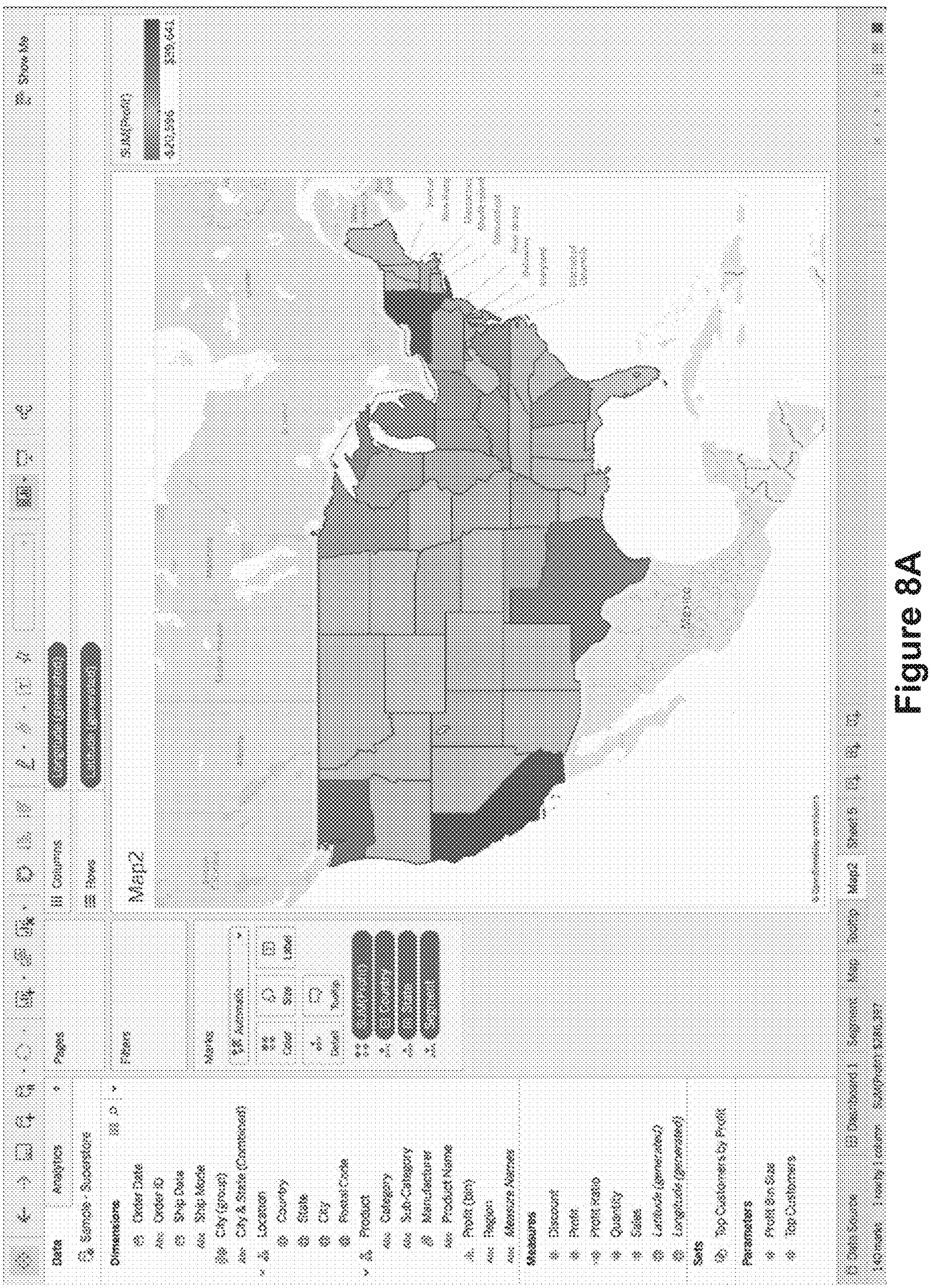
FIGS. 8A-8H illustrate filtering and highlighting within tooltips, in accordance with some implementations.
Figure 8B:
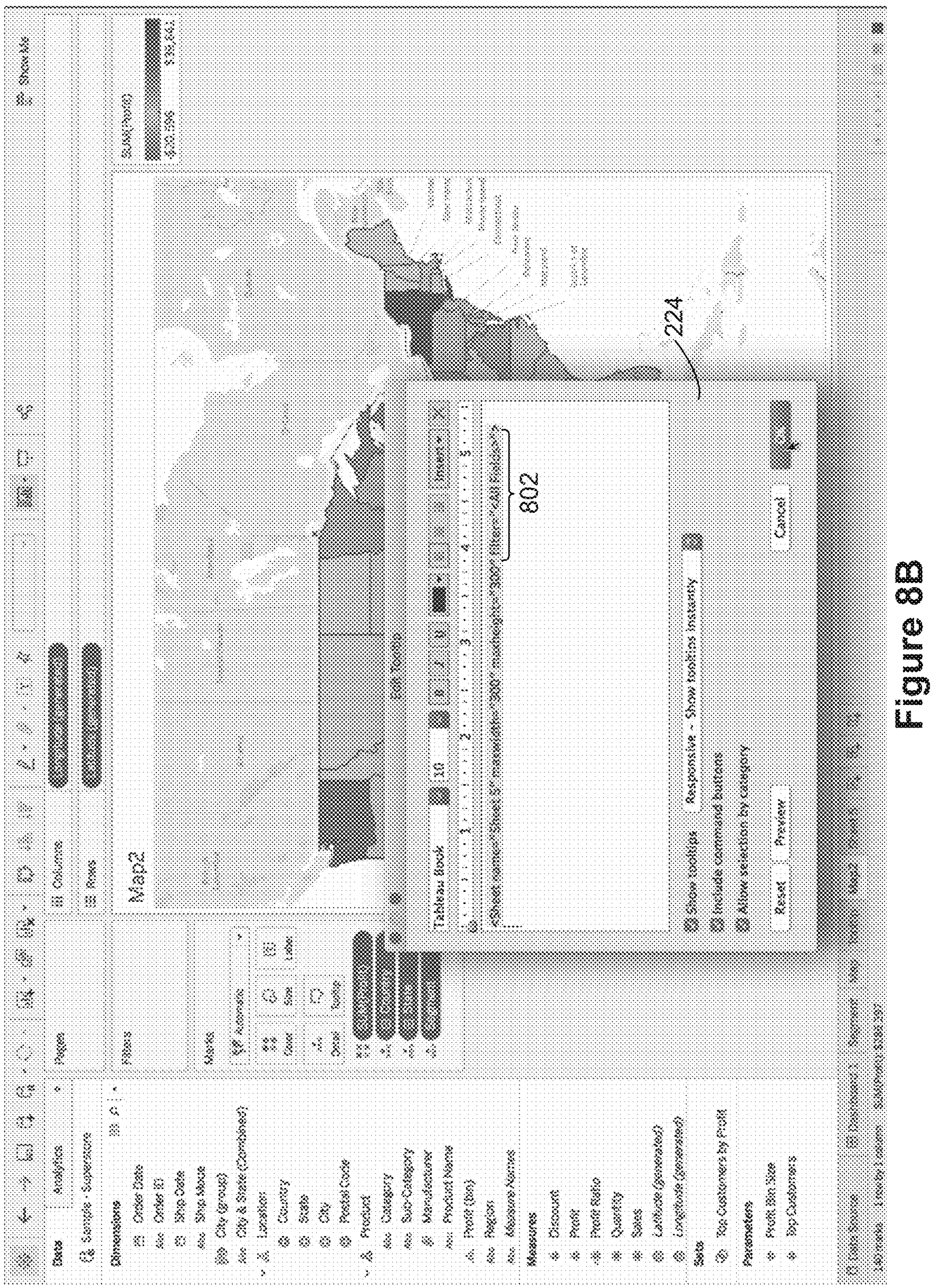

FIG. 8A shows a map data visualization. FIG. 8B shows that a user has used the tooltip definition window 224 to insert a reference to another data visualization. At this time, the reference specifies filtering 802 using "All Fields". Filtering by all fields indicates that the system identifies any data fields that overlap between the primary and secondary data visualizations, and filters the secondary data visualization according to the data values of the overlapping data fields (the data values of the selected data mark in the primary data visualization).

Figure 8C:
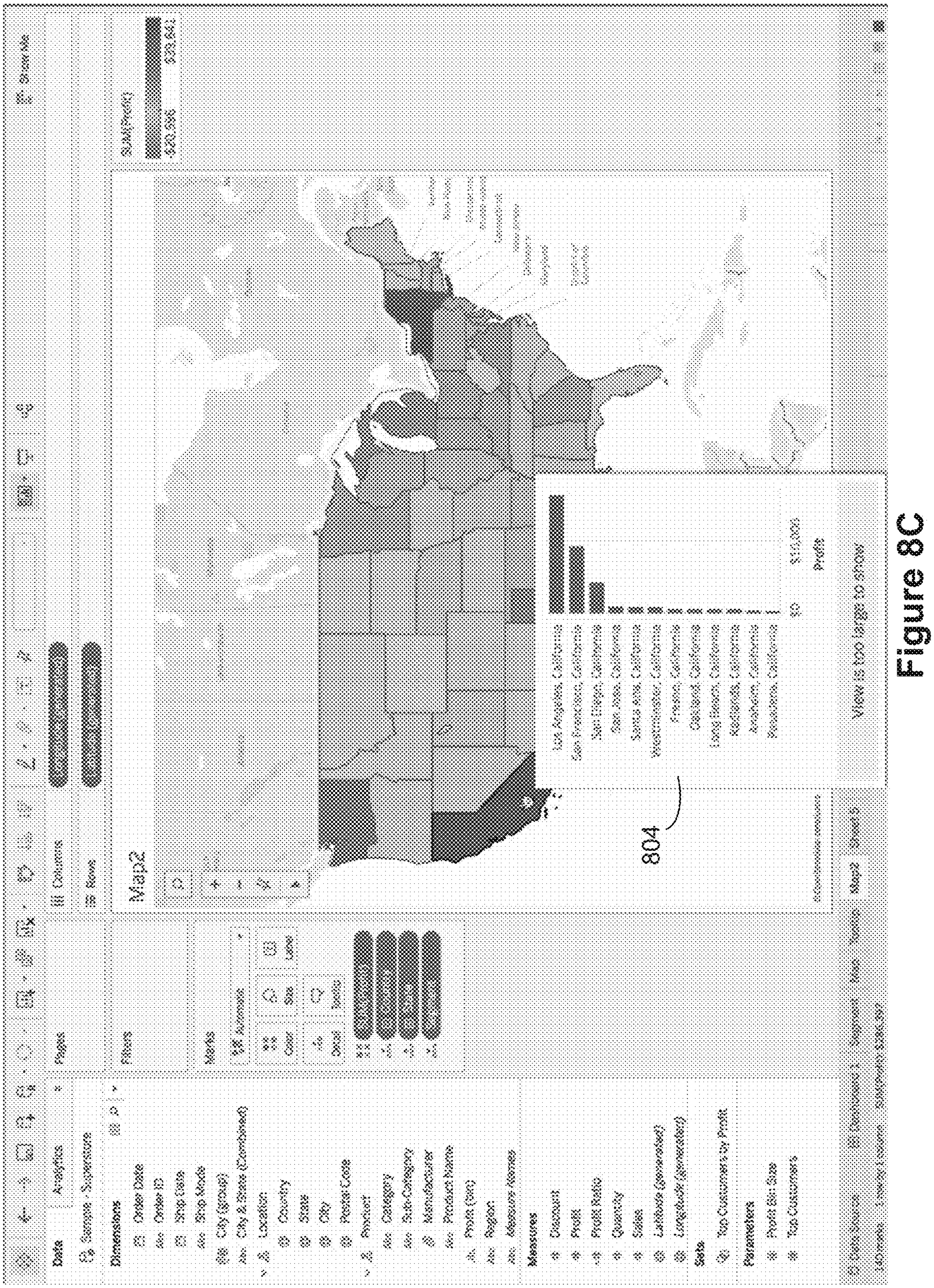
Figure 8D:
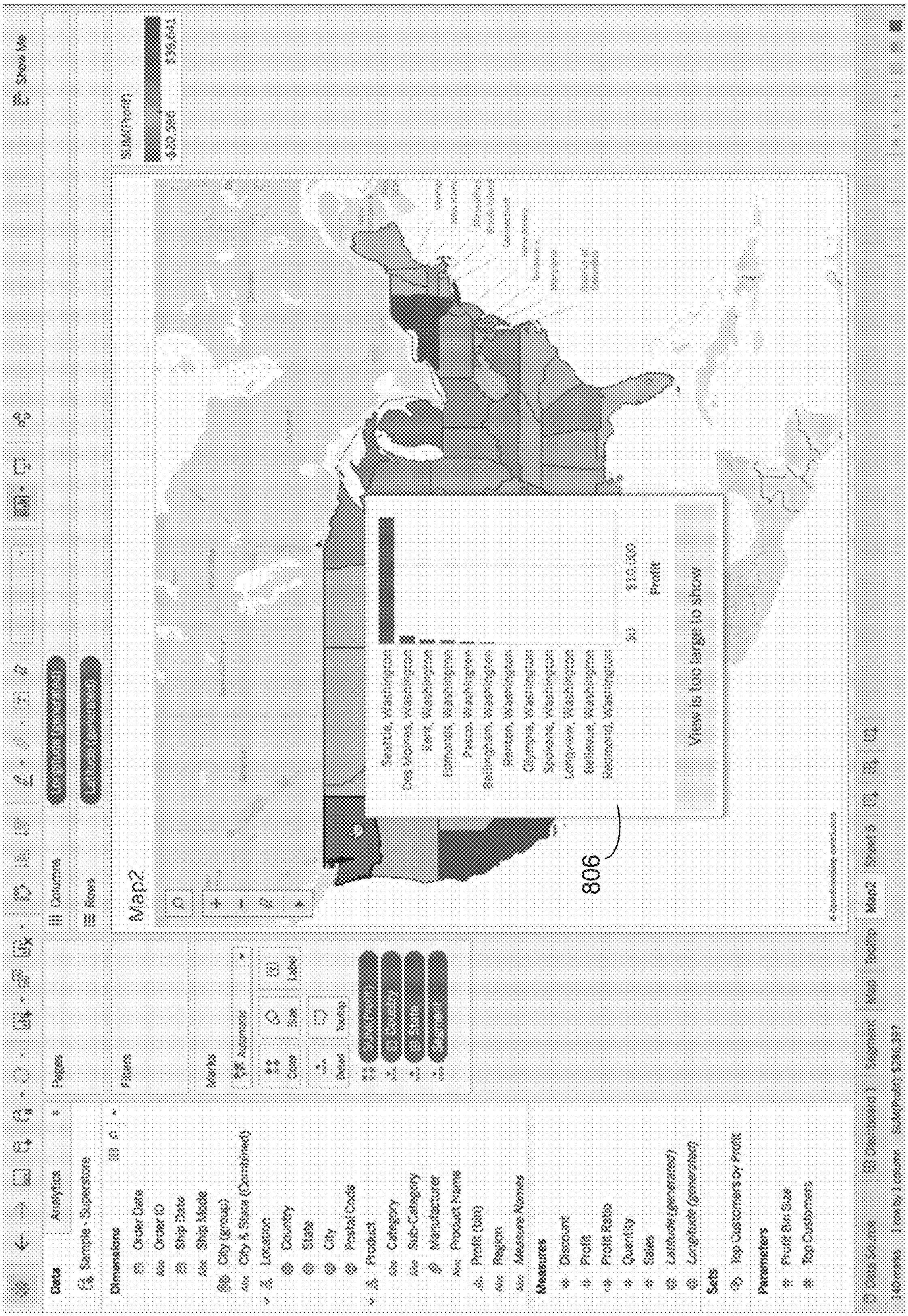

FIGS. 8C and 8C illustrate tooltips that are displayed according to the tooltip definition in FIG. 8B. In FIG. 8C, the cursor (hand pointer) is over California, so the displayed tooltip 804 has data for cities in California. Note that there are more rows than can fit in the tooltip, to the tooltip indicates that the "view is too large to show." Similarly, in FIG. 8D, when the cursor is over the state of Washington, the displayed tooltip 806 displays data for the state of Washington.

Figure 8E:
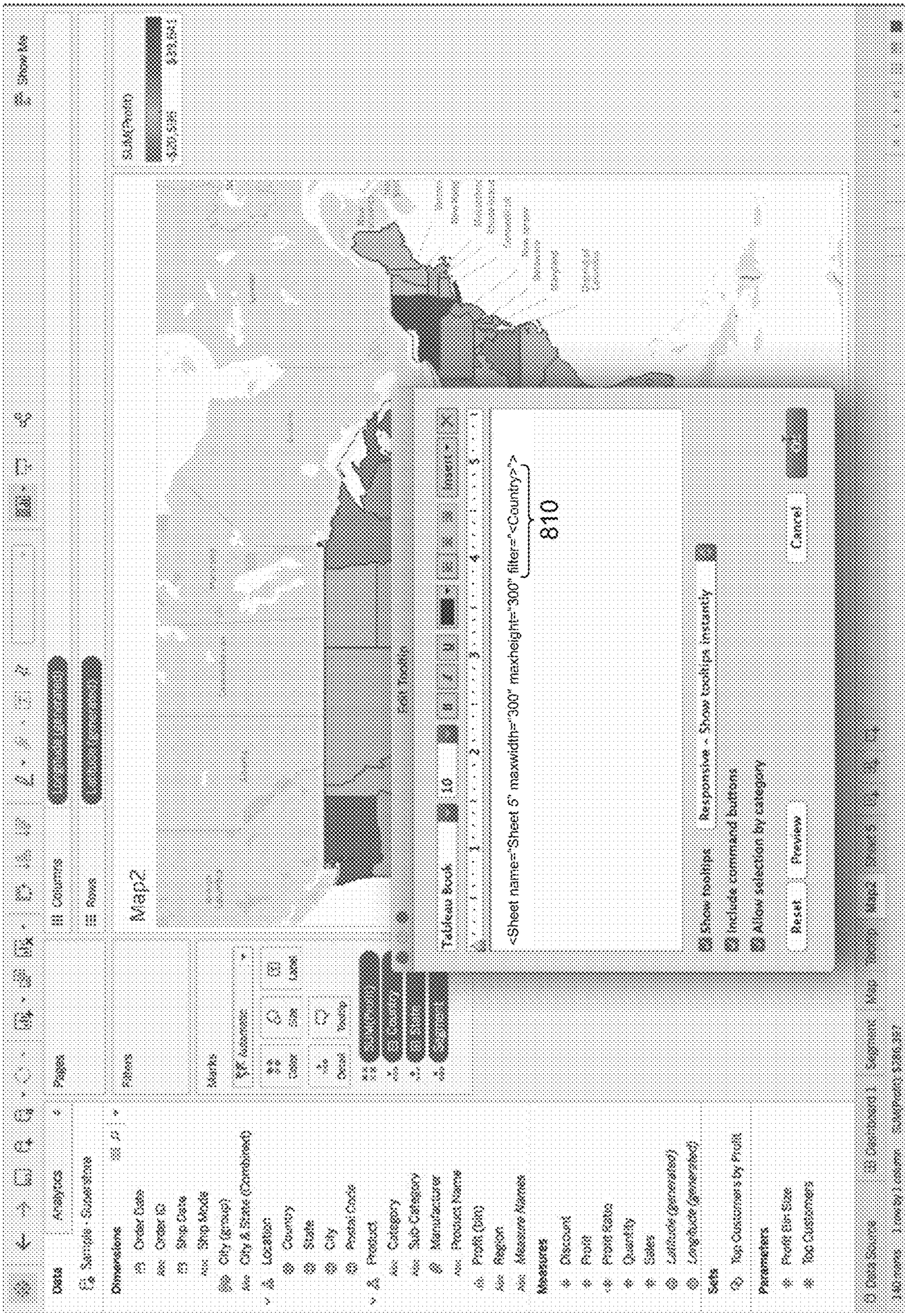
Figure 8F:
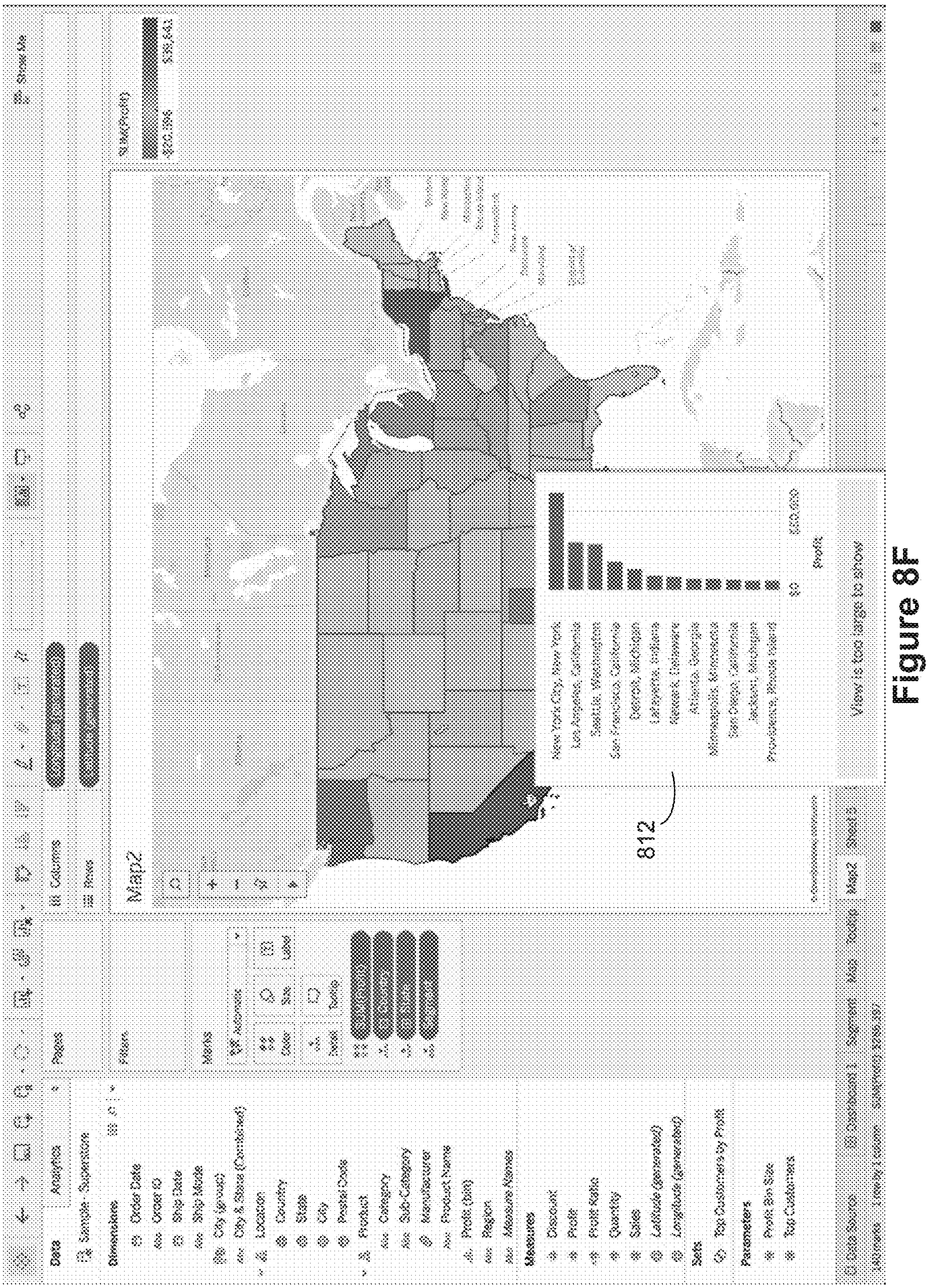

In FIG. 8E, the user reopens the tooltip definition window 224, and edits the worksheet reference to change the filtering. In this case, rather than filtering according to all possible overlap fields, the filter 810 is limited to Country. That is, according to this definition, the secondary data visualization will be limited to data for the same country as the selected data mark in the outer data visualization. FIG. 8F illustrates applying the tooltip definition shown in FIG. 8E. In this case, the cursor is over California, but the tooltip 812 displays data for all cities in the United States. Note that the data visualization in the tooltip has been sorted by descending profit.

Figure 8G:
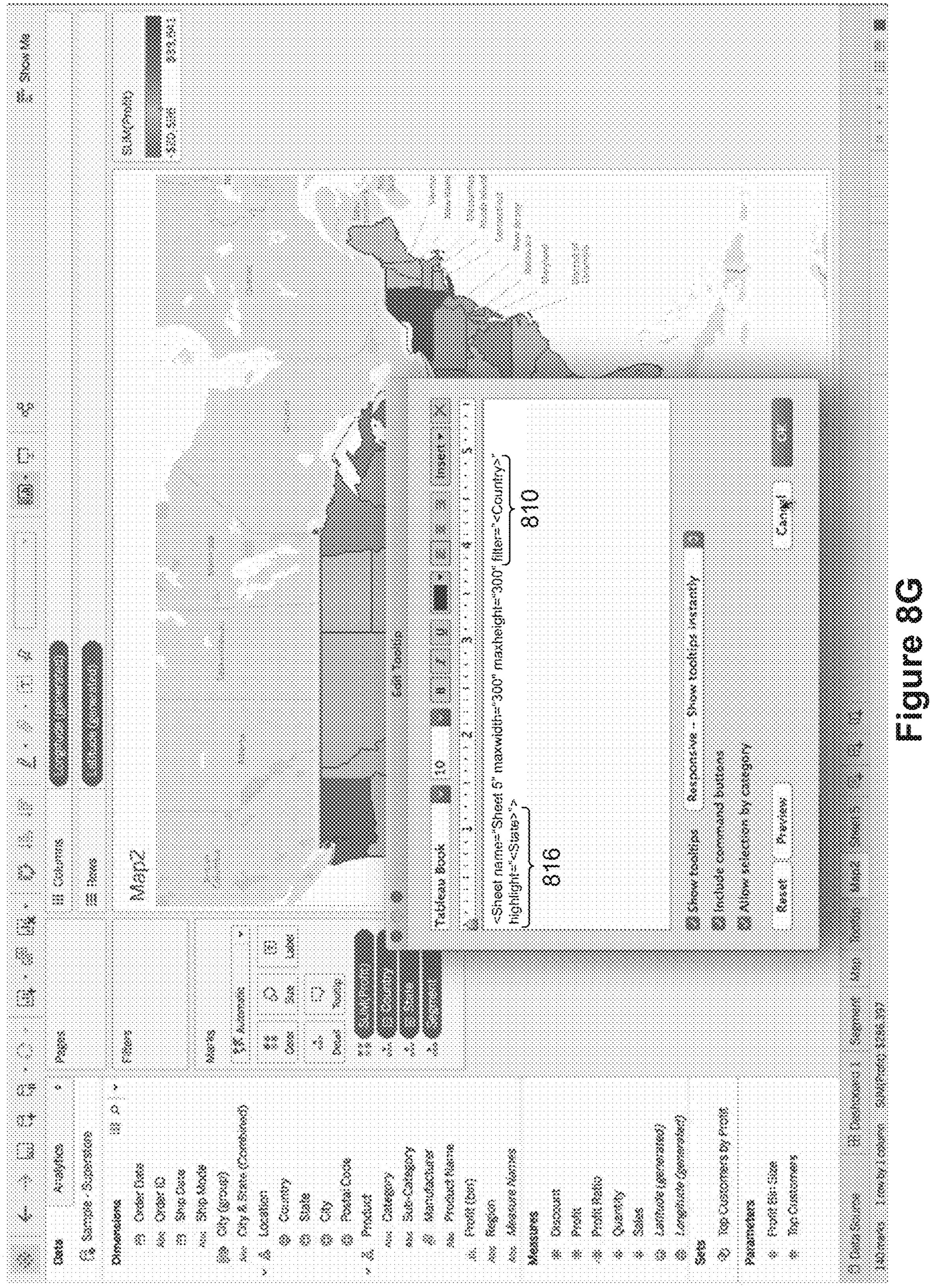
Figure 8H:
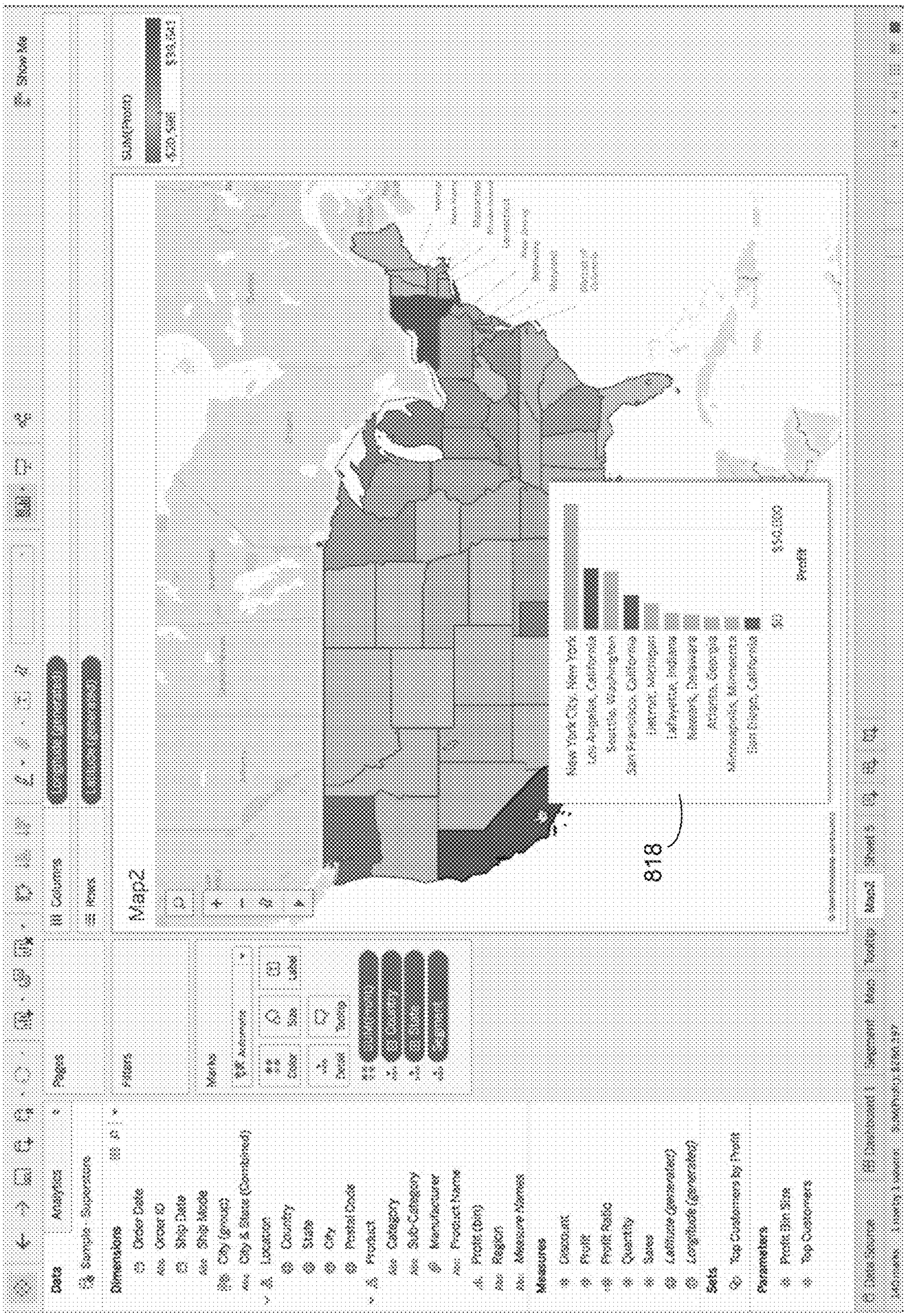

FIG. 8G illustrates opening the tooltip definition window 224 one more time and adding a highlight parameter 816. According to this updated definition, the data visualization in the tooltip will be filtered according to the country of the selected data mark, and the ones in the same state will be highlighted. FIG. 8H illustrates applying the tooltip definition based on a user action (e.g., hovering) over the state of California. Because the highlighting is based on the state, only the cities Los Angeles, San Francisco, and San Diego are highlighted. In this way, the user is able to see the data for the selected state, but compare the data to other states at the same time.

Figure 9A:
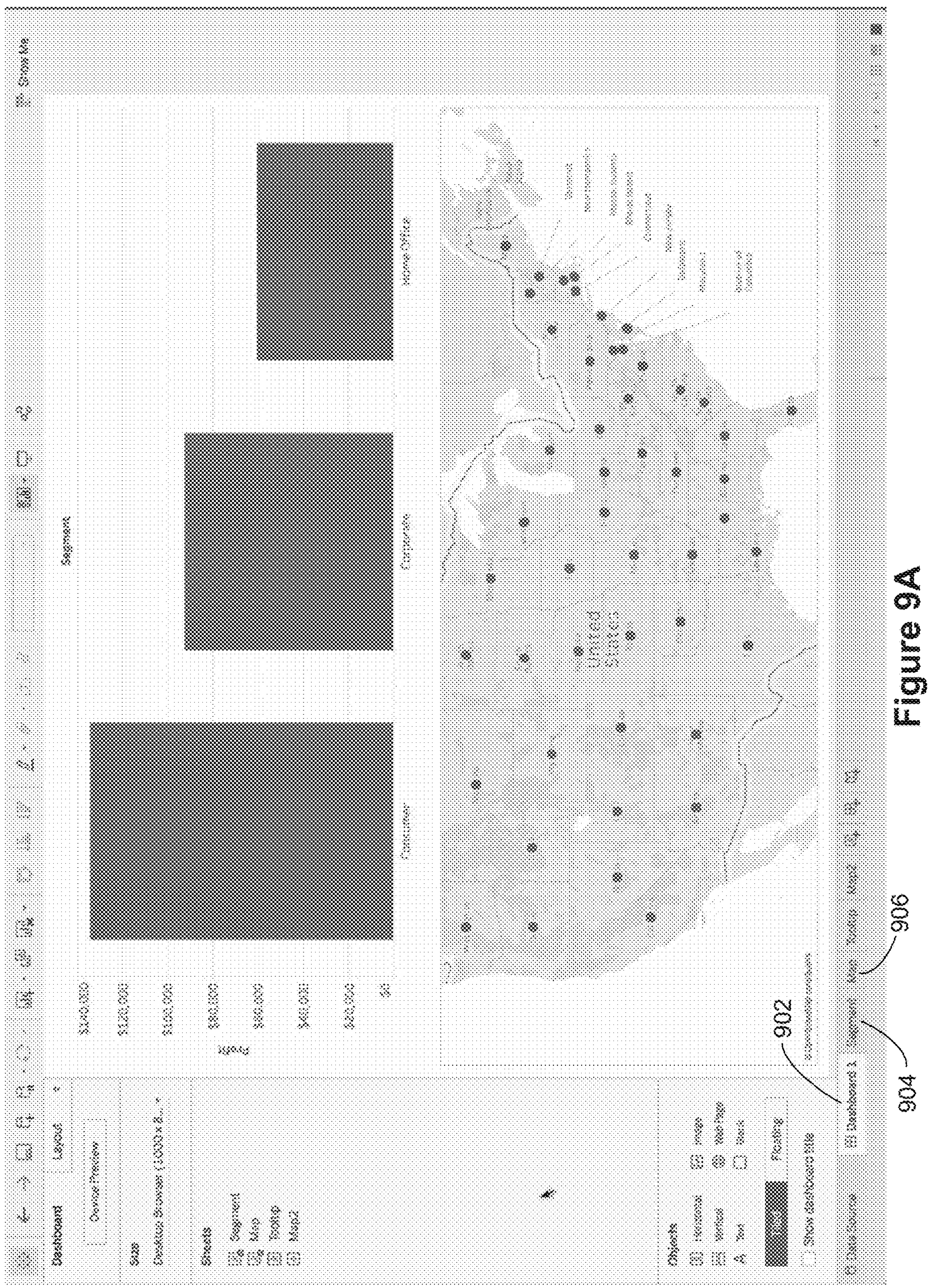
FIGS. 9A-9G illustrate filtering and highlighting within tooltips for data visualizations displayed in a dashboard, in accordance with some implementations.

FIGS. 9A-9G illustrate filtering and highlighting within tooltips when the primary data visualization is a dashboard. As shown in FIG. 9A, there is a dashboard worksheet 902, which displays two data visualizations. The dashboard references the segment worksheet 904 (which produces the upper bar chart) and also references the map worksheet (which produces the lower map data visualization).

Figure 9B:
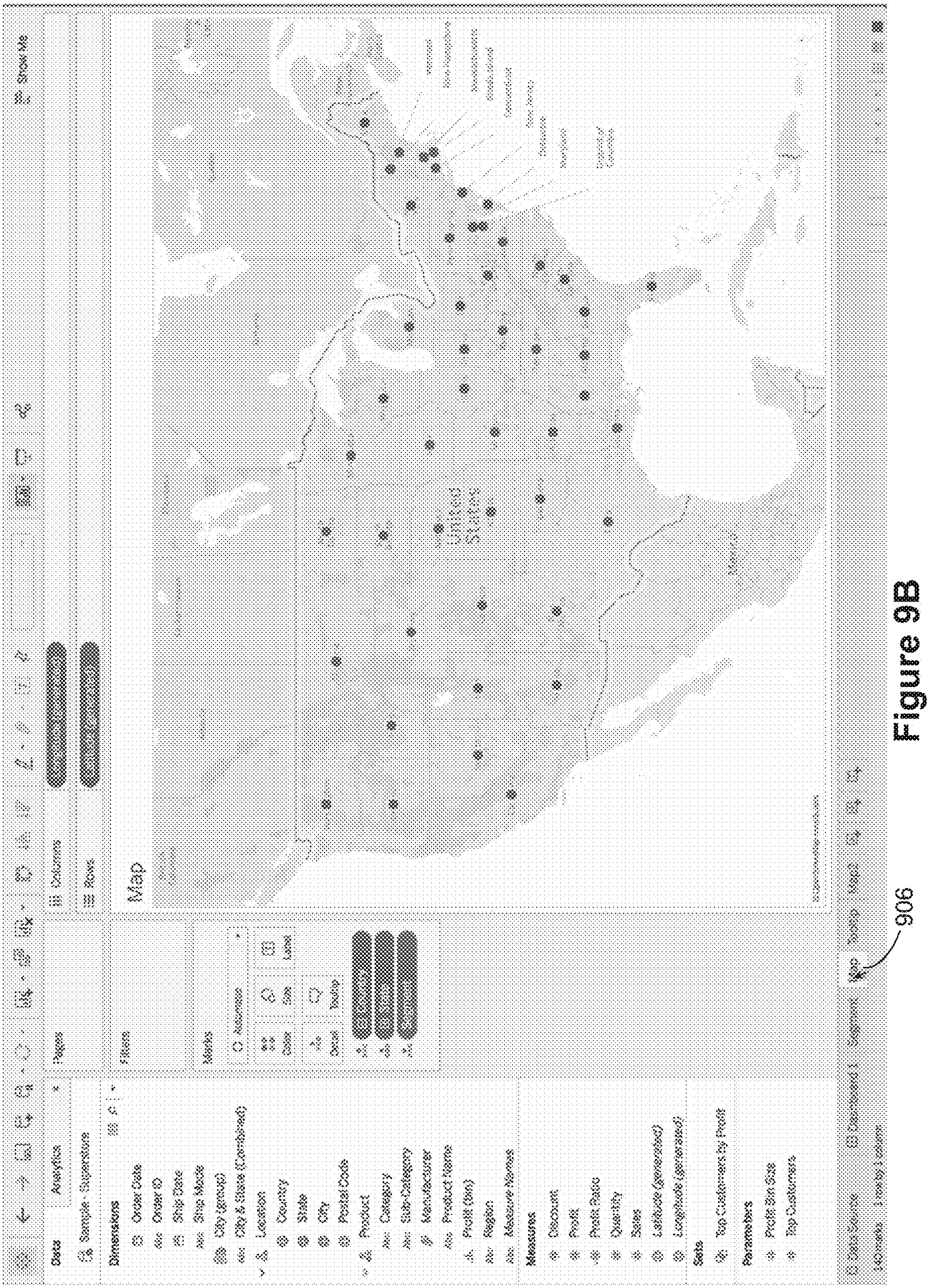
Figure 9C:
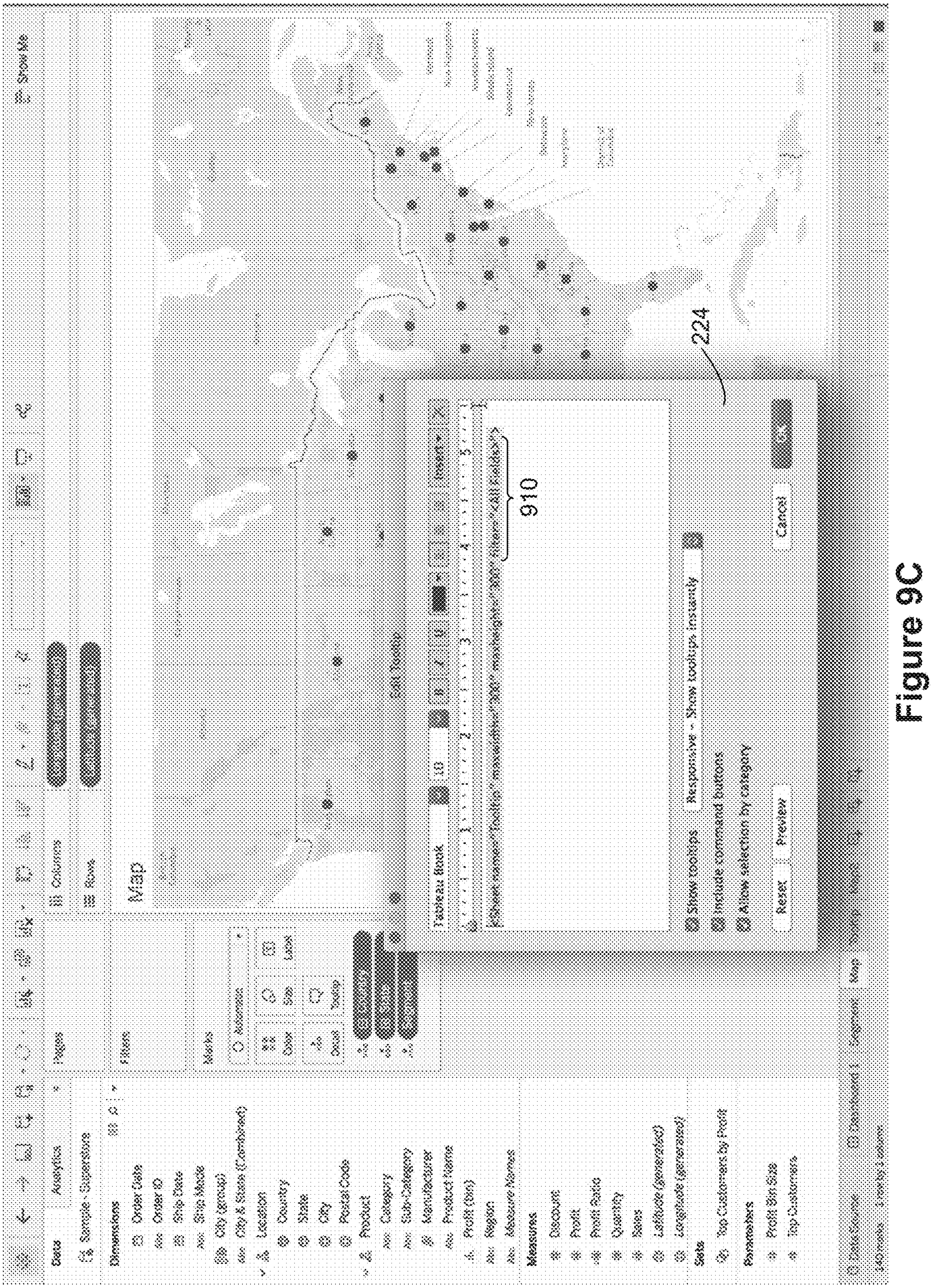

FIG. 9B shows the map worksheet 906, and FIG. 9C shows invoking the tooltip definition window 224 to create a tooltip reference to the previously defined "tooltip" worksheet. By default, the tooltip includes a filter 910 that applies all possible filters according to overlapping data fields between the map data visualization (the primary data visualization) and the secondary data visualization defined by the Tooltip worksheet.

Figure 9D:
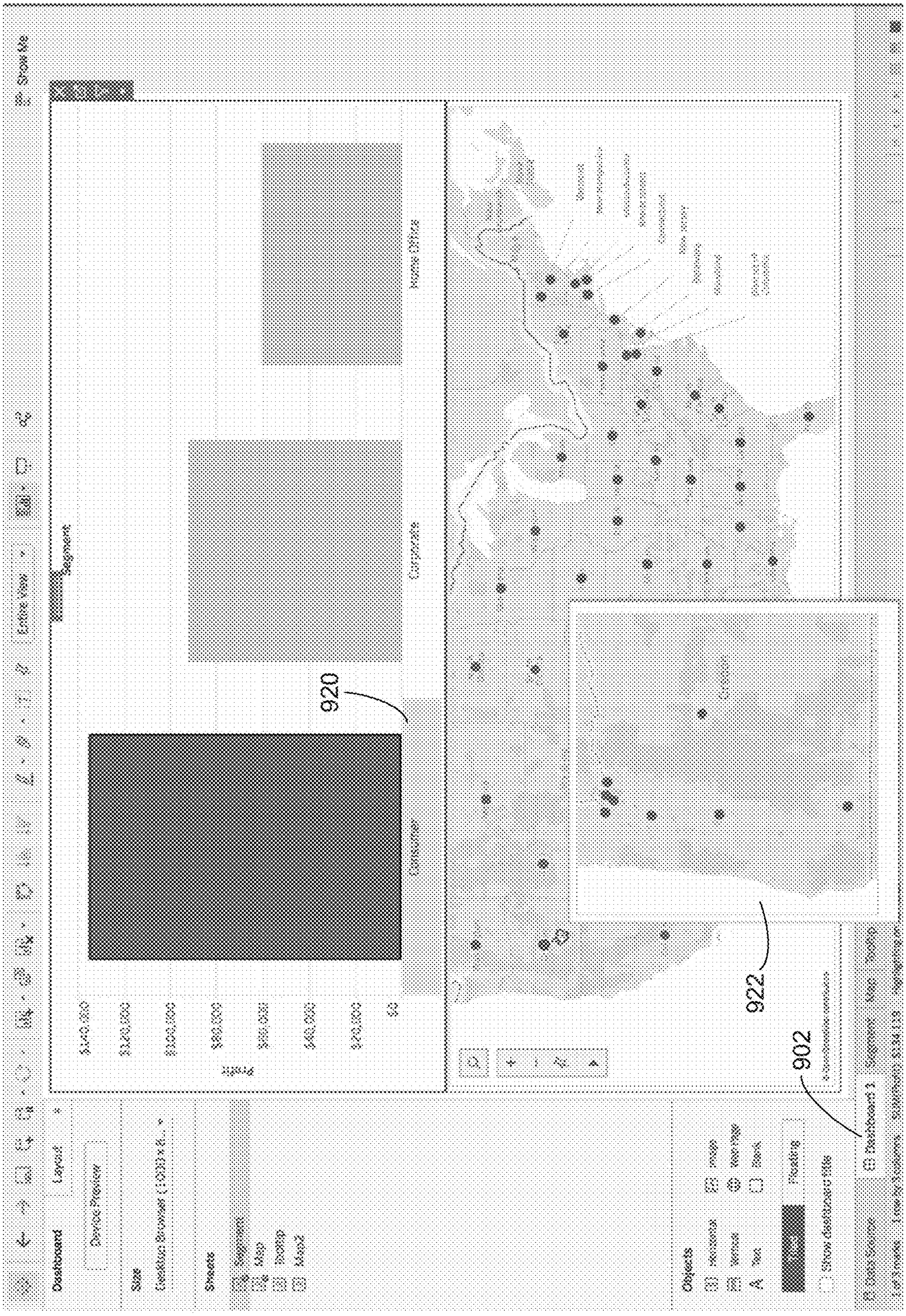
Figure 9E:
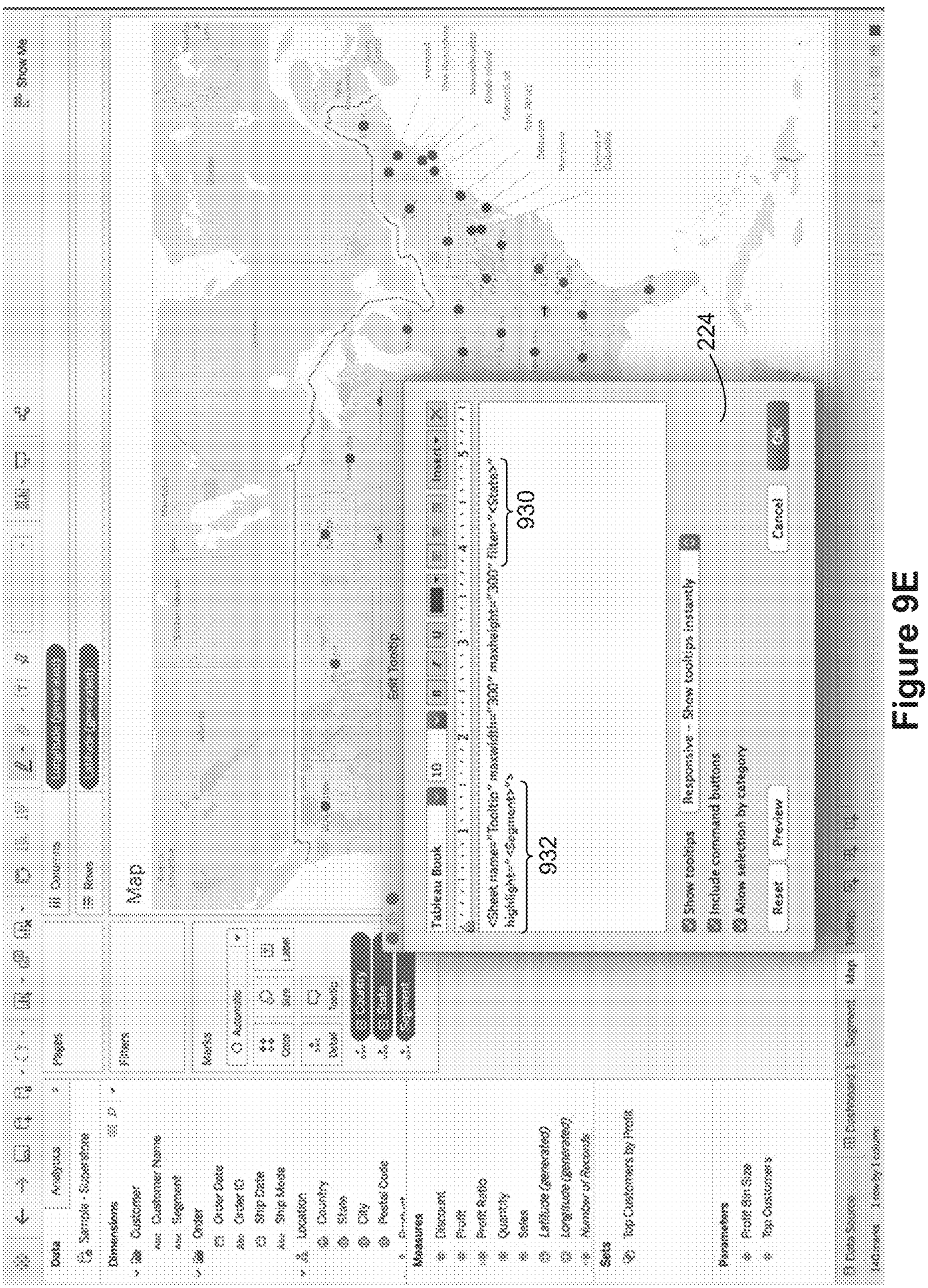

In FIG. 9D, the user has selected the Consumer segment 920 in the upper data visualization, but the tooltip 922 displayed for the lower data visualization provides no visibility of differences between segments. To address this, the user reopens the tooltip definition window 224 and adds a highlighting parameter 932 to the tooltip reference, as illustrated in FIG. 9E. In addition, the user has modified the filter parameter 930 to filter by state. In this way, when a state is selected, the data will be shown for the entire state, but only cities with sales in the consumer segment will be highlighted.

Figure 9F:
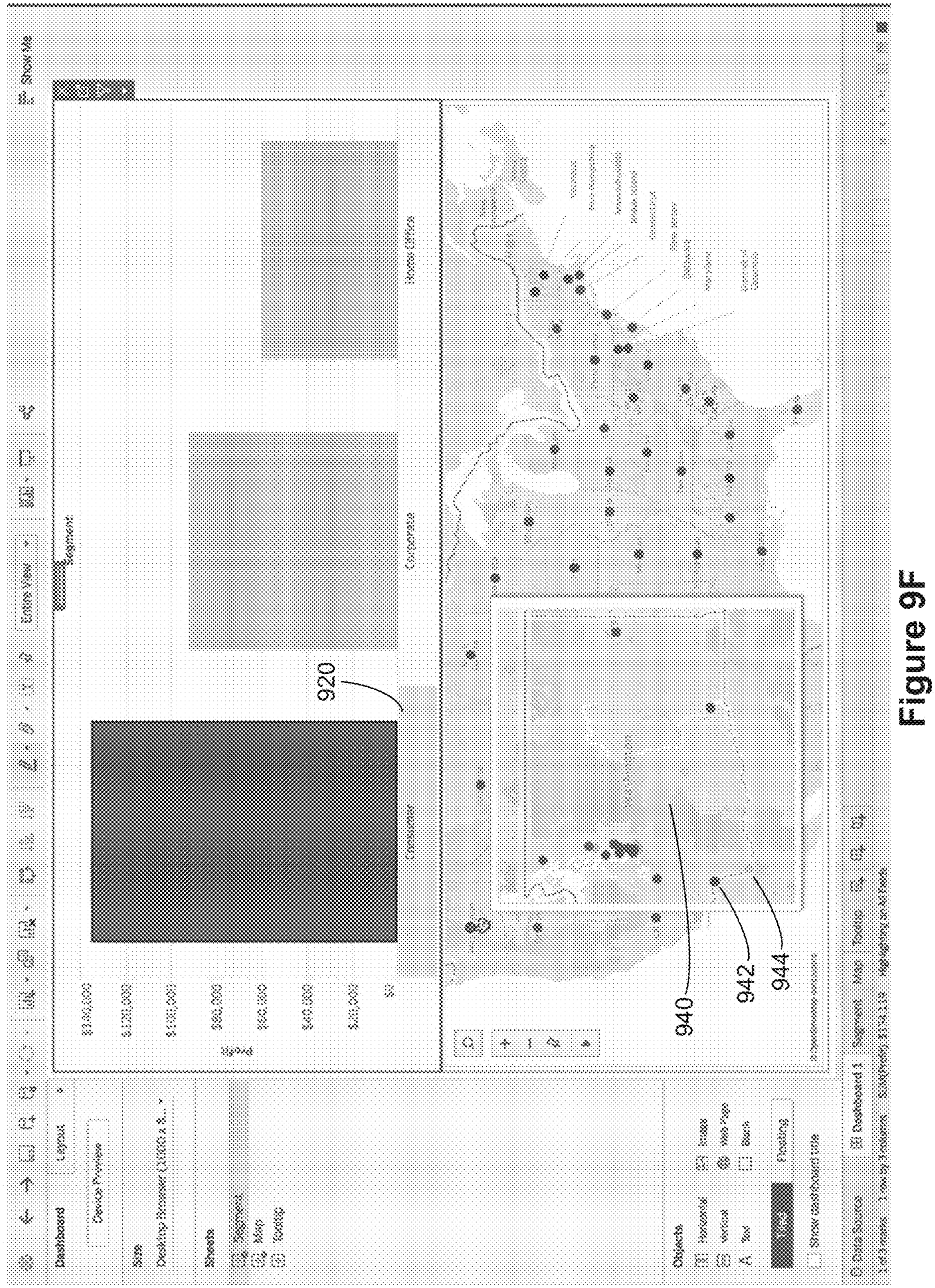
Figure 9G:
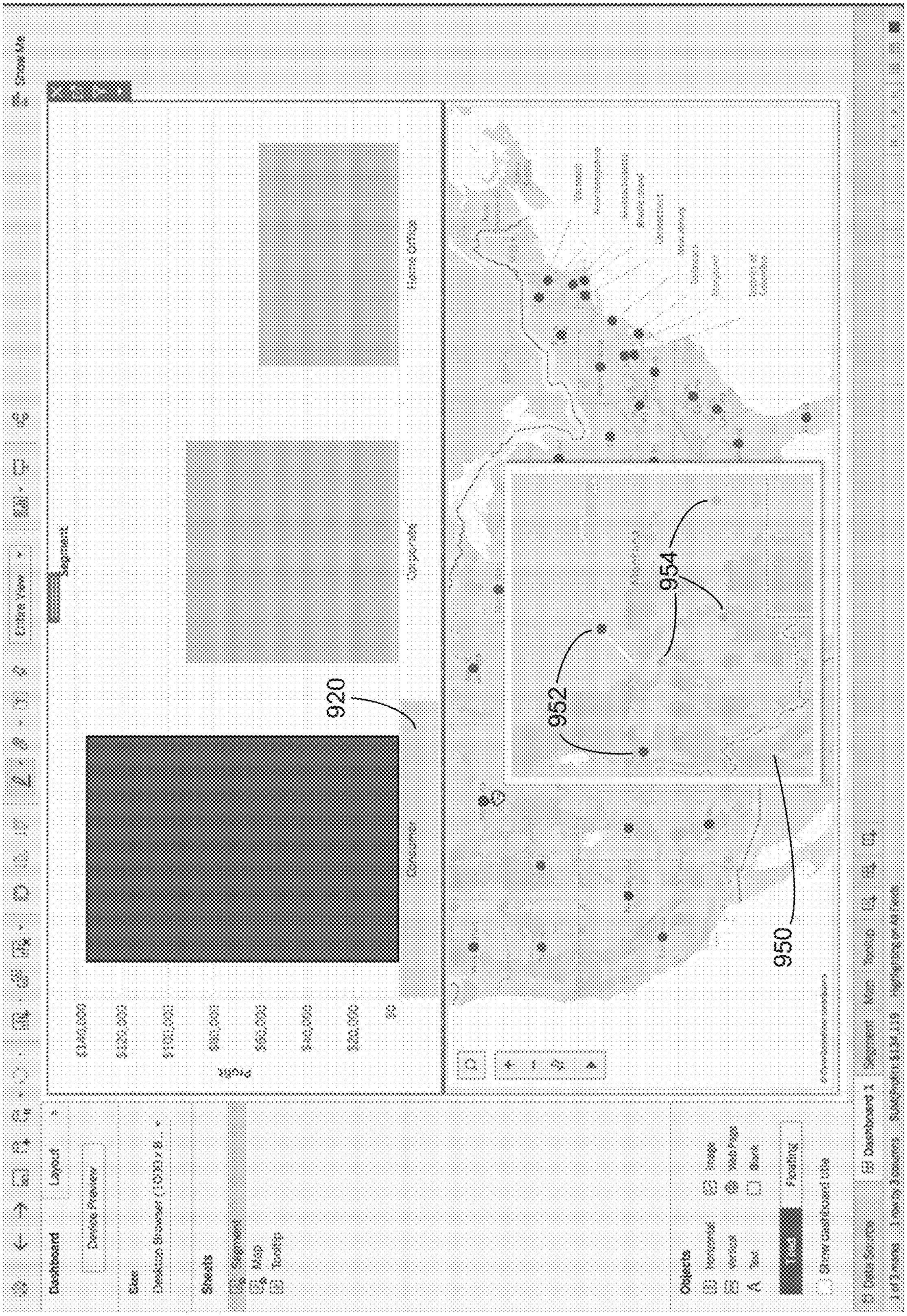

FIGS. 9F and 9G illustrate tooltips generated according to the revised tooltip definition in FIG. 9E. The Consumer segment 920 is still selected. When a user selects a state, such as Washington in FIG. 9F, the tooltip 940 highlights cities (such as Longview 942) that have consumer sales, and dims cites (such as Vancouver 944) that do not have consumer sales. Notice that this works even though Segment is not a data field that is part of the data marks in the map data visualization. Here, the Segment has been selected in the upper data visualization, and that selection from the upper data visualization in the dashboard is applied to the tooltip definition for the lower data visualization. FIG. 9G applies the same tooltip definition when the selected stat is Montana. The popup tooltip 950 displays two cites 952 that have profit in the consumer segment and three cities 954 without profit in the consumer segment.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method comprising:

at a computer having a display, one or more processors, and memory storing one or more programs configured for execution by the one or more processors:

creating a first worksheet, having a primary data visualization, in a data visualization workbook;

creating a second worksheet in the data visualization workbook, distinct from the first worksheet, having a secondary data visualization;

displaying the data visualization workbook in a graphical user interface on the display, wherein:

the graphical user interface has a data visualization region that displays the primary data visualization, which comprises: a bar chart, a line graph, a map, a scatter plot, a pie chart, a heat map, an area chart, a circle plot, a treemap, or a bubble chart; and the primary data visualization includes a plurality of visual marks representing a first set of data fields from a dataset, specified in the first worksheet;

receiving user input, in the graphical user interface, to invoke a tooltip definition window for the primary data visualization;

receiving user input in the tooltip definition window, to specify a reference to the secondary data visualization;

receiving user input in the graphical user interface to select a visual mark of the plurality of visual marks for the primary data visualization; and in response to the user input:

generating the secondary data visualization, for a second set of data fields from the dataset, specified in the second worksheet, wherein the secondary data visualization is filtered according to one or more data values, for the first set of data fields, associated with the selected visual mark; and displaying the generated secondary data visualization in a tooltip overlaying a portion of the primary data visualization.

2. The method of claim 1, wherein generating the secondary data visualization comprises:

generating a database query according to the one or more data values and according to the second set of data fields;

sending the database query to a database that includes the dataset, thereby retrieving a result set for the secondary data visualization; and generating the secondary data visualization according to the result set.

3. The method of claim 1, further comprising:

prior to receiving the user input, retrieving data for the second set of fields from the dataset and storing the retrieved data in a cache;

in response to the user input, retrieving data from the cache corresponding to the one or more data values.

4. The method of claim 1, wherein the user input comprises hovering over the visual mark or selecting the visual mark.

5. The method of claim 1, wherein the dataset includes one or more linked datasets.

6. The method of claim 1, wherein displaying the generated data visualization in the tooltip further comprises:

automatically resizing the secondary data visualization such that the secondary data visualization is displayed within the tooltip.

7. The method of claim 1, further comprising, in response to the user input:

generating a tertiary data visualization according to the one or more data values, wherein the tertiary data visualization represents a third set of data fields of the plurality of data fields from the dataset; and concurrently displaying, in the tooltip, both the generated secondary data visualization and the generated tertiary data visualization.

8. The method of claim 1, wherein the secondary data visualization has a view type selected from the group consisting of: bar chart, line graph, map, scatter plot, pie chart, heat map, area chart, circle plot, treemap, and bubble chart.

9. The method of claim 1, wherein a first data value of the one or more data values corresponds to a first data field, in the first set of data fields, which is not in the second set of data fields, and generating the secondary data visualization further comprises:

computing one or more aggregate values for a second data field in the second set of data fields, aggregating only rows from the dataset whose corresponding data values for the first data field match the first data value.

10. A computing device, comprising:

one or more processors;

memory;

a display; and one or more programs stored in the memory and configured for execution by the one or more processors, the one or more programs comprising instructions for:

creating a first worksheet, having a primary data visualization, in a data visualization workbook;

creating a second worksheet in the data visualization workbook, distinct from the first worksheet, having a secondary data visualization;

displaying the data visualization workbook in a graphical user interface on the display, wherein:

the graphical user interface has a data visualization region that displays the primary data visualization, which comprises: a bar chart, a line graph, a map, a scatter plot, a pie chart, a heat map, an area chart, a circle plot, a treemap, or a bubble chart; and the primary data visualization includes a plurality of visual marks representing a first set of data fields from a dataset, specified in the first worksheet;

receiving user input, in the graphical user interface, to invoke a tooltip definition window for the primary data visualization;

receiving user input in the tooltip definition window, to specify a reference to the secondary data visualization;

receiving user input in the graphical user interface to select a visual mark of the plurality of visual marks for the primary data visualization; and in response to the user input:

generating the secondary data visualization, for a second set of data fields from the dataset, specified in the second worksheet, wherein the secondary data visualization is filtered according to one or more data values, for the first set of data fields, associated with the selected visual mark; and displaying the generated secondary data visualization in a tooltip overlaying a portion of the primary data visualization.

11. The computing device of claim 10, wherein generating the secondary data visualization comprises:

generating a database query according to the one or more data values and according to the second set of data fields;

sending the database query to a database that includes the dataset, thereby retrieving a result set for the secondary data visualization; and generating the secondary data visualization according to the result set.

12. The computing device of claim 10, wherein the one or more programs further comprise instructions for:

prior to receiving the user input, retrieving data for the second set of fields from the dataset and storing the retrieved data in a cache;

in response to the user input, retrieving data from the cache corresponding to the one or more data values.

13. The computing device of claim 10, wherein the user input comprises hovering over the visual mark or selecting the visual mark.

14. The computing device of claim 10, wherein the dataset includes one or more linked datasets.

15. The computing device of claim 10, wherein the one or more programs further comprise instructions that execute in response to the user input, for:

generating a tertiary data visualization according to the one or more data values, wherein the tertiary data visualization represents a third set of data fields of the plurality of data fields from the dataset; and concurrently displaying, in the tooltip, both the generated secondary data visualization and the generated tertiary data visualization.

16. The computing device of claim 10, wherein the secondary data visualization has a view type selected from the group consisting of: bar chart, line graph, map, scatter plot, pie chart, heat map, area chart, circle plot, treemap, and bubble chart.

17. The computing device of claim 10, wherein a first data value of the one or more data values corresponds to a first data field, in the first set of data fields, which is not in the second set of data fields, and generating the secondary data visualization comprises:

computing one or more aggregate values for a second data field in the second set of data fields, aggregating only rows from the dataset whose corresponding data values for the first data field match the first data value.

18. A non-transitory computer-readable storage medium storing one or more programs configured for execution by a computing device having one or more processors, memory, and a display, the one or more programs comprising instructions for:

creating a first worksheet, having a primary data visualization, in a data visualization workbook;

creating a second worksheet in the data visualization workbook, distinct from the first worksheet, having a secondary data visualization;

displaying the data visualization workbook in a graphical user interface on the display, wherein:

the graphical user interface has a data visualization region that displays the primary data visualization, which comprises: a bar chart, a line graph, a map, a scatter plot, a pie chart, a heat map, an area chart, a circle plot, a treemap, or a bubble chart; and the primary data visualization includes a plurality of visual marks representing a first set of data fields from a dataset, specified in the first worksheet;

receiving user input, in the graphical user interface, to invoke a tooltip definition window for the primary data visualization;

receiving user input in the tooltip definition window, to specify a reference to the secondary data visualization;

receiving user input in the graphical user interface to select a visual mark of the plurality of visual marks for the primary data visualization; and in response to the user input:

generating the secondary data visualization, for a second set of data fields from the dataset, specified in the second worksheet, wherein the secondary data visualization is filtered according to one or more data values, for the first set of data fields, associated with the selected visual mark; and displaying the generated secondary data visualization in a tooltip overlaying a portion of the primary data visualization.

* * * * *